United States Patent
Ko et al.

(10) Patent No.: US 8,711,828 B2
(45) Date of Patent: Apr. 29, 2014

(54) METHOD OF TRANSMITTING DATA USING SPATIAL MULTIPLEXING

(75) Inventors: Hyun Soo Ko, Gyeongki-do (KR); Moon Il Lee, Gyeongki-do (KR); Jae Hoon Chung, Gyeongki-do (KR); Bin Chul Ihm, Gyeongki-do (KR); Yeong Hyeon Kwon, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 440 days.

(21) Appl. No.: 13/058,481

(22) PCT Filed: Aug. 11, 2009

(86) PCT No.: PCT/KR2009/004483
§ 371 (c)(1),
(2), (4) Date: Feb. 10, 2011

(87) PCT Pub. No.: WO2010/018983
PCT Pub. Date: Feb. 18, 2010

(65) Prior Publication Data

US 2011/0134902 A1   Jun. 9, 2011

Related U.S. Application Data

(60) Provisional application No. 61/150,008, filed on Feb. 5, 2009, provisional application No. 61/087,976, filed on Aug. 11, 2008.

(30) Foreign Application Priority Data

May 28, 2009   (KR) .................. 10-2009-0047107

(51) Int. Cl.
*H04L 27/26* (2006.01)
*H04B 7/02* (2006.01)
*H04B 7/06* (2006.01)

(52) U.S. Cl.
CPC ....... *H04L 27/2636* (2013.01); *H04J 2211/006* (2013.01); *H04B 7/02* (2013.01); *H04B 7/0697* (2013.01)
USPC .......................... 370/344; 370/208; 455/562.1

(58) Field of Classification Search
None
See application file for complete search history.

(56) References Cited

U.S. PATENT DOCUMENTS 7,095,709 B2 *   8/2006   Walton et al. .................. 370/208
7,429,949 B1 *   9/2008   Trigui ........................... 342/372

(Continued)

FOREIGN PATENT DOCUMENTS

CN   101330479 A   12/2008
EP   1928115        6/2008

(Continued)

OTHER PUBLICATIONS

Notice of Allowance issued in related technology U.S. Appl. No. 13/201,214, dated Jul. 26, 2012.

(Continued)

*Primary Examiner* — Bunjob Jaroenchonwanit
(74) *Attorney, Agent, or Firm* — Morgan, Lewis & Bockius LLP

(57) ABSTRACT

A data transmission method using spatial multiplexing is disclosed. The data transmission method using spatial multiplexing includes modulating at least one codeword to generate at least one modulation symbol, mapping the at least one modulation symbol to a layer whose number is determined according to its rank to generate a layer-mapped symbol stream, performing discrete Fourier transform (DFT) on the layer-mapped symbol stream to generate a frequency domain symbol stream, performing precoding on the frequency domain symbol stream, mapping the precoded frequency domain symbol stream to subcarriers, and then performing inverse fast Fourier transform (IFFT) on the precoded frequency domain symbol stream-mapped subcarriers to generate SC-FDMA symbols; and transmitting the SC-FDMA symbols by using a plurality of transmission antennas. Spatial multiplexing having a low PAPR can be possibly performed in an SC-FDMA system.

8 Claims, 11 Drawing Sheets

(56) References Cited

U.S. PATENT DOCUMENTS

| | | | |
|---|---|---|---|
| 7,787,567 B2 * | 8/2010 | Sutskover | 375/299 |
| 7,817,739 B2 * | 10/2010 | Wennstrom et al. | 375/260 |
| 7,881,247 B2 * | 2/2011 | Pan et al. | 370/319 |
| 8,023,589 B2 * | 9/2011 | Onggosanusi et al. | 375/299 |
| 8,107,455 B2 | 1/2012 | Ko et al. | |
| 8,194,778 B2 | 6/2012 | Ko et al. | |
| 8,238,225 B2 * | 8/2012 | Wennstrom | 370/203 |
| 8,254,245 B2 * | 8/2012 | Kim et al. | 370/207 |
| 8,254,476 B2 * | 8/2012 | Ohwatari et al. | 375/260 |
| 8,259,824 B2 | 9/2012 | Varadarajan et al. | |
| 8,311,162 B2 * | 11/2012 | Jongren | 375/340 |
| 8,351,524 B2 * | 1/2013 | Zhou | 375/260 |
| 8,358,984 B2 * | 1/2013 | Fitch | 455/115.1 |
| 8,401,107 B2 * | 3/2013 | Zhang et al. | 375/267 |
| 2004/0132413 A1 | 7/2004 | Hwang et al. | |
| 2005/0058217 A1 * | 3/2005 | Sandhu et al. | 375/267 |
| 2006/0078066 A1 * | 4/2006 | Yun et al. | 375/299 |
| 2006/0098568 A1 * | 5/2006 | Oh et al. | 370/206 |
| 2007/0160162 A1 * | 7/2007 | Kim et al. | 375/267 |
| 2007/0263746 A1 * | 11/2007 | Son | 375/267 |
| 2007/0274411 A1 | 11/2007 | Lee et al. | |
| 2007/0286304 A1 | 12/2007 | Kim et al. | |
| 2007/0293172 A1 * | 12/2007 | Shi et al. | 455/187.1 |
| 2008/0013610 A1 | 1/2008 | Varadarajan et al. | |
| 2008/0025336 A1 * | 1/2008 | Cho et al. | 370/432 |
| 2008/0049709 A1 * | 2/2008 | Pan et al. | 370/344 |
| 2008/0069281 A1 * | 3/2008 | Olesen et al. | 375/367 |
| 2008/0080637 A1 * | 4/2008 | Khan et al. | 375/267 |
| 2008/0132282 A1 * | 6/2008 | Liu et al. | 455/562.1 |
| 2008/0144733 A1 * | 6/2008 | ElGamal et al. | 375/267 |
| 2008/0186916 A1 | 8/2008 | Oshiba et al. | |
| 2008/0240274 A1 * | 10/2008 | Han et al. | 375/260 |
| 2008/0247364 A1 * | 10/2008 | Kim et al. | 370/336 |
| 2008/0260058 A1 | 10/2008 | Li | |
| 2008/0298225 A1 * | 12/2008 | Oh et al. | 370/206 |
| 2008/0310523 A1 * | 12/2008 | Hui et al. | 375/260 |
| 2009/0016372 A1 * | 1/2009 | Tao et al. | 370/437 |
| 2009/0041151 A1 * | 2/2009 | Khan et al. | 375/267 |
| 2009/0060094 A1 * | 3/2009 | Jung et al. | 375/340 |
| 2009/0067402 A1 * | 3/2009 | Forenza et al. | 370/343 |
| 2009/0074093 A1 * | 3/2009 | Han et al. | 375/260 |
| 2009/0103486 A1 * | 4/2009 | Hunukumbure et al. | 370/329 |
| 2009/0225722 A1 * | 9/2009 | Cudak et al. | 370/330 |
| 2009/0323840 A1 | 12/2009 | Lee et al. | |
| 2010/0027688 A1 * | 2/2010 | Suh et al. | 375/260 |
| 2010/0027697 A1 * | 2/2010 | Malladi et al. | 375/260 |
| 2010/0046658 A1 * | 2/2010 | Yosoku et al. | 375/267 |
| 2010/0054353 A1 * | 3/2010 | Roh et al. | 375/260 |
| 2010/0097949 A1 * | 4/2010 | Ko et al. | 370/252 |
| 2010/0118800 A1 * | 5/2010 | Kim et al. | 370/329 |
| 2010/0173639 A1 * | 7/2010 | Li et al. | 455/450 |
| 2010/0208838 A1 | 8/2010 | Lee et al. | |
| 2010/0220801 A1 | 9/2010 | Lee et al. | |
| 2010/0284484 A1 * | 11/2010 | Jongren et al. | 375/267 |
| 2010/0322349 A1 * | 12/2010 | Lee et al. | 375/299 |
| 2010/0329203 A1 * | 12/2010 | Lee et al. | 370/329 |
| 2011/0033001 A1 * | 2/2011 | Roh et al. | 375/260 |
| 2011/0058621 A1 | 3/2011 | Clerckx et al. | |
| 2011/0064156 A1 * | 3/2011 | Kim et al. | 375/267 |
| 2011/0096851 A1 | 4/2011 | Clerckx et al. | |
| 2011/0116383 A1 * | 5/2011 | Lipka | 370/241 |
| 2011/0194551 A1 * | 8/2011 | Lee et al. | 370/342 |
| 2011/0205930 A1 * | 8/2011 | Rahman et al. | 370/252 |
| 2011/0280342 A1 * | 11/2011 | Kim et al. | 375/316 |
| 2012/0008718 A1 * | 1/2012 | Dabak et al. | 375/298 |
| 2012/0014242 A1 | 1/2012 | Kim et al. | |
| 2012/0027114 A1 * | 2/2012 | Sutskover | 375/267 |
| 2012/0140723 A1 * | 6/2012 | Taoka et al. | 370/329 |
| 2012/0163488 A1 * | 6/2012 | Kim | 375/267 |
| 2012/0320852 A1 * | 12/2012 | Seo et al. | 370/329 |
| 2013/0028238 A1 * | 1/2013 | Kim et al. | 370/336 |
| 2013/0034070 A1 * | 2/2013 | Seo et al. | 370/329 |
| 2013/0034182 A1 * | 2/2013 | Lee et al. | 375/267 |
| 2013/0039307 A1 * | 2/2013 | Han et al. | 370/329 |

FOREIGN PATENT DOCUMENTS

| | | |
|---|---|---|
| EP | 1928115 A1 | 6/2008 |
| KR | 10-2004-0062335 | 7/2004 |
| KR | 100640349 B1 | 10/2006 |
| KR | 2008-0086333 | 9/2008 |
| KR | 1020080086333 A | 9/2008 |
| WO | 2007/041086 | 4/2007 |
| WO | 2007041086 A1 | 4/2007 |
| WO | 2007/095102 | 8/2007 |
| WO | 2007095102 A1 | 8/2007 |
| WO | 2008/100214 A1 | 8/2008 |

OTHER PUBLICATIONS

Myung et al., "Peak Power Characteristics of Single Carrier FDMA MIMO Precoding System," IEEE 66th Vehicular Technology Conference, Sep. 2007, pp. 477-481.

Grieco et al., "Uplink Single-User MIMO for 3GPP LTE," IEEE International Symposium on Personal, Indoor and Mobile Radio Communications, Sep. 2007, pp. 1-5.

Korean Office Action dated Sep. 2, 2011.

U.S. Office Action (U.S. Appl. No. 13/058,494), dated Nov. 8, 2012.

Myung, H. et al., "Peak Power Characteristics of Single Carrier FDMA MIMO Precoding System", IEEE 66th Vehicular Technology Conference, 2007, pp. 477-481.

Grieco, D. et al., "Uplink Single-User MIMO for 3GPP LTE", IEEE International Symposium on Personal, Indoor and Mobile Radio Communications, 2007, pp. 1-5.

International Search Report from PCT/KR2009/004483.

International Search Report from PCT/KR2009/004446.

International Search Report from PCT/KR2010/000957.

JPO—Office Action for Japanese Patent Application No. 2011-550066—Issued on Feb. 27, 2013.

R1-100655—Agenda Item: 7.3.1—LG Electronics—Uplink Rank-3 Codebook Design for LTE-Advanced—3GPP TSG RAN WG1 Meeting No. 59bis—Valencia, Spain—Jan. 18-22, 2010.

R1-093964—Agenda Item: 7.6.1—Motorola—4-Tx Codebook Design and Performance Comparison—3GPP TSG-RAN WG1 Meeting No. 58bis—Miyazaki, Japan—Oct. 12-16, 2009.

R1-092403—Agenda Item: 15.5—Texas Instruments—4Tx Codebook for UL SU-MIMO: Rank-3—3GPP TSG RAN WG1 Meeting No. 57bis—Los Angeles, U.S.A.—Jun. 29-Jul. 3, 2009.

R1-101092—Agenda Item: 7.3.2—Texas Instruments—Finalizing the Size of 4Tx Rank-3 Codebook—3GPP TSG RAN WG1 Meeting No. 60—San Francisco, U.S.A.—Feb. 22-26, 2010.

R1-101243—Agenda Item: 7.3.2—LG Electronics—Performance Evaluation on Uplink Rank-3 Codebook for LTE-Advanced—3GPP TSG RAN WG1 Meeting No. 60—San Francisco, U.S.A.—Feb. 22-26, 2010.

R1-092949—Agenda Item: 15.5—Texas Instruments—4Tx Codebook for UL SU-MIMO: Rank-3—3GPP TSG RAN WG1 Meeting No. 57bis—Los Angeles, U.S.A.—Jun. 29-Jul. 3, 2009.

R1-093999—Agenda Item: 7.6.1—Texas Instruments—4Tx Rank-3 Codebook for UL SU-MIMO—3GPP TSG-RAN WG1 Meeting No. 58bis—Miyazaki, Japan—Oct. 12-16, 2009.

R1-094849—Agenda Item: 7.6.2—Motorola—Further Results on UL-MIMO Codebook Design—3GPP TSG RAN Meeting No. 59—Jeju, Korea—Nov. 9-16, 2009.

R1-100194—Agenda Item: 7.3.1—Motorola—4-Tx Rank-3 Codebook in UL-MIMO—3GPP TSG RAN1—Meeting No. 59bis—Valencia, Spain—Jan. 18-22, 2010.

SIPO: First Office Action for Chinese Patent Application No. 2010-80011700.0—Issued on Jul. 1, 2013—Including English Translation of Notification and Text of Office Action.

LG Electronics: Codebook Design and Evualation for E-UTRA MIMO Precoding—4Tx Rank Adaption Scheme, Agenda Item No. 6.7.1, 3GPP TSG RAN WG1 Meeting No. 48, St. Louis, Missouri, Feb. 12-16, 2007, pp. 1-9—R1-070914.

Texas Instruments, Motorola, Nokia et al.: Way Forward on 4-Tx Antenna Codebook for SU-MIMO, Agenda Item No. 7.9.1, 3GPP TSG RAN WG1 Meeting No. 48bis, St. Julian's Malta, Mar. 26-30, 2007, pp. 1-3—R1-071799.

* cited by examiner

METHOD OF TRANSMITTING DATA USING SPATIAL MULTIPLEXING

The present application is a national stage of PCT International Application No. PCT/KR2009/004483, filed Aug. 11, 2009, and claims the benefit of U.S. Provisional Application Nos. 61/087,976 and 61/150,008, respectively filed Aug. 11, 2008, and Feb. 5, 2009. The present national stage application also claims the benefit of Korean Patent Application No. 10-2009-0047107, filed May 28, 2009.

TECHNICAL FIELD

The present invention relates to wireless communication and, more particularly, to a method of transmitting data using spatial multiplexing with a low a peak-to-average power ratio (PAPR) in a single carrier-frequency division multiple access (SC-FDMA) system.

BACKGROUND ART

Recently, demand for wireless (or radio) data services is explosively increasing, and evolution from a radio voice service to a radio data service triggers the requirement of a gradual increase in a wireless capacity. Such demand prompts the radio service providers and wireless equipment manufacturers to seek an improvement of a data transmission rate of a wireless system, and motivates a great deal of research.

One of the systems considered a post-3rd generation system is an orthogonal frequency division multiplexing (OFDM) system that attenuates an inter-symbol interference with a low complexity. In the OFDM, serially input data are converted into N number of parallel data, which are included in N number of subcarriers so as to be transmitted. The subcarriers maintain orthogonality in a frequency domain. Orthogonal frequency division multiple access (OFDMA) refers to a multi-access method that accomplishes multiple accesses by independently providing portions of available subcarriers to each user in a system using OFDM as a modulation scheme.

One of the major problems of the OFDM/OFDMA system, however, is that a peak-to-average power ratio (PAPR) is possibly very high. The PAPR issue arises as a peak amplitude of a transmission signal appears to be very large compared with an average amplitude, which results from the fact that OFDM symbols overlap with N number of sinusoidal signals on mutually different subcarriers. PAPR is especially problematic for a terminal sensitive to power consumption in relation to a battery capacity. In order to reduce power consumption, the PAPR needs to be lowered.

A single carrier-frequency division multiple access (SC-FDMA) is one of systems proposed to lower the PAPR. The SC-FDMA is a scheme obtained by combining frequency division multiple access (FDMA) to single carrier-frequency division equalization (SC-FDE). The SC-FDMA, which is similar to the OFDMA in that data is modulated and demodulated in time and frequency domains by using discrete Fourier transform (DFT), though, ensures a low PAPR of a transmission signal, so it is advantageous for reducing transmission power. In particular, the SC-FDMA is advantageous for uplink communication from a terminal sensitive to transmission power in relation to the usage of a battery to a base station.

Meanwhile, when a transport channel undergoes deep fading, unless a different version or a replica of a transmitted signal is additionally transmitted, a receiver can hardly determine the transmitted signal. Resources corresponding to such different version or replica are called diversity which is one of the most significant factors contributing to reliable transmission over radio channels. The use of diversity can maximize a data transmission capacity or data transmission reliability, and a system implementing diversity with multiple transmission antennas and multiple reception antennas is called a multiple input multiple output (MIMO) system.

Schemes for implementing diversity in the MIMO system include a SFBC (Space Frequency Block Code), STBC (Space Time Block Code), CDD (Cyclic Delay Diversity), FSTD (frequency switched transmit diversity), TSTD (time switched transmit diversity), PVS (Precoding Vector Switching), Spatial Multiplexing (SM), and the like. The SM scheme includes a closed-loop spatial multiplexing scheme that performs precoding upon obtaining feedback information again from a receiver and an open-loop spatial multiplexing scheme that performs precoding without a feedback.

The OFDM system uses a spatial multiplexing scheme that performs precoding by using a unitary matrix including only non-zero elements. In case of performing precoding by using such unitary matrix, when modulation symbols are added to each other by the matrix, PAPR increases. In addition, for a spatial multiplexing gain, the OFDMA system uses a method in which signals combined through DFT after modulation are switched by a diagonal matrix having a linear phase rotation by resource elements so as to be mapped to frequency resources. However, application of such mapping to the SC-FDMA system cannot guarantee a low PAPR after performing IFFT.

The system employing the SC-FDMA modulation is sensitive to power consumption, so it is not proper to apply the spatial multiplexing scheme used for the OFDM system to the system employing the SC-FDMA modulation. Thus, a spatial multiplexing scheme that does not increase a PAPR in the SC-FDMA system should be considered.

DISCLOSURE OF INVENTION

Technical Problem

Therefore, an object of the present invention is to provide a data transmission method in which a spatial multiplexing scheme is applied to an SC-FDMA system without increasing a PAPR.

Solution to Problem

According to an aspect of the present invention, there is provided a data transmission method using spatial multiplexing, the method including modulating at least one codeword to generate at least one modulation symbol, mapping the at least one modulation symbol to a layer whose number is determined according to its rank to generate a layer-mapped symbol stream, performing discrete Fourier transform (DFT) on the layer-mapped symbol stream to generate a frequency domain symbol stream, performing precoding on the frequency domain symbol stream; mapping the precoded frequency domain symbol stream to subcarriers, and then performing inverse fast Fourier transform (IFFT) on the precoded frequency domain symbol stream-mapped subcarriers to generate SC-FDMA symbols; and transmitting the SC-FDMA symbols by using a plurality of transmission antennas.

The performing of precoding may include: separately mapping the plurality of transmission antennas to each virtual antenna or mapping the plurality of transmission antennas to a single virtual antenna; and performing permutation so that the at least one codeword can be distributedly transmitted through all of the plurality of transmission antennas.

According to another aspect of the present invention, there is provided a data transmission method in a multi-antenna system, the method including: transmitting a first precoded signal by using a first precoding matrix that combines a plurality of transmission antennas to a plurality of antenna groups to perform spatial multiplexing; and transmitting a second precoded signal by using a second precoding matrix different from the first precoding matrix, wherein the second precoding matrix may be a precoding matrix that combines the plurality of transmission antennas to the plurality of antenna groups in the same manner as the first precoding matrix but includes different elements, or may be a precoding matrix that combines the plurality of transmission antennas to the plurality of antenna groups in a different manner from that of the first precoding matrix.

Advantageous Effects of Invention

Spatial multiplexing can be performed at a low PAPR in an SC-FDMA system.

MODE FOR THE INVENTION

The following technique can be used for various wireless communication systems such as CDMA (code division multiple access), FDMA (frequency division multiple access), TDMA (time division multiple access), OFDMA (orthogonal frequency division multiple access), SC-FDMA (single carrier-frequency division multiple access), and the like. CDMA may be implemented as radio technology such as UTRA (Universal Terrestrial Radio Access) or CDMA2000. The TDMA may be implemented as radio technology such as GSM (Global System for Mobile communications)/GPRS (General Packet Radio Service)/EDGE (Enhanced Data Rates for GSM Evolution). OFDMA may be implemented as radio technology such as IEEE 802.11 (Wi-Fi), IEEE 802.16 (WiMAX), IEEE 802-20, E-UTRA (Evolved UTRA), and the like. UTRA is a part of UMTS (Universal Mobile Telecommunications System). 3GPP (3rd Generation Partnership Project) LTE (long term evolution) is a part of E-UMTS (Evolved UMTS) using E-UTRA, which employs OFDMA for downlink and SC-FDMA for uplink.

For clarification, the 3GPP LTE will be described but the technical idea of the present invention is not meant to be limited thereto. A multi-antenna system or a multiple input multiple output (MIMO) system employing the following technique is a system using multiple transmission antennas and at least one reception antenna. The following technique may be applied for diverse MIMO schemes. The MIMO schemes include spatial diversity for transmitting the same stream to multiple layers and spatial multiplexing (SM) for transmitting multiple streams to multiple layers.

Transmission of multiple streams to a single user in spatial multiplexing is called a single user MIMO (SU-MIMO) or spatial division multiple access (SDMA). Transmission of multiple streams to a plurality of users in spatial multiplexing is called a multi-user MIMO (MU-MIMO). Spatial diversity and spatial multiplexing may be divided into an open-loop type and a closed-loop type depending on whether or not feedback information reported from each user is used.

Figure 1:
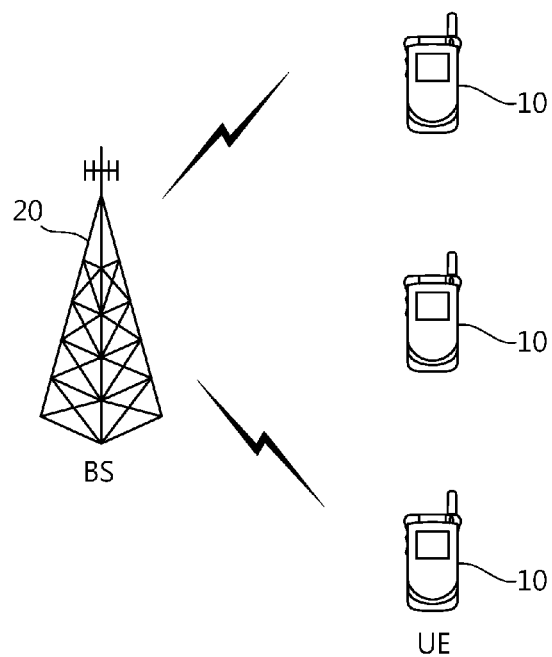
FIG. 1 illustrates a wireless communication system.

FIG. 1 illustrates a wireless communication system. The wireless communication system is widely used to provide a variety of communication services such as communication of voice, packet data, etc.

Referring to FIG. 1, the wireless communication system includes user equipments (UEs) 10 and a base station (BS) 20. The UEs 10 may be fixed or mobile, and may be referred to by other names such as mobile station (MS), user terminal (UT), subscriber station (SS), wireless device, etc. The BS 20 generally refers to a fixed station that communicates with the UEs 10 and may be called by other names such as node-B, base transceiver system (BTS), access point (AP), etc. One or more cells may exist within the coverage of the BS 20.

Hereinafter, downlink refers to communication from the BS 20 to the UEs 10, and uplink refers to communication from the UEs 10 to the BS 20. In the downlink, a transmitter may be a part of the BS 20, and a receiver may be a part of the UEs 10. In the uplink, a transmitter may be a part of the UEs 10, and a receiver may be a part of the BS 20.

Figure 2:
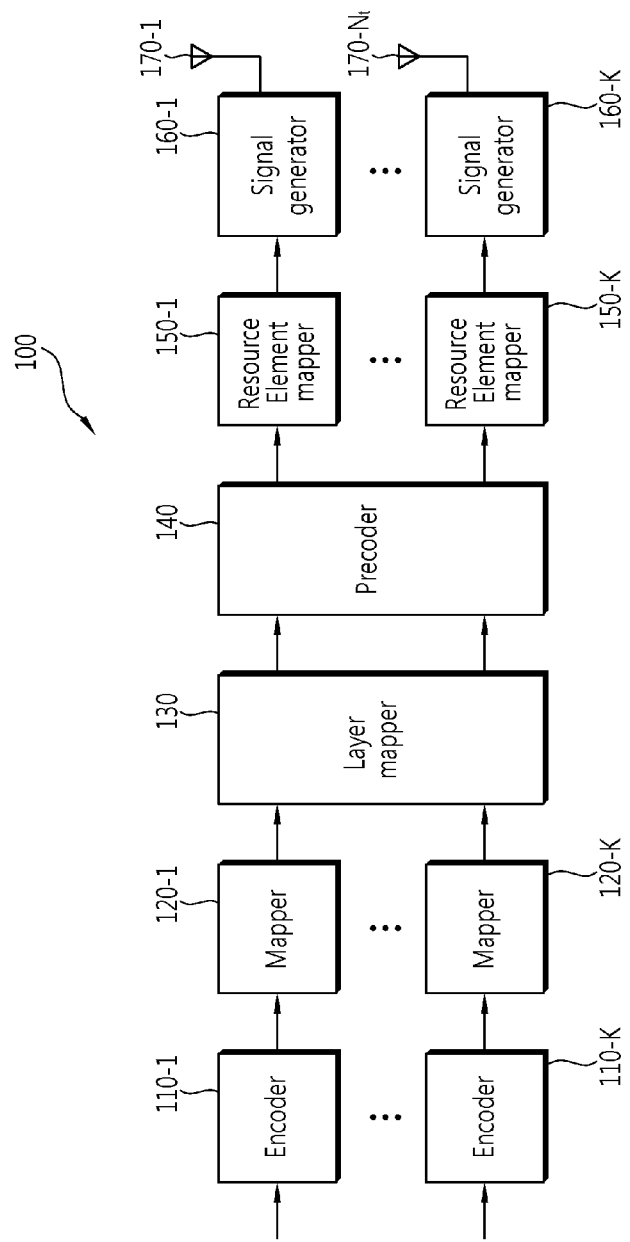
FIG. 2 is a schematic block diagram of a transmitter according to an exemplary embodiment of the present invention.

FIG. 2 is a schematic block diagram of a transmitter according to an exemplary embodiment of the present invention.

With reference to FIG. 2, the transmitter 100 includes encoders 110-1, ..., 110-K, mappers 120-1, ..., 120-K, a layer mapper 130, a precoder 140, resource element mappers 150-1, ..., 150-K, and signal generators 160-1, ..., 160-K. The transmitter 100 further includes Nt number of transmission antennas 170-1, ..., 170-Nt.

The encoders 110-1, ..., 110-K encode at least one input information bit stream according to a predetermined coding scheme to form coded data (referred to as 'codeword', hereinafter). The codeword may have a parallel form, and if there is only one codeword, the one codeword is called a single codeword (SCW), and if there are two or more codewords, the codewords are called multiple codewords (MCW). The mappers 120-1, ..., 120-K map the codeword to modulation symbols representing positions on a signal constellation to generate a modulation symbol stream. There is no limitation in the modulation scheme, and the modulation scheme may be m-phase shift keying (m-PSK) or m-quadrature amplitude modulation (m-QAM). For example, m-PSK may be BPSK, QPSK, or 8-PSK, and the m-QAM may be 16-QAM, 64-QAM, or 256-QAM.

The layer mapper 130 maps modulation symbols to layers so that the precoder 140 can distribute frequency domain symbol streams to the path of each antenna, and performs discrete Fourier transform (DFT) on the layer-mapped symbol streams to generate frequency domain symbol streams. The layers may be defined as information paths inputted to the precoder 140. Information paths at a previous stage of the precoder 140 may be virtual antennas or layers.

The precoder 140 performs precoding on the frequency domain symbol streams to output precoded frequency domain symbol streams, and distributes the frequency domain symbol streams to the resource element mappers 150-1, ..., 150-K of paths of the corresponding antennas. The precoded frequency domain symbol streams are antenna-specific symbols. In detail, the process of precoding performed by the precoder 140 includes separately mapping the plurality of transmission antennas to each virtual antenna or mapping the plurality of transmission antennas to a single virtual antenna; and performing permutation so that the at least one codeword can be distributedly transmitted through all of the plurality of transmission antennas. Permutation, which alters a virtual antenna according to each frequency tone, may be also considered as shifting in the aspect that mapping between virtual antennas and physical antennas is changed based on OFDM symbols, slots, and the like. Namely, layer permutation and layer shifting are an equivalent concept, so they can be mixedly used. Hereinafter, the term of permutation will be used representatively.

Each information path transmitted to a single antenna by the precoder 140 is called a stream. It may be also called a physical antenna. Equation 1 shown below represents precoding matrixes of ranks 2, 3, and 4 over four transmission antennas. The precoding matrix refer to matrixes used for performing precoding. The process of precoding performed by the precoder 140 may be implemented by the precoding matrix.

[Math. 1]

$$\text{Rank2:} \begin{bmatrix} y^0(i) \\ y^1(i) \\ y^2(i) \\ y^3(i) \end{bmatrix} = W(i) \begin{bmatrix} x^0(i) \\ x^1(i) \end{bmatrix},$$

$i = 0, 1, \ldots, M^{ap}_{symb} - 1$ where $M^{ap}_{symb} = M^{layer}_{symbol}$ $$\text{Rank3:} \begin{bmatrix} y^0(i) \\ y^1(i) \\ y^2(i) \\ y^3(i) \end{bmatrix} = W(i) \begin{bmatrix} x^0(i) \\ x^1(i) \\ x^2(i) \end{bmatrix},$$

$i = 0, 1, \ldots, M^{ap}_{symb} - 1$ where $M^{ap}_{symb} = M^{layer}_{symbol}$ $$\text{Rank4:} \begin{bmatrix} y^0(i) \\ y^1(i) \\ y^2(i) \\ y^3(i) \end{bmatrix} = W(i) \begin{bmatrix} x^0(i) \\ x^1(i) \\ x^2(i) \\ x^3(i) \end{bmatrix},$$

$i = 0, 1, \ldots, M^{ap}_{symb} - 1$ where $M^{ap}_{symb} = M^{layer}_{symbol}$ MathFigure 1 where $y^p(i)$) is a complex symbol vector mapped to a physical antenna, $x^p(i)$ is a complex symbol vector of a virtual antenna, $W(i)$ is a precoding matrix, and p is port of physical antenna, and because there are four transmission antennas, $0 \leq p \leq 3$, $M^{ap}_{symbol}$ is the number of symbols on a single physical antenna port, and $M^{layer}_{symbol}$ is the number of symbols on a single layer. A virtual antenna is mapped to a physical antenna by a precoding matrix (or weight matrix). The size of the precoding matrix is determined depending on the number of virtual antennas and physical antennas. The precoding matrix may include a permutation matrix, a unitary matrix, an antenna selection matrix, an antenna combining matrix, an antenna hopping matrix, or any of their combinations. An identity matrix is a square matrix, mapping layers and antenna ports in a one-to-one manner. The size of the unitary matrix and the antenna selection matrix is determined depending on the number of layers and antenna ports. The antenna combining matrix combines antenna ports to allow a single layer to be transmitted via the plurality of antenna ports. Table 1 below shows examples of matrixes that may be included in the precoding matrix.

TABLE 1

| Identity Matrix | Permutation Matrix | Unitary Matrix | Antenna Selection Matrix | Antenna Combining Matrix |
|---|---|---|---|---|
| $\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ | $\begin{bmatrix} 0 & 0 & 0 & 1 \\ 0 & 0 & 1 & 0 \\ 0 & 1 & 0 & 0 \\ 1 & 0 & 0 & 0 \end{bmatrix}$ | $\frac{1}{\sqrt{2}}\begin{bmatrix} 1 & 1 \\ 1 & j \\ 1 & -1 \\ 1 & -j \end{bmatrix}$ | $\begin{bmatrix} 1 & 0 \\ 0 & 0 \\ 0 & 1 \\ 0 & 0 \end{bmatrix}$ | $\begin{bmatrix} a & 0 \\ be^{j\theta k} & 0 \\ 0 & a \\ 0 & be^{j\theta k} \end{bmatrix}$ |

The resource element mappers 150-1, ..., 150-K allocate the precoded frequency domain symbol streams to proper resource elements, and multiplex them according to users. The signal generators 160-1, ..., 160-K modulate the precoded frequency domain symbol streams according to the OFDM scheme to output a transmission signal. The signal generators 160-1, ..., 160-K may generate a transmission signal according to various multi-access schemes such as OFDMA or SC-FDMA. The transmission signal is transmitted via the antenna ports 170-1, ..., 170-Nt.

The example of the 3GPP LTE standard regarding the mapping relationship between the codewords and layers as described above is as follows. According to the paragraph 6.3 of 3GPP TS 36.211 V8.0.0 (2007-09), in the 3GPP LTE, modulation symbols $d^{(q)}(0), \ldots, d^{(q)}(M^{(q)}_{symb}-1)$ with respect to a codeword 'q' are mapped to layers $x(i) = [x^{(0)}(i) \ldots x^{(v-1)}(i)]^T$ (i=0, 1, ..., $M^{layer}_{symb}-1$). Here, $M^{(q)}_{symb}$ is the number of modulation symbols with respect to the codeword 'q', 'v' is the number of layers, and $M^{layer}_{symb}$ is the number of modulation symbols per layer. The codeword-to-layer mapping for spatial multiplexing is shown in Table 2 below:

TABLE 2

| Number of layers | Number of code words | Codeword-to-layer mapping $i = 0, 1, \ldots, M^{layer}_{symb} - 1$ | |
|---|---|---|---|
| 1 | 1 | $x^{(0)}(i) = d^{(0)}(i)$ | $M^{layer}_{symb} = M^{(0)}_{symb}$ |
| 2 | 2 | $x^{(0)}(i) = d^{(0)}(i)$<br>$x^{(1)}(i) = d^{(1)}(i)$ | $M^{layer}_{symb} = M^{(0)}_{symb} = M^{(1)}_{symb}$ |
| 3 | 2 | $x^{(0)}(i) = d^{(0)}(i)$<br>$x^{(1)}(i) = d^{(1)}(2i)$<br>$x^{(2)}(i) = d^{(1)}(2i+1)$ | $M^{layer}_{symb} = M^{(0)}_{symb} = M^{(1)}_{symb}/2$ |
| 4 | 2 | $x^{(0)}(i) = d^{(0)}(2i)$<br>$x^{(1)}(i) = d^{(0)}(2i+1)$<br>$x^{(2)}(i) = d^{(1)}(2i)$<br>$x^{(3)}(i) = d^{(1)}(2i+1)$ | $M^{layer}_{symb} = M^{(0)}_{symb}/2 = M^{(1)}_{symb}/2$ |

According to Table 2, 3GPP LTE supports transmission of the maximum of two multiple codewords with respect to the maximum of four layers.

In a spatial multiplexing system with a low PAPR, precoding matrices that can lower the PAPR may be selected/combined according to the number of transmission antennas, the number of codewords, and the number of ranks. Hereinafter, available precoding matrixes in case of two and four transmission antennas, in case of SCW and MCW, and in case of ranks 2, 3, and 4 will be described. In the identity matrix $I_i$, the permutation matrix $P_{ij}$, and the antenna combining matrix $C_{ij}$ constituting the precoding matrices, a subscript 'i' represents the number of ranks and 'j' represents the index of matrix.

* * *

I. In Case of Two Transmission Antennas

Figure 3:
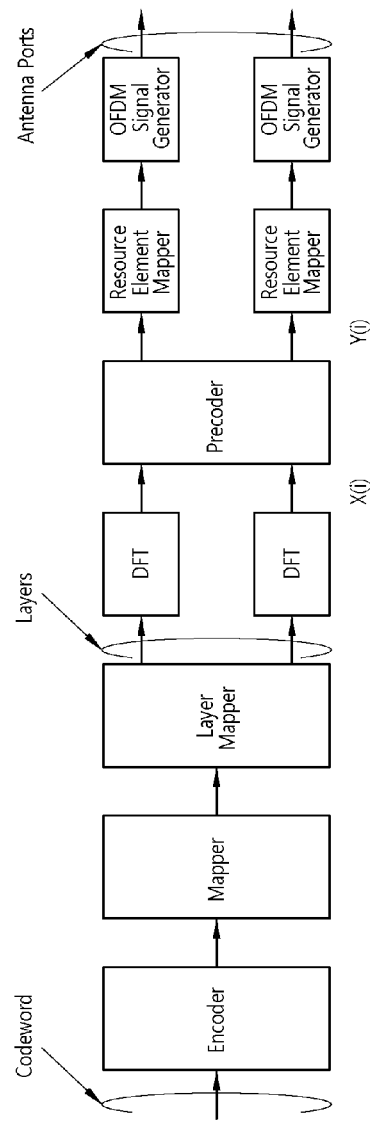
FIG. 3 is a schematic block diagram of a transmitter that transmits a single codeword at a rank 2.
Figure 4:
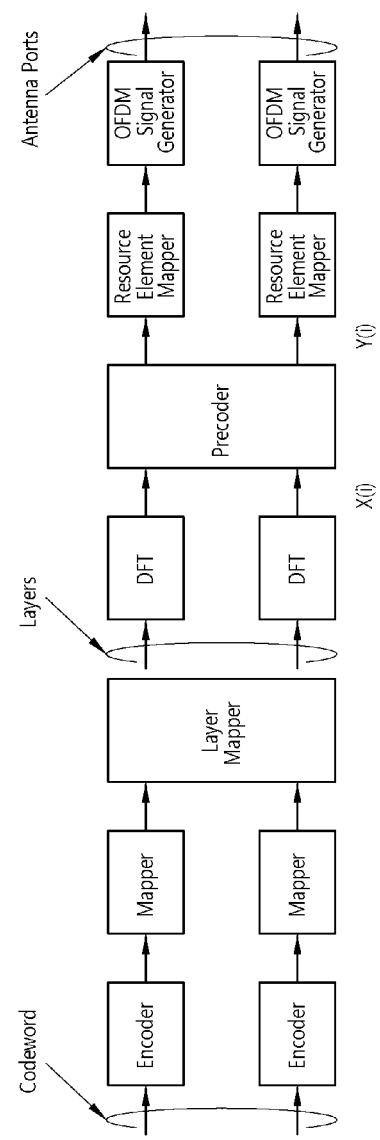
FIG. 4 is a schematic block diagram of a transmitter that transmits two codewords at the rank 2.

FIG. 3 is a schematic block diagram of a transmitter that transmits a single codeword at a rank 2, and FIG. 4 is a schematic block diagram of a transmitter that transmits two codewords at the rank 2. With reference to FIGS. 2 and 3, when there are two transmission antennas, rank 1 or 2 transmission is possible, and a mapping relation is formed between virtual antennas and the physical antennas by Equation 2 shown below:

[Math. 2]

$$\begin{bmatrix} y^0(i) \\ y^1(i) \end{bmatrix} = W(i) \begin{bmatrix} x^0(i) \\ x^1(i) \end{bmatrix}$$  MathFigure 2 where i=0, 1, ..., $M^{ap}_{symb}-1$ and $M^{ap}_{symb} = M^{layer}_{symbol}$.

In an exemplary embodiment of the present invention, the precoding matrix W(i) may be selected from an identity matrix $I_2 = P_{21} = \{\{1,0\},\{0,1\}\}$ or a permutation matrix $P_{22} = \{\{0,1\},\{1,0\}\}$. When the number of the plurality of transmission antennas and the size of the rank are equal, the precoding matrix may be an identity matrix or a permutation matrix that maps the plurality of transmission antennas to the virtual antennas in a one-to-one manner. For example, in case of transmitting only a single codeword, the codeword is transmitted via two layers, so the codeword experiences an average channel of the two layers. Thus, the identity matrix $I_2$ is selected as the precoding matrix W(i). For another example, in case of transmitting multiple codewords, two codewords are transmitted via two layers. In this case, in order for the two codewords to experience both the two layers, the permutation matrix is used. As the permutation matrix, different permutation matrixes by SC-FDMA symbols or by slots, namely, groups of SC-FDMA symbols, may be used as represented by Equation 3 shown below. The number of SC-FDMA symbols included in a slot may vary depending on the length of a cyclic prefix (CP) of the SC-FDMA symbols, and it may be 6 or 7.

MathFigure 3

$$W(i) = P_k \quad [\text{Math.3}]$$

where i=0, 1, ..., $M^{ap}_{symb}-1$, $M^{ap}_{symb} = M^{layer}_{symbol}$, $P_k$, a permutation matrix, is $P_1 = P_{21}$, $P_2 = P_{22}$, $k = \text{mod}(s,2)+1$, $k = 1, 2$ and s is the index of SD-FDMA symbol or slot.

In the exemplary embodiment of the present invention, the method of permutating codewords of two layers may be performed in units of the SC-FDMA symbols or in units of the slots, namely, the groups of SC-FDMA symbols, according to a defined rule, without using a permutation matrix, and it has an equivalent effect as that of the method using a permutation matrix. Permutating of codeword(s) may be performed before or after discrete Fourier transform (DFT) is performed on a layer-mapped symbol stream.

II. In Case of Four Transmission Antennas

Figure 5:
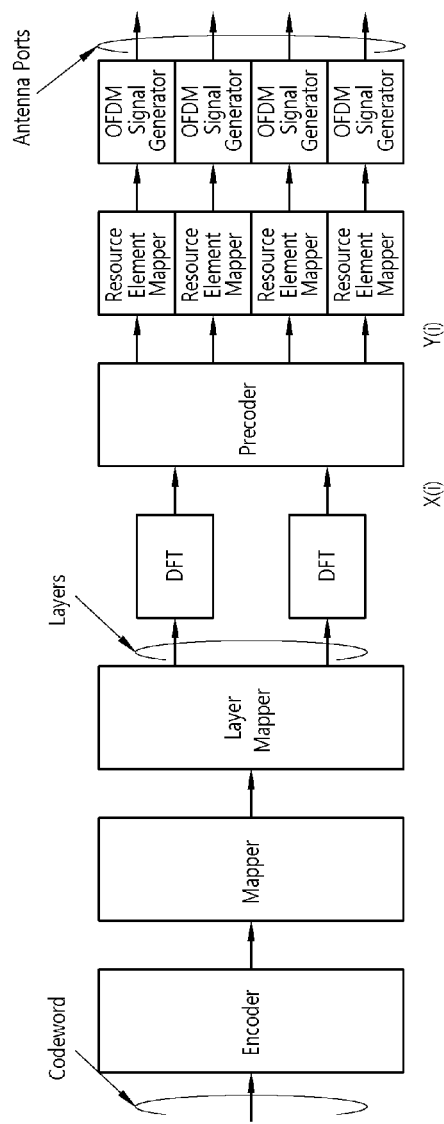
FIG. 5 is a schematic block diagram of a transmitter that transmits a single codeword at the rank 2.
Figure 6:
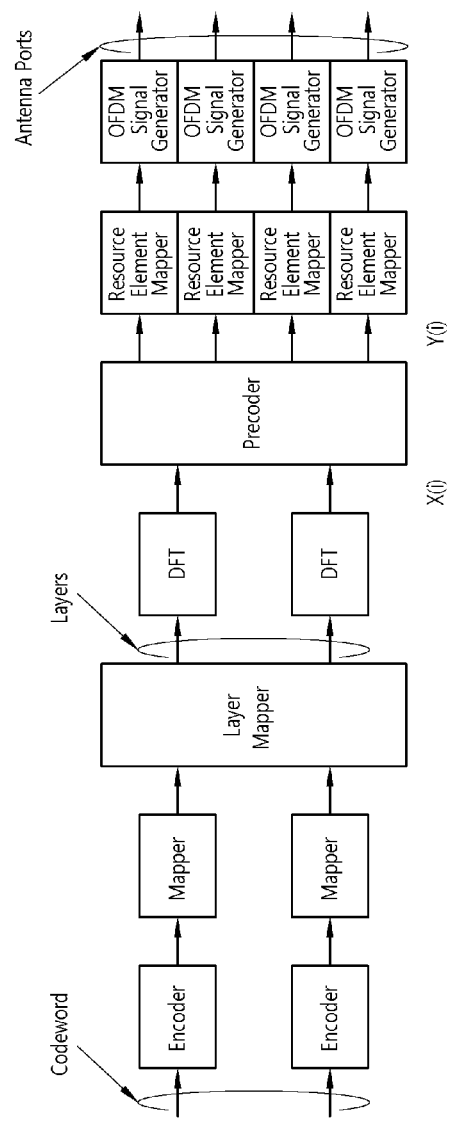
FIG. 6 is a schematic block diagram of a transmitter that transmits two codewords at the rank 2.
Figure 7:
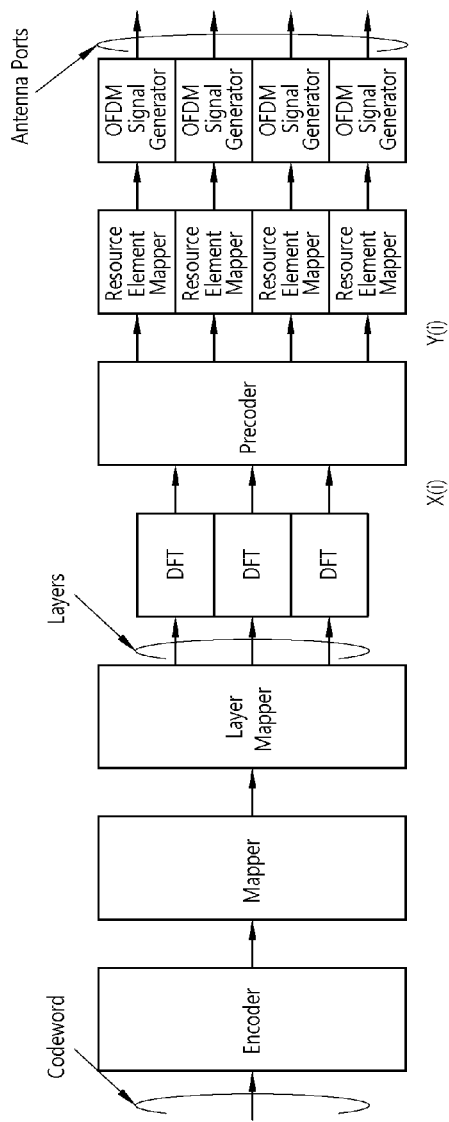
FIG. 7 is a schematic block diagram of a transmitter that transmits a single codeword at the rank 3.
Figure 8:
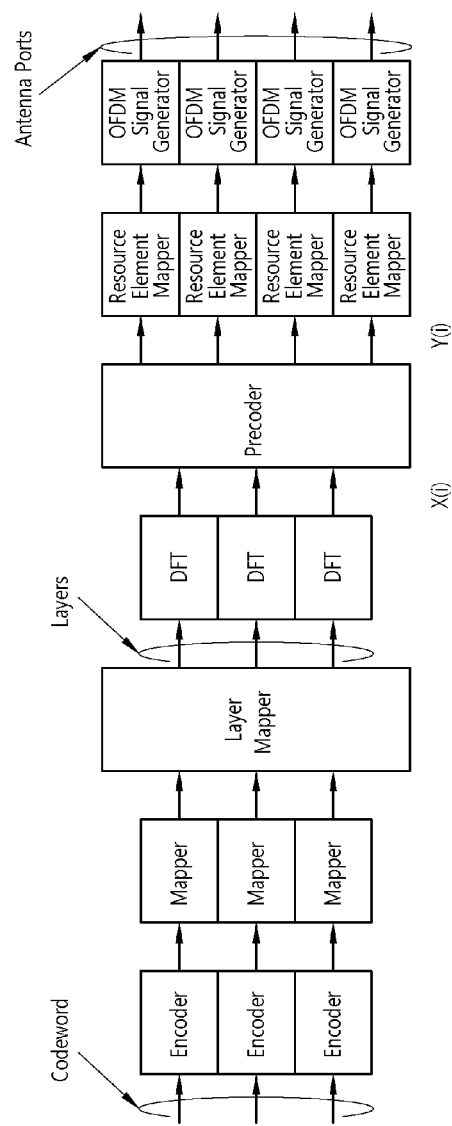
FIG. 8 is a schematic block diagram of a transmitter that transmits three codewords at the rank 3.
Figure 9:
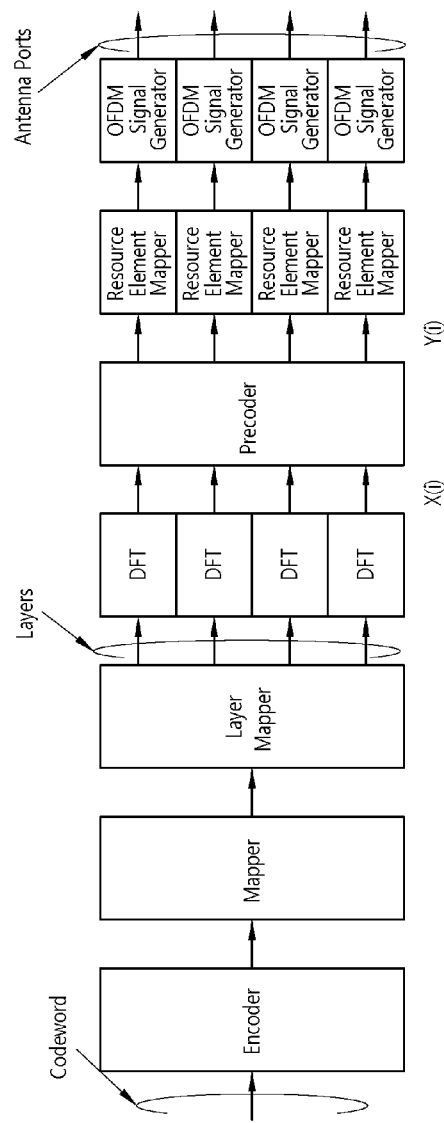
FIG. 9 is a schematic block diagram of a transmitter that transmits a single codeword at the rank 4.
Figure 10:
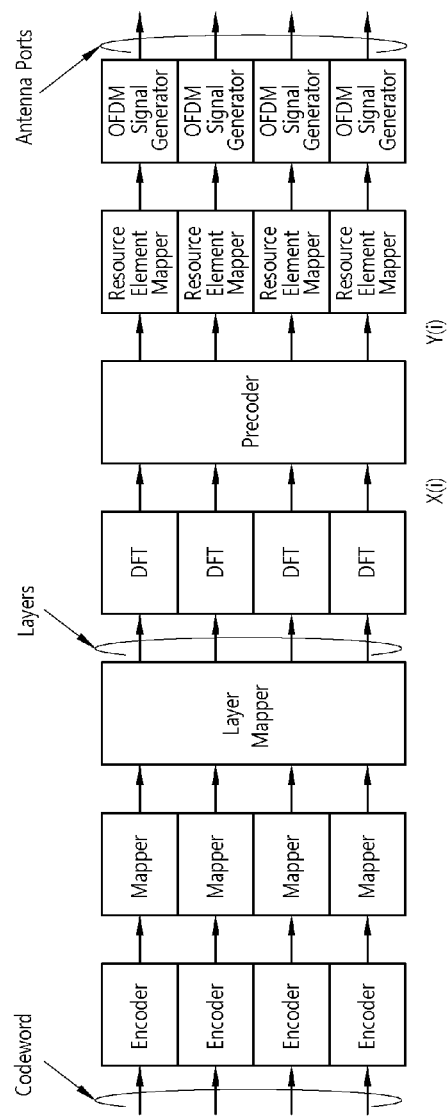
FIG. 10 is a schematic block diagram of a transmitter that transmits four codewords at the rank 4.

FIG. 5 is a schematic block diagram of a transmitter that transmits a single codeword at the rank 2. FIG. 6 is a schematic block diagram of a transmitter that transmits two codewords at the rank 2. FIG. 7 is a schematic block diagram of a transmitter that transmits a single codeword at the rank 3. FIG. 8 is a schematic block diagram of a transmitter that transmits three codewords at the rank 3. FIG. 9 is a schematic block diagram of a transmitter that transmits a single codeword at the rank 4. FIG. 10 is a schematic block diagram of a transmitter that transmits four codewords at the rank 4. Each case will be described with reference to FIGS. 5 to 10.

If there are four transmission antennas, rank 1 to rank 4 transmission is possible. This may be represented by Equation 4 shown below:

[Math. 4]

$$\begin{bmatrix} y^0(i) \\ y^1(i) \\ y^2(i) \\ y^3(i) \end{bmatrix} = W(i) \begin{bmatrix} x^0(i) \\ \ldots \\ x^{\nu-1}(i) \end{bmatrix} \quad \text{MathFigure 4}$$

where i=0, 1, . . . , $M^{ap}_{symb}-1$, $M^{ap}_{symb}$ and υ is the number of layers, υ=0, 1, . . . , V−1. In an SC-FDMA system having four transmission antennas, in order to have a PAPR as low as a transmission level of a single transmission antenna, the precoding matrix W(i) may be configured by selecting or combining the identity matrix, the permutation matrix, the antenna combining matrix, and the antenna hopping matrix. First, the case of the rank 2 will now be described.

(1) In Case of the Rank 2

When a rank 2 transmission is performed by using four transmission antennas, basically, two transmission antennas are mapped to one layer. Accordingly, a rank 2 precoding matrix may be configured such that the two transmission antennas mapped to one layer are combined by using an antenna combining vector with a certain phase, and over the entire four transmission antennas, the two transmission antennas are arbitrarily selected. Combining of the two transmission antennas by using the antenna combining vector with a certain phase refers to phase-shifting a signal of at least one transmission antenna by an element of the precoding matrix. Thus, the at least one transmission antenna and a transmission antenna that transmits a signal obtained by phase-shifting the signal of the at least one transmission antenna are mapped to the same virtual antenna.

① In case of using an antenna combining matrix as a precoding matrix in transmission of a single codeword: One of $C_{21}$, $C_{22}$, and $C_{23}$ of the matrixes in Table 3 or any of their combinations may be used as a precoding matrix.

In order to obtain a diversity gain through combining, the three matrixes may be changed to SC-FDMA symbols or slots so as to be used. When a single codeword is transmitted via a spatial channel with a low correlation, the codeword experiences every spatial channel, so no matter which precoding matrix is selected, a similar performance is obtained. Meanwhile, if transmission antennas each have different channel estimation performance, antenna paring may be performed to make channel estimation performance of each transmission antenna similar to thus make degradation of performance according to channel estimation alike. For example, if channel estimation performance of first and second transmission antennas is superior to that of the third and fourth transmission antennas, an antenna combining matrix that pairs the first and third transmission antennas and the second and fourth transmission antennas is used to make the respective paired transmission antennas have the similar transmission performance. Also, in a spatial channel in which correlations of transmission antennas are different, a precoding matrix may be selected in consideration of antenna correlation. For example, if the first and second transmission antennas have a high correlation, while correlation between the first and second transmission antennas and correlation between the third and fourth transmission antennas are low, an antenna combining matrix that pairs the first and second transmission antennas and pairs the third and fourth transmission antennas may be used to enhance the spatial multiplexing performance between combined antennas.

② In case of using an antenna hopping matrix as a precoding matrix in transmission of a single codeword: The number of transmission antennas mapped to a single subcarrier is limited to two. If it is assumed that two subcarriers are allocated, first and second transmission antennas may transmit data by using a first subcarrier, and third and fourth transmission antennas may transmit data by using a second subcarrier. In this case, the rank 2 transmission is performed at each subcarrier. Four virtual antennas perform DFT spreading on the transmission signals, and two-layer transmission is performed at a single subcarrier through resource mapping. A low PAPR can be obtained when the DFT-spread signal is mapped in the form of a localized allocation or interleaved allocation. Thus, as noted in Table 4 shown below, when the spread signal is mapped, it is mapped in the form of localized allocation or interleaved allocation within assigned resource blocks in a resource element mapping step of each transmission antenna.

TABLE 3

| (1) 1,2/3,4 | (2) 1,3/2,4 | (3) 1,4/2,3 |
|---|---|---|
| $C_{21} = \begin{bmatrix} a & 0 \\ be^{j\theta_k} & 0 \\ 0 & a \\ 0 & be^{j\theta_l} \end{bmatrix}$ | $C_{22} = \begin{bmatrix} a & 0 \\ 0 & a \\ be^{j\theta_k} & 0 \\ 0 & be^{j\theta_l} \end{bmatrix}$ | $C_{23} = \begin{bmatrix} a & 0 \\ 0 & a \\ 0 & be^{j\theta_k} \\ be^{j\theta_k} & 0 \end{bmatrix}$ |

$a = b = \frac{1}{\sqrt{2}}$, $\theta_k$, $\theta_l$ : phase

TABLE 4

| Localized Mapping | | | | Interleaved Mapping | | | |
|---|---|---|---|---|---|---|---|
| Tx 1 | Tx 2 | Tx 3 | Tx 4 | Tx 1 | Tx 2 | Tx 3 | Tx 4 |
| 1 | 2 | 0 | 0 | 1 | 2 | 0 | 0 |
| 1 | 2 | 0 | 0 | 0 | 0 | 3 | 4 |
| . | . | . | . | 1 | 2 | 0 | 0 |
| . | . | . | . | 0 | 0 | 3 | 4 |
| . | . | . | . | . | . | . | . |
| 1 | 2 | 0 | 0 | . | . | . | . |
| 1 | 2 | 0 | 0 | . | . | . | . |
| 0 | 0 | 3 | 4 | 1 | 2 | 0 | 0 |
| 0 | 0 | 3 | 4 | 0 | 0 | 3 | 4 |
| . | . | . | . | 1 | 2 | 0 | 0 |
| . | . | . | . | 0 | 0 | 3 | 4 |

TABLE 4-continued

| Localized Mapping | | | | Interleaved Mapping | | | |
|---|---|---|---|---|---|---|---|
| Tx 1 | Tx 2 | Tx 3 | Tx 4 | Tx 1 | Tx 2 | Tx 3 | Tx 4 |
| . | . | . | . | | | | |
| 0 | 0 | 3 | 4 | | | | |
| 0 | 0 | 3 | 4 | | | | |

Here, the index m is subcarrier(s) mapped to the mth transmission antenna (Tx m) (m=1, 2, 3, 4). The index 0, a null subcarrier interval, is a subcarrier which is not mapped to the mth transmission antenna. In the localized mapping, a certain number of subcarriers represented by 1 are mapped to the first transmission antenna (Tx 1), and a certain number of subcarriers represented by 2 are mapped to the second transmission antenna (Tx 2). The same subcarriers of a certain frequency band are mapped to the first and second transmission antennas. Meanwhile, in the interleaved mapping, one of every two subcarriers is mapped to each transmission antenna. And, the same subcarrier is mapped to the first and second transmission antennas.

Six combinations ($H_1$ to $H_6$) of pairs of two transmission antennas mapped to one subcarrier may be considered as shown in Table 5 below:

TABLE 5

| | $H_1$ | $H_2$ | $H_3$ | $H_4$ | $H_5$ | $H_6$ |
|---|---|---|---|---|---|---|
| Exclusive AH matrix pair | (1,2) (3,4) | (1,3) (2,4) | (1,4) (2,3) | (2,3) (1,4) | (2,4) (1,3) | (3,4) (1,2) |

Table 5 above shows exclusive transmission antenna pairs (i.e., exclusive AH matrix pairs). A combination H1 includes (1,2) as a pair of antennas and (3,4) as another exclusive pair of antennas. The same subcarrier is mapped to each pair. Meanwhile, the pairs of antennas may be differently combined by SC-FDMA symbols or slots. For example, $H_1$ may be used for a first slot and $H_6$ may be used for a second slot to obtain a frequency diversity gain. For another example, H1 to H6 may be equally (i.e., indiscriminately, evenly, fairly) used for first to sixth SC-FDMA symbols to obtain the frequency diversity gain and a diversity gain with respect to antenna pairing.

Figure 11:
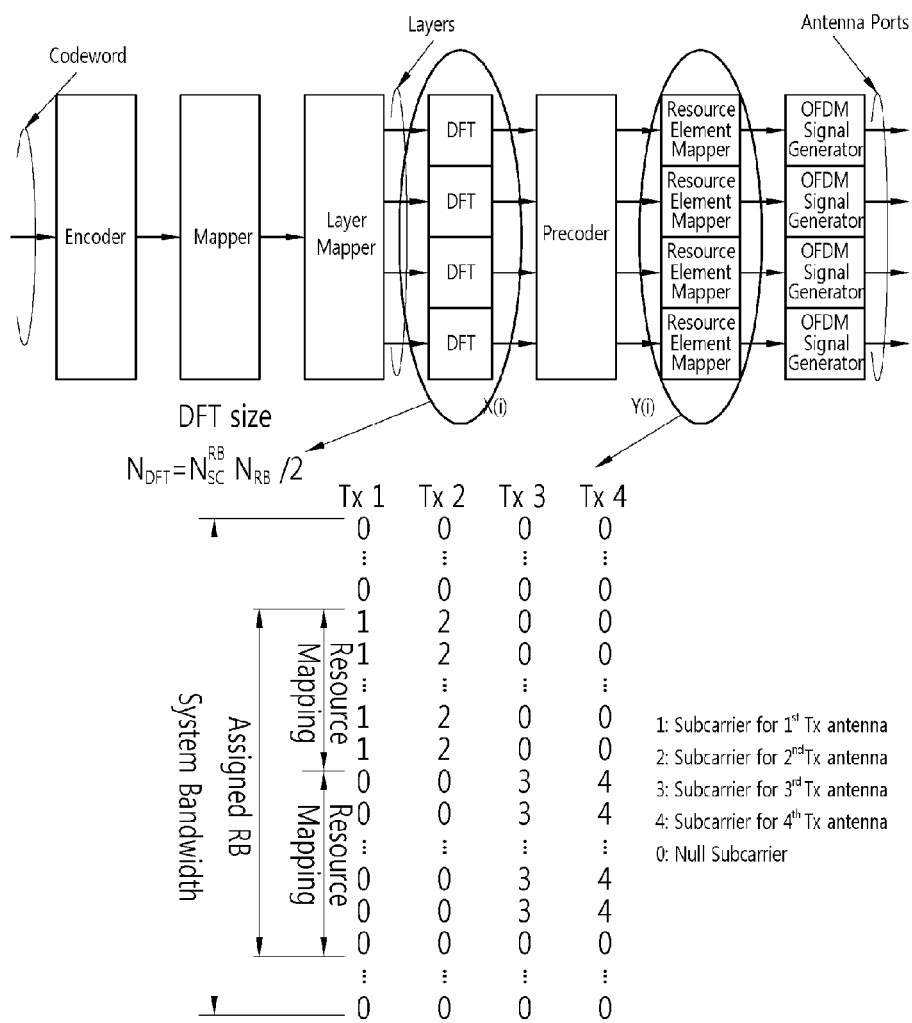
FIG. 11 illustrates a subcarrier mapping method in a single codeword transmission according to an exemplary embodiment of the present invention.

FIG. 11 illustrates a subcarrier mapping method in a single codeword transmission according to an exemplary embodiment of the present invention.

With reference to FIG. 11, in an overall system bandwidth, a half of the assigned resource block have subcarriers represented by the index 1 or 2, and another half includes subcarriers represented by the index 3 or 4. That is, the subcarriers are allocated to each transmission antenna in the localized allocation form. The subcarrier represented by the index m refers to a subcarrier mapped to the mth transmission antenna (i.e., subcarrier for mth Tx antenna). Meanwhile, the subcarrier represented by the index 1 and the subcarrier represented by the index 2 are the same. Likewise, the subcarrier represented by the index 3 and the subcarrier represented by the index 4 are the same. Because the resource block is halved so as to be used for transmission of the two virtual antennas, respectively, a half (($N^{RB}_{SC}N_{RB}/2$) of the number ($NRB_{sc}$) of the entire subcarriers of the assigned resource block ($N_{RB}$) may be used as a size of DFT ($N_{DFT}$).

③ In case of including an antenna combining matrix to a precoding matrix and using the same: One of antenna combining matrixes as shown in Table 6 below may be included in a precoding matrix such that layer swapping is performed by SC-FDMA symbols or slots by a permutation matrix to allow two virtual antennas to experience an average spatial channel. Or, one of the antenna combining matrixes as shown in Table 6 below may be included in a precoding matrix, and one of permutation matrixes may be fixedly used to allow two virtual antennas to experience a particular spatial channel.

TABLE 6

| (1) 1,2/3,4 | (2) 1,3/2,4 | (3) 1,4/2,3 |
|---|---|---|
| $C_{21} = \begin{bmatrix} a & 0 \\ be^{j\theta_k} & 0 \\ 0 & a \\ 0 & be^{j\theta_l} \end{bmatrix}$ | $C_{22} = \begin{bmatrix} a & 0 \\ 0 & a \\ be^{j\theta_k} & 0 \\ 0 & be^{j\theta_l} \end{bmatrix}$ | $C_{23} = \begin{bmatrix} a & 0 \\ 0 & a \\ 0 & be^{j\theta_l} \\ be^{j\theta_k} & 0 \end{bmatrix}$ |

$a = b = \frac{1}{\sqrt{2}}, \theta_k, \theta_l$ : phase

With reference to Table 6, various matrix combinations may be configured according to phases, which can be formularized by Equation 5 shown below:

MathFigure 5
$$W(i)=C(i)P_k \quad [\text{Math.5}]$$

where i=0, 1, . . . , $M^{ap}_{symb}-1$, $M^{ap}_{symb}=M^{layer}_{symbol}$, $P_k=P_{2k}$, k=mod(s,2)+1, k=1, 2, s is index of SC-FDMA symbol or slot, and $C(i) \in \{C_{21}, C_{22}, C_{23}\}$. Antennas may be selectively combined by a single antenna combining matrix C(i), and two layers may be allowed to experience every spatial channel by $P_k$. Or, two layers may be allowed to experience a particular spatial channel by the fixed $P_k$.

For example, it is assumed that a first codeword is transmitted via a first virtual antenna, and a second codeword is transmitted via a second virtual antenna. The two virtual antennas perform layer swapping by SC-FDMA symbols or slots by the permutation matrix, and the layer-swapped symbols are mapped to one of the antenna combining precoding matrixes, which are then transmitted via a physical antenna.

In the exemplary embodiment of the present invention, the method of permutating codewords of two layers may be performed in units of the SC-FDMA symbols or in units of the slots, namely, the groups of SC-FDMA symbols, according to a defined rule, without using a permutation matrix, and it has an equivalent effect as that of the method using a permutation matrix. Permutating of codeword(s) may be performed before or after discrete Fourier transform (DFT) is performed on a layer-mapped symbol stream.

④ In case of including an antenna hopping matrix to a precoding matrix and using the same: It is assumed that a first codeword is transmitted via a first virtual antenna, and a second codeword is transmitted via a second virtual antenna. The two virtual antennas may be paired according to Table 5 shown above. Meanwhile, the pairs of antennas may be differently combined by SC-FDMA symbols or slots. For example, H1 may be used for a first slot and H6 may be used for a second slot to obtain a frequency diversity gain. For another example, $H_1$ to $H_6$ may be equally (i.e., indiscriminately, evenly, fairly) used for first to sixth SC-FDMA symbols to obtain the frequency diversity gain and a diversity gain with respect to antenna pairing.

One of antenna hopping matrixes as shown in Table 7 below may be included in a precoding matrix such that layer swapping is performed by SC-FDMA symbols or slots by a permutation matrix to allow two virtual antennas to experience an average spatial channel. Or, one of the antenna hopping matrixes as shown in Table 7 below may be included in a precoding matrix, and one of permutation matrixes may be fixedly used to allow two virtual antennas to experience a particular spatial channel.

TABLE 7

| (1) 1/2 | (2) 1/3 | (3) 1/4 |
|---|---|---|
| $\frac{1}{N}\begin{bmatrix}1&0\\0&1\\0&0\\0&0\end{bmatrix}$ | $\frac{1}{N}\begin{bmatrix}1&0\\0&0\\0&1\\0&0\end{bmatrix}$ | $\frac{1}{N}\begin{bmatrix}1&0\\0&0\\0&0\\0&1\end{bmatrix}$ |
| (4) 2/3 | (5) 2/4 | (6) 3/4 |
| $\frac{1}{N}\begin{bmatrix}0&0\\1&0\\0&1\\0&0\end{bmatrix}$ | $\frac{1}{N}\begin{bmatrix}0&0\\1&0\\0&0\\0&1\end{bmatrix}$ | $\frac{1}{N}\begin{bmatrix}0&0\\0&0\\1&0\\0&1\end{bmatrix}$ |

$N \in \{1, \sqrt{2}\}$

For example, it is assumed that a first codeword is transmitted via a first virtual antenna, and a second codeword is transmitted via a second virtual antenna. The two virtual antennas perform layer swapping by SC-FDMA symbols or slots by the permutation matrix, and the layer-swapped symbols are mapped to one of the antenna hopping precoding matrixes, which are then transmitted via a physical antenna. Or, two layers may be allowed to experience a particular spatial channel by a fixed permutation matrix.

In the exemplary embodiment of the present invention, the method of permutating codewords of two layers may be performed in units of the SC-FDMA symbols or in units of the slots, namely, the groups of SC-FDMA symbols, according to a defined rule, without using a permutation matrix, and it has an equivalent effect as that of the method using a permutation matrix. Permutating of codeword(s) may be performed before or after discrete Fourier transform (DFT) is performed on a layer-mapped symbol stream.

(2) In Case of the Rank 3

A rank 3 precoding matrix with a PAPR as low as a transmission level of a single transmission antenna may be configured by using an antenna combining matrix that combines two physical antennas by using an antenna combining vector with a certain phase or an antenna hopping matrix that selects three from four physical antennas. Combining of the two transmission antennas by using the antenna combining vector with a certain phase refers to phase-shifting a signal of at least one transmission antenna by an element of the precoding matrix. Thus, the at least one transmission antenna and a transmission antenna that transmits a signal obtained by phase-shifting the signal of the at least one transmission antenna are mapped to the same virtual antenna. Of course, the precoding matrix includes elements that map the other two remaining transmission antennas to each virtual antenna in a one-to-one manner, as well as the antenna combining elements having the certain phase-rotation vector.

① In case of using an antenna combining matrix as a precoding matrix in transmission of a single codeword: One of $C_{31}, C_{32}, C_{33}, C_{34}, C_{35}, C_{36}$ of the matrixes in Table 3 or any of their combinations may be used as a precoding matrix.

TABLE 8

| (1) 1,2,/3/4 | (2) 1,3/2/4 | (3) 1,4/2/4 |
|---|---|---|
| $C_{31} = \begin{bmatrix}a&0&0\\be^{j\theta_k}&0&0\\0&1&0\\0&0&1\end{bmatrix}$ | $C_{32} = \begin{bmatrix}a&0&0\\0&1&0\\be^{j\theta_k}&0&0\\0&0&1\end{bmatrix}$ | $C_{33} = \begin{bmatrix}a&0&0\\0&1&0\\0&0&1\\be^{j\theta_k}&0&0\end{bmatrix}$ |
| (4) 2,3/1,4 | (5) 2,4/1/3 | (6) 3,4/1/2 |
| $C_{34} = \begin{bmatrix}0&1&0\\a&0&0\\be^{j\theta_k}&0&0\\0&0&1\end{bmatrix}$ | $C_{35} = \begin{bmatrix}0&1&0\\a&0&0\\0&0&1\\be^{j\theta_k}&0&0\end{bmatrix}$ | $C_{36} = \begin{bmatrix}0&1&0\\0&0&1\\a&0&0\\be^{j\theta_k}&0&0\end{bmatrix}$ |

$a = b = \frac{1}{\sqrt{2}}, \theta_k :$ phase

With reference to Table 8, multiple matrix combinations may be configured according to phases. The six matrixes may be changed into SC-FDMA symbols or slots so as to be used in order to obtain a diversity gain through combining.

② In case of including an antenna combining matrix to a precoding matrix and using the same: One of antenna combining matrixes as shown in Table 8 above may be used as a precoding matrix, and layer swapping is performed by SC-FDMA symbols or slots by using a permutation matrix to allow three virtual antennas to experience an average spatial channel. Or, one of the antenna combining matrixes as shown in Table below may be included in a precoding matrix, and one of permutation matrixes may be fixedly used to allow three virtual antennas to experience a particular spatial channel. This can be formularized by Equation 6 shown below:

MathFigure 6

$$W(i) = C(i) P_k \quad \text{[Math.6]}$$

where $i = 0, 1, \ldots, M^{ap}_{symb} - 1$, $M^{ap}_{symb} = M^{layer}_{symbol}$, $P_k = P_{3k}$, $k = \mod(s, 6) + 1$, $k = 1, \ldots, N$, and a certain N number of matrixes may be selected from permutation matrixes and used. For example, three permutation matrixes (1), (4), and (5) in Table 9 shown below may be selectively used. s is index of SC-FDMA symbol or slot. The matrixes in Table 8 may constitute various matrix combinations according to phases, and C(i) may be selected from the matrixes of Table 8. Antennas may be selectively combined by the single antenna combining matrix C(i), and three layers may be allowed to experience every spatial channel by $P_k$. Or, three layers may be allowed to experience a particular spatial channel by the fixed $P_k$.

Table 9 below shows the permutation matrixes at the rank 3 transmission.

TABLE 9

| (1) 1/2/3 | (2) 1/3/2 | (3) 2/1/3 |
|---|---|---|
| $P_{31} = \begin{bmatrix}1&0&0\\0&1&0\\0&0&1\end{bmatrix}$ | $P_{32} = \begin{bmatrix}1&0&0\\0&0&1\\0&1&0\end{bmatrix}$ | $P_{33} = \begin{bmatrix}0&1&0\\1&0&0\\0&0&1\end{bmatrix}$ |

TABLE 9-continued

| (4) 2/3/1 | (5) 3/1/2 | (6) 3/2/1 |
|---|---|---|
| $P_{34} = \begin{bmatrix} 0 & 1 & 0 \\ 0 & 0 & 1 \\ 1 & 0 & 0 \end{bmatrix}$ | $P_{35} = \begin{bmatrix} 0 & 0 & 1 \\ 1 & 0 & 0 \\ 0 & 1 & 0 \end{bmatrix}$ | $P_{36} = \begin{bmatrix} 0 & 0 & 1 \\ 0 & 1 & 0 \\ 1 & 0 & 0 \end{bmatrix}$ |

When two or three codewords are transmitted, different antenna combining matrixes and permutation matrixes may be used by the SC-FDMA symbols or slots to allow each codeword to experience every antenna channel. Also, a fixed antenna combining matrix may be used, and different permutation matrixes may be used at SC-FDMA symbols or slots. For example, if the $C_{31}$ matrix is used, the first and second transmission antennas are combined and the third and fourth transmission antennas are separately operated, so data is transmitted via a total of three virtual antennas.

Table 10 below shows the number of physical antennas each mapped to virtual antennas according to permutation matrixes. Here, parenthesis (x,y) represents a combination of xth transmission antenna and yth transmission antenna.

TABLE 10

| number of virtual antennas | $P_{31}$ | $P_{32}$ | $P_{33}$ | $P_{34}$ | $P_{35}$ | $P_{36}$ |
|---|---|---|---|---|---|---|
| | | | number of physical antennas mapped to each virtual antenna | | | |
| 1 | (1,2) | (1,2) | 3 | 3 | 4 | 4 |
| 2 | 3 | 4 | (1,2) | 4 | (1,2) | 3 |
| 3 | 4 | 3 | 4 | (1,2) | 3 | (1,2) |

Each virtual antenna may experience the channels of first, second, third, and fourth physical antennas by the permutation matrixes. When three codewords are mapped to each layer, each codeword may experience channels of the first to fourth physical antennas.

Meanwhile, only a subset, a portion of the permutation matrixes, may be also used. For example, it is assumed that, in a system transmitting two codewords, a first codeword is mapped to a first layer, a second codeword is mapped to second and third layers, a subset of permutation matrixes is $P_{31}$, $P_{33}$, and $P_{35}$, and these three permutation matrixes are in use. Then, the first codeword may experience a channel of (the first and second physical antennas), the third, or the fourth physical antenna, and the second codeword may experience a channel of the third and fourth physical antennas, (first and second physical antennas) and the fourth physical antenna, or (first and second physical antennas) and the third physical antenna.

In this manner, in the exemplary embodiment of the present invention, the method of permutating codewords of three layers may be performed in units of the SC-FDMA symbols or in units of the slots, namely, the groups of SC-FDMA symbols, according to a defined rule, without using a permutation matrix, and it has an equivalent effect as that of the method using a permutation matrix.

(3) In Case of the Rank 4

① In case of using an antenna combining matrix as a precoding matrix in transmission of a single codeword: Because a single codeword is transmitted via four layers, it experiences an average channel regarding the four layers. Thus, the identity matrix I is used as a precoding matrix. Namely, $w(i)=I_4$.

② In case of including an antenna combining matrix to a precoding matrix and using the same: Four or two codewords are transmitted via four layers. In this case, in order to allow the multiple codewords to experience all the four layers, permutation matrixes in Table 11 shown below are added to the precoding matrix.

TABLE 11

| (1) 1/2/3/4 | (2) 2/1/3/4 | (3) 3/1/2/4 |
|---|---|---|
| $P_{401} = \begin{bmatrix} 1 & 0 & 0 & 0 \\ 0 & 1 & 0 & 0 \\ 0 & 0 & 1 & 0 \\ 0 & 0 & 0 & 1 \end{bmatrix}$ | $P_{402} = \begin{bmatrix} 0 & 1 & 0 & 0 \\ 1 & 0 & 0 & 0 \\ 0 & 0 & 1 & 0 \\ 0 & 0 & 0 & 1 \end{bmatrix}$ | $P_{403} = \begin{bmatrix} 0 & 1 & 0 & 0 \\ 0 & 0 & 1 & 0 \\ 1 & 0 & 0 & 0 \\ 0 & 0 & 0 & 1 \end{bmatrix}$ |
| (4) 4/1/2/3 | (5) 1/2/4/3 | (6) 2/1/4/3 |
| $P_{404} = \begin{bmatrix} 0 & 1 & 0 & 0 \\ 0 & 0 & 1 & 0 \\ 0 & 0 & 0 & 1 \\ 1 & 0 & 0 & 0 \end{bmatrix}$ | $P_{405} = \begin{bmatrix} 1 & 0 & 0 & 0 \\ 0 & 1 & 0 & 0 \\ 0 & 0 & 0 & 1 \\ 0 & 0 & 1 & 0 \end{bmatrix}$ | $P_{406} = \begin{bmatrix} 0 & 1 & 0 & 0 \\ 1 & 0 & 0 & 0 \\ 0 & 0 & 0 & 1 \\ 0 & 0 & 1 & 0 \end{bmatrix}$ |
| (7) 3/1/4/2 | (8) 4/1/3/2 | (9) 1/3/2/4 |
| $P_{407} = \begin{bmatrix} 0 & 1 & 0 & 0 \\ 0 & 0 & 0 & 1 \\ 1 & 0 & 0 & 0 \\ 0 & 0 & 1 & 0 \end{bmatrix}$ | $P_{408} = \begin{bmatrix} 0 & 1 & 0 & 0 \\ 0 & 0 & 0 & 1 \\ 0 & 0 & 1 & 0 \\ 1 & 0 & 0 & 0 \end{bmatrix}$ | $P_{409} = \begin{bmatrix} 1 & 0 & 0 & 0 \\ 0 & 0 & 1 & 0 \\ 0 & 1 & 0 & 0 \\ 0 & 0 & 0 & 1 \end{bmatrix}$ |
| (10) 2/3/1/4 | (11) 3/2/1/4 | (12) 4/2/1/3 |
| $P_{410} = \begin{bmatrix} 0 & 0 & 1 & 0 \\ 1 & 0 & 0 & 0 \\ 0 & 1 & 0 & 0 \\ 0 & 0 & 0 & 1 \end{bmatrix}$ | $P_{411} = \begin{bmatrix} 0 & 0 & 1 & 0 \\ 0 & 1 & 0 & 0 \\ 1 & 0 & 0 & 0 \\ 0 & 0 & 0 & 1 \end{bmatrix}$ | $P_{412} = \begin{bmatrix} 0 & 0 & 1 & 0 \\ 0 & 1 & 0 & 0 \\ 0 & 0 & 0 & 1 \\ 1 & 0 & 0 & 0 \end{bmatrix}$ |
| (13) 1/3/4/2 | (14) 2/3/4/1 | (15) 3/2/4/1 |
| $P_{413} = \begin{bmatrix} 1 & 0 & 0 & 0 \\ 0 & 0 & 0 & 1 \\ 0 & 1 & 0 & 0 \\ 0 & 0 & 1 & 0 \end{bmatrix}$ | $P_{414} = \begin{bmatrix} 0 & 0 & 0 & 1 \\ 1 & 0 & 0 & 0 \\ 0 & 1 & 0 & 0 \\ 0 & 0 & 1 & 0 \end{bmatrix}$ | $P_{415} = \begin{bmatrix} 0 & 0 & 0 & 1 \\ 0 & 1 & 0 & 0 \\ 1 & 0 & 0 & 0 \\ 0 & 0 & 1 & 0 \end{bmatrix}$ |
| (16) 4/2/3/1 | (17) 1/4/2/3 | (18) 2/4/1/3 |
| $P_{416} = \begin{bmatrix} 0 & 0 & 0 & 1 \\ 0 & 1 & 0 & 0 \\ 0 & 0 & 1 & 0 \\ 1 & 0 & 0 & 0 \end{bmatrix}$ | $P_{417} = \begin{bmatrix} 1 & 0 & 0 & 0 \\ 0 & 0 & 1 & 0 \\ 0 & 0 & 0 & 1 \\ 0 & 1 & 0 & 0 \end{bmatrix}$ | $P_{418} = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$ |
| (19) 3/4/1/2 | (20) 4/3/1/2 | (21) 1/4/3/2 |
| $P_{419} = \begin{bmatrix} 0 & 0 & 1 & 0 \\ 0 & 0 & 0 & 1 \\ 1 & 0 & 0 & 0 \\ 0 & 1 & 0 & 0 \end{bmatrix}$ | $P_{420} = \begin{bmatrix} 0 & 0 & 1 & 0 \\ 0 & 0 & 0 & 1 \\ 0 & 1 & 0 & 0 \\ 1 & 0 & 0 & 0 \end{bmatrix}$ | $P_{421} = \begin{bmatrix} 1 & 0 & 0 & 0 \\ 0 & 0 & 0 & 1 \\ 0 & 0 & 1 & 0 \\ 0 & 1 & 0 & 0 \end{bmatrix}$ |
| (22) 2/4/3/1 | (23) 3/4/2/1 | (24) 4/3/2/1 |
| $P_{422} = \begin{bmatrix} 0 & 0 & 0 & 1 \\ 1 & 0 & 0 & 0 \\ 0 & 0 & 1 & 0 \\ 0 & 1 & 0 & 0 \end{bmatrix}$ | $P_{423} = \begin{bmatrix} 0 & 0 & 0 & 1 \\ 0 & 0 & 1 & 0 \\ 1 & 0 & 0 & 0 \\ 0 & 1 & 0 & 0 \end{bmatrix}$ | $P_{424} = \begin{bmatrix} 0 & 0 & 0 & 1 \\ 0 & 0 & 1 & 0 \\ 0 & 1 & 0 & 0 \\ 1 & 0 & 0 & 0 \end{bmatrix}$ |

The permutation matrixes may be changed in units of the SC-FDMA symbols or in units of the slots, which may be formularized by Equation 7 shown below:

MathFigure 7

$$W(i)=P_k \quad [\text{Math.7}]$$

where i=0, 1, ..., $M^{ap}_{symb}-1$, $M^{ap}_{symb}=M^{layer}_{symbol}$, $P_k$ is a permutation matrix, $P_k=P_{4k}$, k=mod(s,24)+1, k=1, ..., N and a certain number of permutation matrixes may be used. s is index of SC-FDMA symbol or slot. Some of 24 permutation matrixes may be selected to generate a subset and only the permutation matrixes of the subset may be used. For example, in a system transmitting four codewords at the rank 4, four permutation matrixes $P_{401}$, $P_{414}$, $P_{419}$, $P_{404}$ may be properly used to allow each codeword to experience all of the four layers (or physical antenna channels). This may be formularized by Equation 8 shown below:

MathFigure 8

$$W(i)=P_k \quad [\text{Math.8}]$$

where i=0, 1, ..., $M^{ap}_{symb}-1$, $M^{ap}_{symb}=M^{layer}_{symbol}$, $P_k=P_{4k}$, $P_{4k}\in\{P_{401}, P_{419}, P_{414}, P_{404}\}$, k=mod(s,N)+1, k=1, 2, 3, s is index of SC-FDMA or slot. When s is the index of SC-FDMA symbol, N=4, and when s is the index of slot, N=2.

For another example, in a system transmitting two codewords at the rank 4, two permutation matrixes $P_{401}$, $P_{419}$ may be properly used to allow each codeword to experience all of the four layers (or physical antenna channels). This may be formularized by Equation 9 shown below:

MathFigure 9

$$W(i)=P_k \quad [\text{Math.9}]$$

where i=0, 1, ..., $M^{ap}_{symb}-1$, $M^{ap}_{symb}=M^{layer}_{symbol}$, $P_k=P_{4k}$, $P_{4k}\in\{P_{401}, P_{419}\}$, k=mod(s,2)+1, k=1, 2, and s is index of SC-FDMA symbol or slot.

<Cycling on OFDM Symbol Boundary and Slot Boundary>

Permutation in units of SC-FDMA symbols or OFDM symbols is called a cycling on OFDM symbol boundary. The OFDM symbol boundary is a minimum time interval to which the cycling scheme of a precoding matrix can be applicable without degrading the gain of a single carrier. As the chances of changing precoding matrix increase, a diversity gain increases, so a high performance can be obtained if a demodulation issue is not counted. In this respect, however, because precoding matrixes applied to data may be different for each OFDM symbol, a reference signal for discriminating channels must be provided at each antenna. Namely, a sequence of a reference signal of low transmission power must be transmitted at each antenna. The transmission power of the reference signal is reduced according to the total number of active antennas, and as the number of active antennas increases, a channel estimation performance at a receiver may deteriorate. The overall processing performance having a high diversity gain and an insufficient channel estimation may be determined by the structure of a used codebook and a channel environment.

Permutation in units of slots is called cycling on slot boundary. If precoding matrixes are cycled on the slot boundary, it can well suit a PUSCH resource structure of the 3GPP LTE system in which resource block slot hopping is available. Because a single precoding matrix is used for every DFT-s-OFDM symbol during a slot interval, overhead of a reference symbol does not need to be increased up to 4 demodulation reference signals (DM RS). The number of required DM RSs may vary according to the precoding structure, but the total number of required DM RS may be reduced to a non-channel dependent (NCD) spatial multiplexing (SM) rank. Because only two precoding matrixes are used per subframe, the diversity gain may not be sufficient to achieve an optimum processing performance. Channel estimation may be strengthened according to precoding RS transmission.

In order to perform rank 2 transmission while maintaining a low cubic matric (CM) or a low PAPR in an SC-FDMA or DFT-s-OFDM system in which four-transmission antenna (4Tx) transmission is performed, the precoding matrixes as represented by Equation 10 shown below may be used:

[Math. 10]

$$W_1 = \frac{1}{\sqrt{2}}\begin{bmatrix} a & 0 \\ b & 0 \\ 0 & c \\ 0 & d \end{bmatrix},$$

$$W_2 = \frac{1}{\sqrt{2}}\begin{bmatrix} a & 0 \\ 0 & b \\ c & 0 \\ 0 & d \end{bmatrix},$$

$$W_3 = \frac{1}{\sqrt{2}}\begin{bmatrix} a & 0 \\ 0 & b \\ 0 & c \\ d & 0 \end{bmatrix}$$

$$W_4 = \frac{1}{\sqrt{2}}\begin{bmatrix} 0 & a \\ 0 & b \\ c & 0 \\ d & 0 \end{bmatrix},$$

$$W_5 = \frac{1}{\sqrt{2}}\begin{bmatrix} 0 & a \\ b & 0 \\ 0 & c \\ d & 0 \end{bmatrix},$$

$$W_6 = \frac{1}{\sqrt{2}}\begin{bmatrix} 0 & a \\ b & 0 \\ c & 0 \\ 0 & d \end{bmatrix}$$

MathFigure 10

In transmitting multiple codewords, precoding may be performed on data $S_1$ and $S_2$ as represented by Equation 11 shown below:

[Math. 11]

$$X = WS = W\begin{bmatrix} S_1 \\ S_2 \end{bmatrix}$$

MathFigure 11

When the antenna coupling matrix as represented by Equation 10 is in use, data symbols are mapped to antennas determined by precoding matrixes, and in this case, if the position alteration of the data $S_1$ and $S_2$ is allowed, the precoding matrix $W_1$ and $W_4$, $W_2$ and $W_5$, and $W_3$ and $W_6$ are equivalent.

Data symbols may be outputted from any one of an encoder, a layer mapper, a DFT block, a transmission block.

Thus, precoding matrixes may be configured by using the antenna coupling matrixes (or antenna selecting matrixes) in the form of $W_1$, $W_2$, and $W_3$.

In Equation 10, a, b, c, and d may be included by the same value as $e^{j\theta k+\phi}$. In this case, 'θ' and 'φ' may be independent values for a, b, c, and D. 'k' may represent a resource element index, a resource element group index, a resource block index, an OFDM symbol index, a slot index, a subframe index, a frame index, a superframe index, and the like. θ may be a value corresponding to a time domain sample of a transmission signal. With reference to a, b, c, and d, θ may be represented by $\theta_a=2\pi\tau_a/N$, $\theta_b=2\pi\tau_b/N$, $\theta_c=2\pi\tau_c/N$, and $\theta_d=2\pi\tau_d/N$.

In equation 10, a, b, c, and d may be represented in limited alphabets such as ±1, ±j etc. Namely, the alphabets in the precoding matrixes may be represented in a QPSK manner. Equation 12 below shows a type of precoding matrix in the QPSK scheme that can be used in the '4Tx rank 2 transmission.

[Math. 12]

$$\begin{bmatrix} \pm 1, \pm j & 0 \\ \pm 1, \pm j & 0 \\ 0 & \pm 1, \pm j \\ 0 & \pm 1, \pm j \end{bmatrix} \begin{bmatrix} \pm 1, \pm j & 0 \\ 0 & \pm 1, \pm j \\ \pm 1, \pm j & 0 \\ 0 & \pm 1, \pm j \end{bmatrix} \begin{bmatrix} \pm 1, \pm j & 0 \\ 0 & \pm 1, \pm j \\ 0 & \pm 1, \pm j \\ \pm 1, \pm j & 0 \end{bmatrix} \quad \text{MathFigure 12}$$

Table 12 below shows an example of 16 types of precoding matrixes selected from Equation 12,

TABLE 12

$$W_1 = \frac{1}{\sqrt{2}}\begin{bmatrix} 1 & 0 \\ 1 & 0 \\ 0 & 1 \\ 0 & -j \end{bmatrix} \quad W_2 = \frac{1}{\sqrt{2}}\begin{bmatrix} 1 & 0 \\ -j & 0 \\ 0 & 1 \\ 0 & 1 \end{bmatrix}$$

$$W_3 = \frac{1}{\sqrt{2}}\begin{bmatrix} 1 & 0 \\ 0 & 1 \\ 1 & 0 \\ 0 & 1 \end{bmatrix} \quad W_4 = \frac{1}{\sqrt{2}}\begin{bmatrix} 1 & 0 \\ 0 & 1 \\ 1 & 0 \\ 0 & -1 \end{bmatrix}$$

$$W_5 = \frac{1}{\sqrt{2}}\begin{bmatrix} 1 & 0 \\ 0 & 1 \\ 0 & 1 \\ 1 & 0 \end{bmatrix} \quad W_6 = \frac{1}{\sqrt{2}}\begin{bmatrix} 1 & 0 \\ 0 & 1 \\ 0 & 1 \\ -1 & 0 \end{bmatrix}$$

$$W_7 = \frac{1}{\sqrt{2}}\begin{bmatrix} 1 & 0 \\ 1 & 0 \\ 0 & 1 \\ 0 & j \end{bmatrix} \quad W_8 = \frac{1}{\sqrt{2}}\begin{bmatrix} 1 & 0 \\ -j & 0 \\ 0 & 1 \\ 0 & -1 \end{bmatrix}$$

TABLE 12-continued $$W_9 = \frac{1}{\sqrt{2}}\begin{bmatrix} 1 & 0 \\ -1 & 0 \\ 0 & 1 \\ 0 & j \end{bmatrix} \quad W_{10} = \frac{1}{\sqrt{2}}\begin{bmatrix} 1 & 0 \\ j & 0 \\ 0 & 1 \\ 0 & -1 \end{bmatrix}$$

$$W_{11} = \frac{1}{\sqrt{2}}\begin{bmatrix} 1 & 0 \\ 0 & 1 \\ -1 & 0 \\ 0 & 1 \end{bmatrix} \quad W_{12} = \frac{1}{\sqrt{2}}\begin{bmatrix} 1 & 0 \\ 0 & 1 \\ -1 & 0 \\ 0 & -1 \end{bmatrix}$$

$$W_{13} = \frac{1}{\sqrt{2}}\begin{bmatrix} 1 & 0 \\ 0 & 1 \\ 0 & 1 \\ -1 & 0 \end{bmatrix} \quad W_{14} = \frac{1}{\sqrt{2}}\begin{bmatrix} 1 & 0 \\ 0 & 1 \\ 0 & -1 \\ -1 & 0 \end{bmatrix}$$

$$W_{15} = \frac{1}{\sqrt{2}}\begin{bmatrix} 1 & 0 \\ -1 & 0 \\ 0 & 1 \\ 0 & -j \end{bmatrix} \quad W_{16} = \frac{1}{\sqrt{2}}\begin{bmatrix} 1 & 0 \\ j & 0 \\ 0 & 1 \\ 0 & 1 \end{bmatrix}$$

In Table 12, the precoding matrixes for combining transmission antennas (1,2) (3,4) are as represented by Equation 13 shown below:

[Math. 13]

$$W_1 = \frac{1}{\sqrt{2}}\begin{bmatrix} 1 & 0 \\ 1 & 0 \\ 0 & 1 \\ 0 & -j \end{bmatrix} W_2 = \frac{1}{\sqrt{2}}\begin{bmatrix} 1 & 0 \\ -j & 0 \\ 0 & 1 \\ 0 & 1 \end{bmatrix} \quad \text{MathFigure 13}$$

$$W_7 = \frac{1}{\sqrt{2}}\begin{bmatrix} 1 & 0 \\ 1 & 0 \\ 0 & 1 \\ 0 & j \end{bmatrix} W_8 = \frac{1}{\sqrt{2}}\begin{bmatrix} 1 & 0 \\ -j & 0 \\ 0 & 1 \\ 0 & -1 \end{bmatrix}$$

$$W_9 = \frac{1}{\sqrt{2}}\begin{bmatrix} 1 & 0 \\ -1 & 0 \\ 0 & 1 \\ 0 & j \end{bmatrix} W_{10} = \frac{1}{\sqrt{2}}\begin{bmatrix} 1 & 0 \\ j & 0 \\ 0 & 1 \\ 0 & -1 \end{bmatrix}$$

$$W_{15} = \frac{1}{\sqrt{2}}\begin{bmatrix} 1 & 0 \\ -1 & 0 \\ 0 & 1 \\ 0 & -j \end{bmatrix} W_{16} = \frac{1}{\sqrt{2}}\begin{bmatrix} 1 & 0 \\ j & 0 \\ 0 & 1 \\ 0 & 1 \end{bmatrix}$$

In Table 12, the precoding matrixes for combining transmission antennas (1,2) (3,4) are as represented by Equation 14 shown below:

[Math. 14]

$$W_3 = \frac{1}{\sqrt{2}}\begin{bmatrix} 1 & 0 \\ 0 & 1 \\ 1 & 0 \\ 0 & 1 \end{bmatrix} \quad W_4 = \frac{1}{\sqrt{2}}\begin{bmatrix} 1 & 0 \\ 0 & 1 \\ 1 & 0 \\ 0 & -1 \end{bmatrix}$$

$$W_{11} = \frac{1}{\sqrt{2}}\begin{bmatrix} 1 & 0 \\ 0 & 1 \\ -1 & 0 \\ 0 & 1 \end{bmatrix} \quad W_{12} = \frac{1}{\sqrt{2}}\begin{bmatrix} 1 & 0 \\ 0 & 1 \\ -1 & 0 \\ 0 & -1 \end{bmatrix}$$

MathFigure 14

In Table 12, the precoding matrixes for combining transmission antennas (1,2) (3,4) are as represented by Equation 15 shown below:

[Math. 15]

$$W_5 = \frac{1}{\sqrt{2}}\begin{bmatrix} 1 & 0 \\ 0 & 1 \\ 0 & 1 \\ 1 & 0 \end{bmatrix} \quad W_6 = \frac{1}{\sqrt{2}}\begin{bmatrix} 1 & 0 \\ 0 & 1 \\ 0 & 1 \\ -1 & 0 \end{bmatrix}$$

$$W_{13} = \frac{1}{\sqrt{2}}\begin{bmatrix} 1 & 0 \\ 0 & 1 \\ 0 & 1 \\ -1 & 0 \end{bmatrix} \quad W_{14} = \frac{1}{\sqrt{2}}\begin{bmatrix} 1 & 0 \\ 0 & 1 \\ 0 & -1 \\ -1 & 0 \end{bmatrix}$$

MathFigure 15

It is assumed that, in order to perform spatial multiplexing or space diversity, a first precoded signal is transmitted by using a first precoding matrix that combines a plurality of transmission antennas to a plurality of antenna groups and a second precoded signal is transmitted by using a second precoding matrix different from the first precoding matrix. In this case, in the cycling on OFDM symbol boundary, the first and second precoding matrixes are applied by SC-FDMA symbol or OFDM symbol, while in the cycling on the slot boundary, the first and second precoding matrixes are applied by slot including a plurality of SC-FDMA symbols or a plurality of OFDM symbols. In this case, the scheme for selecting the first and second precoding matrixes may be performed according to (a) a selection method in consideration of directionality of beams and (b) a selection method in consideration of antenna coupling.

The precoding matrix selection method in consideration of the directionality of beams is using mutually different precoding matrixes of the same transmission antenna coupling for first and second slots. Namely, the second precoding matrix couples the plurality of transmission antennas to the plurality of antenna groups in the same manner as that of the first precoding matrix but includes different elements. For example, mutually different precoding matrixes may be selected for the first and second slots from among precoding matrixes coupling transmission antennas (1,2) (3,4) as represented by Equation 13. Or, mutually different precoding matrixes may be selected for the first and second slots from among precoding matrixes coupling transmission antennas (1,3) (2,4) as represented by Equation 14. Or, mutually different precoding matrixes may be selected for the first and second slots from among precoding matrixes coupling transmission antennas (1,2) (3,4) as represented by Equation 15.

Equations 16 and 17 represent examples of precoding matrixes selected in consideration of directionality of beams.

[Math. 16]

$$W_1 = \frac{1}{\sqrt{2}}\begin{bmatrix} 1 & 0 \\ 1 & 0 \\ 0 & 1 \\ 0 & -j \end{bmatrix}, \quad W_2 = \frac{1}{\sqrt{2}}\begin{bmatrix} 1 & 0 \\ -j & 0 \\ 0 & 1 \\ 0 & 1 \end{bmatrix} \quad W_1 = \frac{1}{\sqrt{2}}\begin{bmatrix} 1 & 0 \\ 1 & 0 \\ 0 & 1 \\ 0 & -j \end{bmatrix}, \quad W_8 = \frac{1}{\sqrt{2}}\begin{bmatrix} 1 & 0 \\ -j & 0 \\ 0 & 1 \\ 0 & -1 \end{bmatrix}$$

$$W_1 = \frac{1}{\sqrt{2}}\begin{bmatrix} 1 & 0 \\ 1 & 0 \\ 0 & 1 \\ 0 & -j \end{bmatrix}, \quad W_9 = \frac{1}{\sqrt{2}}\begin{bmatrix} 1 & 0 \\ -1 & 0 \\ 0 & 1 \\ 0 & j \end{bmatrix} \quad W_1 = \frac{1}{\sqrt{2}}\begin{bmatrix} 1 & 0 \\ 1 & 0 \\ 0 & 1 \\ 0 & -j \end{bmatrix}, \quad W_{16} = \frac{1}{\sqrt{2}}\begin{bmatrix} 1 & 0 \\ j & 0 \\ 0 & 1 \\ 0 & 1 \end{bmatrix}$$

$$W_2 = \frac{1}{\sqrt{2}}\begin{bmatrix} 1 & 0 \\ -j & 0 \\ 0 & 1 \\ 0 & 1 \end{bmatrix}, \quad W_7 = \frac{1}{\sqrt{2}}\begin{bmatrix} 1 & 0 \\ 1 & 0 \\ 0 & 1 \\ 0 & j \end{bmatrix} \quad W_2 = \frac{1}{\sqrt{2}}\begin{bmatrix} 1 & 0 \\ -j & 0 \\ 0 & 1 \\ 0 & 1 \end{bmatrix}, \quad W_9 = \frac{1}{\sqrt{2}}\begin{bmatrix} 1 & 0 \\ -1 & 0 \\ 0 & 1 \\ 0 & j \end{bmatrix}$$

$$W_2 = \frac{1}{\sqrt{2}}\begin{bmatrix} 1 & 0 \\ -j & 0 \\ 0 & 1 \\ 0 & 1 \end{bmatrix}, \quad W_{10} = \frac{1}{\sqrt{2}}\begin{bmatrix} 1 & 0 \\ j & 0 \\ 0 & 1 \\ 0 & -1 \end{bmatrix} \quad W_{10} = \frac{1}{\sqrt{2}}\begin{bmatrix} 1 & 0 \\ j & 0 \\ 0 & 1 \\ 0 & -1 \end{bmatrix}, \quad W_{15} = \frac{1}{\sqrt{2}}\begin{bmatrix} 1 & 0 \\ -1 & 0 \\ 0 & 1 \\ 0 & -j \end{bmatrix}$$

MathFigure 16

-continued

[Math. 17]

$$W_7 = \frac{1}{\sqrt{2}}\begin{bmatrix} 1 & 0 \\ 1 & 0 \\ 0 & 1 \\ 0 & j \end{bmatrix}, \quad W_8 = \frac{1}{\sqrt{2}}\begin{bmatrix} 1 & 0 \\ -j & 0 \\ 0 & 1 \\ 0 & -1 \end{bmatrix} \quad W_7 = \frac{1}{\sqrt{2}}\begin{bmatrix} 1 & 0 \\ 1 & 0 \\ 0 & 1 \\ 0 & j \end{bmatrix}, \quad W_{10} = \frac{1}{\sqrt{2}}\begin{bmatrix} 1 & 0 \\ j & 0 \\ 0 & 1 \\ 0 & -1 \end{bmatrix}$$

$$W_7 = \frac{1}{\sqrt{2}}\begin{bmatrix} 1 & 0 \\ 1 & 0 \\ 0 & 1 \\ 0 & j \end{bmatrix}, \quad W_{15} = \frac{1}{\sqrt{2}}\begin{bmatrix} 1 & 0 \\ -1 & 0 \\ 0 & 1 \\ 0 & -j \end{bmatrix} \quad W_7 = \frac{1}{\sqrt{2}}\begin{bmatrix} 1 & 0 \\ 1 & 0 \\ 0 & 1 \\ 0 & j \end{bmatrix}, \quad W_{16} = \frac{1}{\sqrt{2}}\begin{bmatrix} 1 & 0 \\ j & 0 \\ 0 & 1 \\ 0 & 1 \end{bmatrix}$$

$$W_8 = \frac{1}{\sqrt{2}}\begin{bmatrix} 1 & 0 \\ -j & 0 \\ 0 & 1 \\ 0 & -1 \end{bmatrix}, \quad W_9 = \frac{1}{\sqrt{2}}\begin{bmatrix} 1 & 0 \\ -1 & 0 \\ 0 & 1 \\ 0 & j \end{bmatrix} \quad W_8 = \frac{1}{\sqrt{2}}\begin{bmatrix} 1 & 0 \\ -j & 0 \\ 0 & 1 \\ 0 & -1 \end{bmatrix}, \quad W_{15} = \frac{1}{\sqrt{2}}\begin{bmatrix} 1 & 0 \\ -1 & 0 \\ 0 & 1 \\ 0 & -j \end{bmatrix}$$

$$W_8 = \frac{1}{\sqrt{2}}\begin{bmatrix} 1 & 0 \\ -j & 0 \\ 0 & 1 \\ 0 & -1 \end{bmatrix}, \quad W_{16} = \frac{1}{\sqrt{2}}\begin{bmatrix} 1 & 0 \\ j & 0 \\ 0 & 1 \\ 0 & 1 \end{bmatrix} \quad W_9 = \frac{1}{\sqrt{2}}\begin{bmatrix} 1 & 0 \\ -1 & 0 \\ 0 & 1 \\ 0 & j \end{bmatrix}, \quad W_{10} = \frac{1}{\sqrt{2}}\begin{bmatrix} 1 & 0 \\ j & 0 \\ 0 & 1 \\ 0 & -1 \end{bmatrix}$$

$$W_9 = \frac{1}{\sqrt{2}}\begin{bmatrix} 1 & 0 \\ -1 & 0 \\ 0 & 1 \\ 0 & j \end{bmatrix}, \quad W_{16} = \frac{1}{\sqrt{2}}\begin{bmatrix} 1 & 0 \\ j & 0 \\ 0 & 1 \\ 0 & 1 \end{bmatrix} \quad W_{10} = \frac{1}{\sqrt{2}}\begin{bmatrix} 1 & 0 \\ j & 0 \\ 0 & 1 \\ 0 & -1 \end{bmatrix}, \quad W_{15} = \frac{1}{\sqrt{2}}\begin{bmatrix} 1 & 0 \\ -1 & 0 \\ 0 & 1 \\ 0 & -j \end{bmatrix}$$

MathFigure 17

The selection method in consideration of antenna coupling is a scheme using precoding matrixes of mutually different transmission antenna coupling for the first and second slots. Namely, the second precoding matrix is a precoding matrix coupling a plurality of transmission antennas to a plurality of antenna groups in a different manner from that of the first precoding matrix. For example, when the precoding matrix coupling the transmission antennas (1,2) (3,4) as represented by Equation 13 is selected for the first slot, a precoding matrix coupling the transmission antennas (1,3) (2,4) as represented by Equation 14 may be selected or the precoding matrix coupling the transmission antennas (1,2) (3,4) as represented by Equation 15 may be selected for the second slot.

Equation 18 show examples of precoding matrixes selected in consideration of antenna coupling.

Besides the illustrated combinations of the precoding matrixes selected for the first and second slots, more combinations of precoding matrixes may be used. Here, the 4Tx rank 2 precoding matrixes are combined according to the cycling scheme, but the present invention is not limited to the rank and the number of antennas. Also, here, the combinations of precoding matrixes selected for the two slots in the cycling on the slot boundary are illustrated, but the same can be applicable to the precoding matrixes selected for OFDM symbols in the cycling on the OFDM symbol boundary. For example, a combination of precoding matrixes selected for the two slots may be a combination of precoding matrixes selected for two OFDM symbols. Or, two combinations of precoding matrixes selected for two slots may be combinations of precoding matrixes selected for four OFDM symbols.

[Math. 18]

$$W_1 = \frac{1}{\sqrt{2}}\begin{bmatrix} 1 & 0 \\ 1 & 0 \\ 0 & 1 \\ 0 & -j \end{bmatrix}, \quad W_3 = \frac{1}{\sqrt{2}}\begin{bmatrix} 1 & 0 \\ 0 & 1 \\ 1 & 0 \\ 0 & 1 \end{bmatrix} \quad W_1 = \frac{1}{\sqrt{2}}\begin{bmatrix} 1 & 0 \\ 1 & 0 \\ 0 & 1 \\ 0 & -j \end{bmatrix}, \quad W_4 = \frac{1}{\sqrt{2}}\begin{bmatrix} 1 & 0 \\ 0 & 1 \\ 1 & 0 \\ 0 & -1 \end{bmatrix}$$

$$W_1 = \frac{1}{\sqrt{2}}\begin{bmatrix} 1 & 0 \\ 1 & 0 \\ 0 & 1 \\ 0 & -j \end{bmatrix}, \quad W_{11} = \frac{1}{\sqrt{2}}\begin{bmatrix} 1 & 0 \\ 0 & 1 \\ -1 & 0 \\ 0 & 1 \end{bmatrix} \quad W_1 = \frac{1}{\sqrt{2}}\begin{bmatrix} 1 & 0 \\ 1 & 0 \\ 0 & 1 \\ 0 & -j \end{bmatrix}, \quad W_{12} = \frac{1}{\sqrt{2}}\begin{bmatrix} 1 & 0 \\ 0 & 1 \\ -1 & 0 \\ 0 & -1 \end{bmatrix}$$

$$W_2 = \frac{1}{\sqrt{2}}\begin{bmatrix} 1 & 0 \\ -j & 0 \\ 0 & 1 \\ 0 & 1 \end{bmatrix}, \quad W_3 = \frac{1}{\sqrt{2}}\begin{bmatrix} 1 & 0 \\ 0 & 1 \\ 1 & 0 \\ 0 & 1 \end{bmatrix} \quad W_2 = \frac{1}{\sqrt{2}}\begin{bmatrix} 1 & 0 \\ -j & 0 \\ 0 & 1 \\ 0 & 1 \end{bmatrix}, \quad W_4 = \frac{1}{\sqrt{2}}\begin{bmatrix} 1 & 0 \\ 0 & 1 \\ 1 & 0 \\ 0 & -1 \end{bmatrix}$$

$$W_2 = \frac{1}{\sqrt{2}}\begin{bmatrix} 1 & 0 \\ -j & 0 \\ 0 & 1 \\ 0 & 1 \end{bmatrix}, \quad W_{11} = \frac{1}{\sqrt{2}}\begin{bmatrix} 1 & 0 \\ 0 & 1 \\ -1 & 0 \\ 0 & 1 \end{bmatrix} \quad W_2 = \frac{1}{\sqrt{2}}\begin{bmatrix} 1 & 0 \\ -j & 0 \\ 0 & 1 \\ 0 & 1 \end{bmatrix}, \quad W_{12} = \frac{1}{\sqrt{2}}\begin{bmatrix} 1 & 0 \\ 0 & 1 \\ -1 & 0 \\ 0 & -1 \end{bmatrix}$$

MathFigure 18

Figure 12:
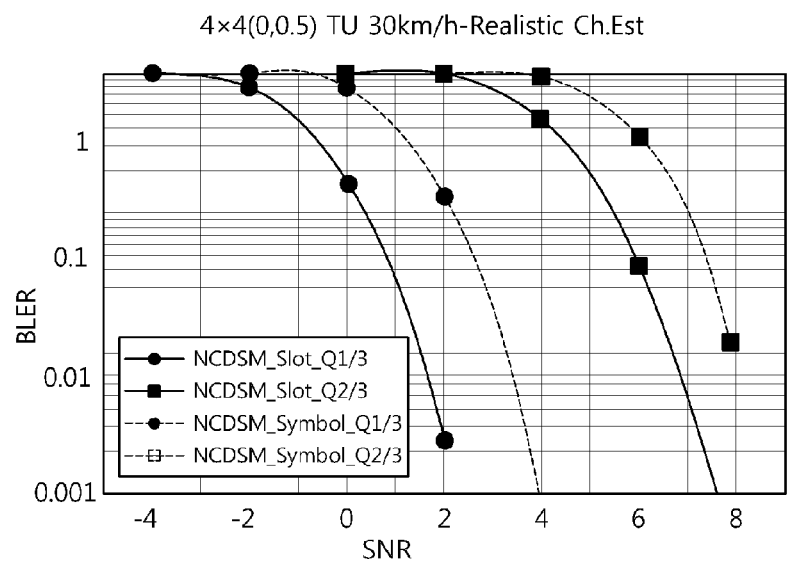
FIG. 12 is a graph showing a system performance according to cycling on OFDM symbol boundary and slot boundary.

FIG. 12 is a graph showing a system performance according to cycling on OFDM symbol boundary and the slot boundary.

Specifically, FIG. 12 shows a block error rate (BLER) when QPSK ⅓ and QPSK ⅔ of non-channel dependent spatial multiplexing (NCDSM) is used in cycling on the OFDM symbol boundary and in cycling on the slot boundary.

The NCDSM, a scheme of performing spatial multiplexing according to a certain rule irrespective of a channel situation, can be used in an open loop MIMO scheme. A channel dependent spatial multiplexing, a scheme of performing spatial multiplexing based on a channel situation measured by a user equipment (UE) or a base station (BS), may be used in a closed loop MIMO scheme.

It may be considered that the cycling on the slot boundary has a better SNR gain than the cycling on the OFDM symbol boundary. This is because transmission power of two demodulation reference signals (DM RS) guarantees a better channel estimation performance than transmission power of four demodulation reference signals.

<Illustration of 4Tx Codebook>

The illustrated 4Tx rank 2 precoding matrixes are merely illustrative but not limited thereto. The 4Tx rank 2 precoding matrixes may have various configurations. Table 12 below shows a codebook including 16 precoding matrixes, and more various codebooks may be created.

Here, 4Tx rank 2 and rank 3 codebooks are illustrated. The illustrated codebooks may be used for non-channel dependent precoding, namely, for an open-loop spatial multiplexing. Or the illustrated codebooks may be used for channel dependent precoding, namely, for a closed-loop spatial multiplexing.

Tables 13 to 89 below show 4Tx rank 2 codebooks including 20 precoding matrixes.

TABLE 13

$$\frac{1}{2}\begin{bmatrix}1&0\\1&0\\0&1\\0&-j\end{bmatrix} \quad \frac{1}{2}\begin{bmatrix}1&0\\1&0\\0&1\\0&j\end{bmatrix} \quad \frac{1}{2}\begin{bmatrix}1&0\\j&0\\0&1\\0&1\end{bmatrix} \quad \frac{1}{2}\begin{bmatrix}1&0\\j&0\\0&1\\0&-1\end{bmatrix} \quad \frac{1}{2}\begin{bmatrix}1&0\\-1&0\\0&1\\0&-j\end{bmatrix} \quad \frac{1}{2}\begin{bmatrix}1&0\\-1&0\\0&1\\0&j\end{bmatrix} \quad \frac{1}{2}\begin{bmatrix}1&0\\-j&0\\0&1\\0&1\end{bmatrix} \quad \frac{1}{2}\begin{bmatrix}1&0\\-j&0\\0&1\\0&-1\end{bmatrix}$$

$$\frac{1}{2}\begin{bmatrix}1&0\\0&1\\1&0\\0&1\end{bmatrix} \quad \frac{1}{2}\begin{bmatrix}1&0\\0&1\\1&0\\0&-1\end{bmatrix} \quad \frac{1}{2}\begin{bmatrix}1&0\\0&1\\j&0\\0&j\end{bmatrix} \quad \frac{1}{2}\begin{bmatrix}1&0\\0&1\\j&0\\0&-j\end{bmatrix} \quad \frac{1}{2}\begin{bmatrix}1&0\\0&1\\-1&0\\0&1\end{bmatrix} \quad \frac{1}{2}\begin{bmatrix}1&0\\0&1\\-1&0\\0&-1\end{bmatrix} \quad \frac{1}{2}\begin{bmatrix}1&0\\0&1\\-j&0\\0&j\end{bmatrix} \quad \frac{1}{2}\begin{bmatrix}1&0\\0&1\\-j&0\\0&-j\end{bmatrix}$$

$$\frac{1}{2}\begin{bmatrix}1&0\\0&1\\0&1\\1&0\end{bmatrix} \quad \frac{1}{2}\begin{bmatrix}1&0\\0&1\\0&-1\\1&0\end{bmatrix} \quad \frac{1}{2}\begin{bmatrix}1&0\\0&1\\0&1\\-1&0\end{bmatrix} \quad \frac{1}{2}\begin{bmatrix}1&0\\0&1\\0&-1\\-1&0\end{bmatrix}$$

TABLE 14

$$\frac{1}{2}\begin{bmatrix}1&0\\1&0\\0&1\\0&-j\end{bmatrix} \quad \frac{1}{2}\begin{bmatrix}1&0\\1&0\\0&1\\0&j\end{bmatrix} \quad \frac{1}{2}\begin{bmatrix}1&0\\j&0\\0&1\\0&1\end{bmatrix} \quad \frac{1}{2}\begin{bmatrix}1&0\\j&0\\0&1\\0&-1\end{bmatrix} \quad \frac{1}{2}\begin{bmatrix}1&0\\-1&0\\0&1\\0&-j\end{bmatrix} \quad \frac{1}{2}\begin{bmatrix}1&0\\-1&0\\0&1\\0&j\end{bmatrix} \quad \frac{1}{2}\begin{bmatrix}1&0\\-j&0\\0&1\\0&1\end{bmatrix} \quad \frac{1}{2}\begin{bmatrix}1&0\\-j&0\\0&1\\0&-1\end{bmatrix}$$

$$\frac{1}{2}\begin{bmatrix}1&0\\0&1\\1&0\\0&1\end{bmatrix} \quad \frac{1}{2}\begin{bmatrix}1&0\\0&1\\1&0\\0&-1\end{bmatrix} \quad \frac{1}{2}\begin{bmatrix}1&0\\0&1\\j&0\\0&j\end{bmatrix} \quad \frac{1}{2}\begin{bmatrix}1&0\\0&1\\j&0\\0&-j\end{bmatrix} \quad \frac{1}{2}\begin{bmatrix}1&0\\0&1\\-1&0\\0&1\end{bmatrix} \quad \frac{1}{2}\begin{bmatrix}1&0\\0&1\\-1&0\\0&-1\end{bmatrix} \quad \frac{1}{2}\begin{bmatrix}1&0\\0&1\\-j&0\\0&j\end{bmatrix} \quad \frac{1}{2}\begin{bmatrix}1&0\\0&1\\-j&0\\0&-j\end{bmatrix}$$

$$\frac{1}{2}\begin{bmatrix}1&0\\0&1\\0&1\\1&0\end{bmatrix} \quad \frac{1}{2}\begin{bmatrix}1&0\\0&1\\0&-1\\1&0\end{bmatrix} \quad \frac{1}{2}\begin{bmatrix}1&0\\0&1\\0&1\\-1&0\end{bmatrix} \quad \frac{1}{2}\begin{bmatrix}1&0\\0&1\\0&-1\\-1&0\end{bmatrix}$$

TABLE 15

$$\frac{1}{2}\begin{bmatrix}1&0\\1&0\\0&1\\0&-j\end{bmatrix} \quad \frac{1}{2}\begin{bmatrix}1&0\\1&0\\0&1\\0&j\end{bmatrix} \quad \frac{1}{2}\begin{bmatrix}1&0\\j&0\\0&1\\0&1\end{bmatrix} \quad \frac{1}{2}\begin{bmatrix}1&0\\j&0\\0&1\\0&-1\end{bmatrix} \quad \frac{1}{2}\begin{bmatrix}1&0\\-1&0\\0&1\\0&-j\end{bmatrix} \quad \frac{1}{2}\begin{bmatrix}1&0\\-1&0\\0&1\\0&j\end{bmatrix} \quad \frac{1}{2}\begin{bmatrix}1&0\\-j&0\\0&1\\0&1\end{bmatrix} \quad \frac{1}{2}\begin{bmatrix}1&0\\-j&0\\0&1\\0&-1\end{bmatrix}$$

$$\frac{1}{2}\begin{bmatrix}1&0\\0&1\\1&0\\0&1\end{bmatrix} \quad \frac{1}{2}\begin{bmatrix}1&0\\0&1\\1&0\\0&-1\end{bmatrix} \quad \frac{1}{2}\begin{bmatrix}1&0\\0&1\\-1&0\\0&1\end{bmatrix} \quad \frac{1}{2}\begin{bmatrix}1&0\\0&1\\-1&0\\0&-1\end{bmatrix}$$

TABLE 15-continued $$\frac{1}{2}\begin{bmatrix}1 & 0\\0 & 1\\0 & 1\\1 & 0\end{bmatrix} \quad \frac{1}{2}\begin{bmatrix}1 & 0\\0 & 1\\0 & -1\\1 & 0\end{bmatrix} \quad \frac{1}{2}\begin{bmatrix}1 & 0\\0 & 1\\0 & j\\j & 0\end{bmatrix} \quad \frac{1}{2}\begin{bmatrix}1 & 0\\0 & 1\\0 & -j\\j & 0\end{bmatrix} \quad \frac{1}{2}\begin{bmatrix}1 & 0\\0 & 1\\0 & 1\\-1 & 0\end{bmatrix} \quad \frac{1}{2}\begin{bmatrix}1 & 0\\0 & 1\\0 & -1\\-1 & 0\end{bmatrix} \quad \frac{1}{2}\begin{bmatrix}1 & 0\\0 & 1\\0 & j\\-j & 0\end{bmatrix} \quad \frac{1}{2}\begin{bmatrix}1 & 0\\0 & 1\\0 & -j\\-j & 0\end{bmatrix}$$

TABLE 16

$$\frac{1}{2}\begin{bmatrix}1 & 0\\1 & 0\\0 & 1\\0 & -j\end{bmatrix} \quad \frac{1}{2}\begin{bmatrix}1 & 0\\1 & 0\\0 & 1\\0 & j\end{bmatrix} \quad \frac{1}{2}\begin{bmatrix}1 & 0\\j & 0\\0 & 1\\0 & 1\end{bmatrix} \quad \frac{1}{2}\begin{bmatrix}1 & 0\\j & 0\\0 & 1\\0 & -1\end{bmatrix} \quad \frac{1}{2}\begin{bmatrix}1 & 0\\-1 & 0\\0 & 1\\0 & -j\end{bmatrix} \quad \frac{1}{2}\begin{bmatrix}1 & 0\\-1 & 0\\0 & 1\\0 & j\end{bmatrix} \quad \frac{1}{2}\begin{bmatrix}1 & 0\\-j & 0\\0 & 1\\0 & 1\end{bmatrix} \quad \frac{1}{2}\begin{bmatrix}1 & 0\\-j & 0\\0 & 1\\0 & -1\end{bmatrix}$$

$$\frac{1}{2}\begin{bmatrix}1 & 0\\0 & 1\\1 & 0\\0 & 1\end{bmatrix} \quad \frac{1}{2}\begin{bmatrix}1 & 0\\0 & 1\\1 & 0\\0 & -1\end{bmatrix} \quad \frac{1}{2}\begin{bmatrix}1 & 0\\0 & 1\\j & 0\\0 & j\end{bmatrix} \quad \frac{1}{2}\begin{bmatrix}1 & 0\\0 & 1\\j & 0\\0 & -j\end{bmatrix} \quad \frac{1}{2}\begin{bmatrix}1 & 0\\0 & 1\\-1 & 0\\0 & 1\end{bmatrix} \quad \frac{1}{2}\begin{bmatrix}1 & 0\\0 & 1\\-1 & 0\\0 & -1\end{bmatrix}$$

$$\frac{1}{2}\begin{bmatrix}1 & 0\\0 & 1\\0 & 1\\1 & 0\end{bmatrix} \quad \frac{1}{2}\begin{bmatrix}1 & 0\\0 & 1\\0 & -1\\1 & 0\end{bmatrix} \quad \frac{1}{2}\begin{bmatrix}1 & 0\\0 & 1\\0 & j\\j & 0\end{bmatrix} \quad \frac{1}{2}\begin{bmatrix}1 & 0\\0 & 1\\0 & -j\\j & 0\end{bmatrix} \quad \frac{1}{2}\begin{bmatrix}1 & 0\\0 & 1\\0 & 1\\-1 & 0\end{bmatrix} \quad \frac{1}{2}\begin{bmatrix}1 & 0\\0 & 1\\0 & -1\\-1 & 0\end{bmatrix}$$

TABLE 17

$$\frac{1}{2}\begin{bmatrix}1 & 0\\1 & 0\\0 & 1\\0 & -j\end{bmatrix} \quad \frac{1}{2}\begin{bmatrix}1 & 0\\1 & 0\\0 & 1\\0 & j\end{bmatrix} \quad \frac{1}{2}\begin{bmatrix}1 & 0\\j & 0\\0 & 1\\0 & 1\end{bmatrix} \quad \frac{1}{2}\begin{bmatrix}1 & 0\\j & 0\\0 & 1\\0 & -1\end{bmatrix} \quad \frac{1}{2}\begin{bmatrix}1 & 0\\-1 & 0\\0 & 1\\0 & -j\end{bmatrix} \quad \frac{1}{2}\begin{bmatrix}1 & 0\\-1 & 0\\0 & 1\\0 & j\end{bmatrix} \quad \frac{1}{2}\begin{bmatrix}1 & 0\\-j & 0\\0 & 1\\0 & 1\end{bmatrix} \quad \frac{1}{2}\begin{bmatrix}1 & 0\\-j & 0\\0 & 1\\0 & -1\end{bmatrix}$$

$$\frac{1}{2}\begin{bmatrix}1 & 0\\0 & 1\\1 & 0\\0 & 1\end{bmatrix} \quad \frac{1}{2}\begin{bmatrix}1 & 0\\0 & 1\\1 & 0\\0 & -1\end{bmatrix} \quad \frac{1}{2}\begin{bmatrix}1 & 0\\0 & 1\\j & 0\\0 & j\end{bmatrix} \quad \frac{1}{2}\begin{bmatrix}1 & 0\\0 & 1\\j & 0\\0 & -j\end{bmatrix} \quad \frac{1}{2}\begin{bmatrix}1 & 0\\0 & 1\\-1 & 0\\0 & 1\end{bmatrix} \quad \frac{1}{2}\begin{bmatrix}1 & 0\\0 & 1\\-1 & 0\\0 & -1\end{bmatrix}$$

$$\frac{1}{2}\begin{bmatrix}1 & 0\\0 & 1\\0 & 1\\1 & 0\end{bmatrix} \quad \frac{1}{2}\begin{bmatrix}1 & 0\\0 & 1\\0 & -1\\1 & 0\end{bmatrix} \quad \frac{1}{2}\begin{bmatrix}1 & 0\\0 & 1\\0 & j\\j & 0\end{bmatrix} \quad \frac{1}{2}\begin{bmatrix}1 & 0\\0 & 1\\0 & 1\\-1 & 0\end{bmatrix} \quad \frac{1}{2}\begin{bmatrix}1 & 0\\0 & 1\\0 & -1\\-1 & 0\end{bmatrix} \quad \frac{1}{2}\begin{bmatrix}1 & 0\\0 & 1\\0 & j\\-j & 0\end{bmatrix}$$

TABLE 18

$$\frac{1}{2}\begin{bmatrix}1 & 0\\1 & 0\\0 & 1\\0 & -j\end{bmatrix} \quad \frac{1}{2}\begin{bmatrix}1 & 0\\1 & 0\\0 & 1\\0 & j\end{bmatrix} \quad \frac{1}{2}\begin{bmatrix}1 & 0\\j & 0\\0 & 1\\0 & 1\end{bmatrix} \quad \frac{1}{2}\begin{bmatrix}1 & 0\\j & 0\\0 & 1\\0 & -1\end{bmatrix} \quad \frac{1}{2}\begin{bmatrix}1 & 0\\-1 & 0\\0 & 1\\0 & -j\end{bmatrix} \quad \frac{1}{2}\begin{bmatrix}1 & 0\\-1 & 0\\0 & 1\\0 & j\end{bmatrix} \quad \frac{1}{2}\begin{bmatrix}1 & 0\\-j & 0\\0 & 1\\0 & 1\end{bmatrix} \quad \frac{1}{2}\begin{bmatrix}1 & 0\\-j & 0\\0 & 1\\0 & -1\end{bmatrix}$$

$$\frac{1}{2}\begin{bmatrix}1 & 0\\0 & 1\\1 & 0\\0 & 1\end{bmatrix} \quad \frac{1}{2}\begin{bmatrix}1 & 0\\0 & 1\\1 & 0\\0 & -1\end{bmatrix} \quad \frac{1}{2}\begin{bmatrix}1 & 0\\0 & 1\\j & 0\\0 & j\end{bmatrix} \quad \frac{1}{2}\begin{bmatrix}1 & 0\\0 & 1\\j & 0\\0 & -j\end{bmatrix} \quad \frac{1}{2}\begin{bmatrix}1 & 0\\0 & 1\\-1 & 0\\0 & 1\end{bmatrix} \quad \frac{1}{2}\begin{bmatrix}1 & 0\\0 & 1\\-1 & 0\\0 & -1\end{bmatrix}$$

$$\frac{1}{2}\begin{bmatrix}1 & 0\\0 & 1\\0 & 1\\1 & 0\end{bmatrix} \quad \frac{1}{2}\begin{bmatrix}1 & 0\\0 & 1\\0 & -1\\1 & 0\end{bmatrix} \quad \frac{1}{2}\begin{bmatrix}1 & 0\\0 & 1\\0 & j\\j & 0\end{bmatrix} \quad \frac{1}{2}\begin{bmatrix}1 & 0\\0 & 1\\0 & 1\\-1 & 0\end{bmatrix} \quad \frac{1}{2}\begin{bmatrix}1 & 0\\0 & 1\\0 & -1\\-1 & 0\end{bmatrix} \quad \frac{1}{2}\begin{bmatrix}1 & 0\\0 & 1\\0 & -j\\-j & 0\end{bmatrix}$$

TABLE 19

$$\frac{1}{2}\begin{bmatrix}1&0\\1&0\\0&1\\0&-j\end{bmatrix} \quad \frac{1}{2}\begin{bmatrix}1&0\\1&0\\0&1\\0&j\end{bmatrix} \quad \frac{1}{2}\begin{bmatrix}1&0\\j&0\\0&1\\0&1\end{bmatrix} \quad \frac{1}{2}\begin{bmatrix}1&0\\j&0\\0&1\\0&-1\end{bmatrix} \quad \frac{1}{2}\begin{bmatrix}1&0\\-1&0\\0&1\\0&-j\end{bmatrix} \quad \frac{1}{2}\begin{bmatrix}1&0\\-1&0\\0&1\\0&j\end{bmatrix} \quad \frac{1}{2}\begin{bmatrix}1&0\\-j&0\\0&1\\0&1\end{bmatrix} \quad \frac{1}{2}\begin{bmatrix}1&0\\-j&0\\0&1\\0&-1\end{bmatrix}$$

$$\frac{1}{2}\begin{bmatrix}1&0\\0&1\\1&0\\0&1\end{bmatrix} \quad \frac{1}{2}\begin{bmatrix}1&0\\0&1\\1&0\\0&-1\end{bmatrix} \quad \frac{1}{2}\begin{bmatrix}1&0\\0&1\\j&0\\0&j\end{bmatrix} \quad \frac{1}{2}\begin{bmatrix}1&0\\0&1\\j&0\\0&-j\end{bmatrix} \quad \frac{1}{2}\begin{bmatrix}1&0\\0&1\\-1&0\\0&1\end{bmatrix} \quad \frac{1}{2}\begin{bmatrix}1&0\\0&1\\-1&0\\0&-1\end{bmatrix}$$

$$\frac{1}{2}\begin{bmatrix}1&0\\0&1\\0&1\\1&0\end{bmatrix} \quad \frac{1}{2}\begin{bmatrix}1&0\\0&1\\0&-1\\1&0\end{bmatrix} \quad \frac{1}{2}\begin{bmatrix}1&0\\0&1\\0&-1\\j&0\end{bmatrix} \quad \frac{1}{2}\begin{bmatrix}1&0\\0&1\\0&1\\-1&0\end{bmatrix} \quad \frac{1}{2}\begin{bmatrix}1&0\\0&1\\0&-1\\-1&0\end{bmatrix} \quad \frac{1}{2}\begin{bmatrix}1&0\\0&1\\0&j\\-j&0\end{bmatrix}$$

TABLE 20

$$\frac{1}{2}\begin{bmatrix}1&0\\1&0\\0&1\\0&-j\end{bmatrix} \quad \frac{1}{2}\begin{bmatrix}1&0\\1&0\\0&1\\0&j\end{bmatrix} \quad \frac{1}{2}\begin{bmatrix}1&0\\j&0\\0&1\\0&1\end{bmatrix} \quad \frac{1}{2}\begin{bmatrix}1&0\\j&0\\0&1\\0&-1\end{bmatrix} \quad \frac{1}{2}\begin{bmatrix}1&0\\-1&0\\0&1\\0&-j\end{bmatrix} \quad \frac{1}{2}\begin{bmatrix}1&0\\-1&0\\0&1\\0&j\end{bmatrix} \quad \frac{1}{2}\begin{bmatrix}1&0\\-j&0\\0&1\\0&1\end{bmatrix} \quad \frac{1}{2}\begin{bmatrix}1&0\\-j&0\\0&1\\0&-1\end{bmatrix}$$

$$\frac{1}{2}\begin{bmatrix}1&0\\0&1\\1&0\\0&1\end{bmatrix} \quad \frac{1}{2}\begin{bmatrix}1&0\\0&1\\1&0\\0&-1\end{bmatrix} \quad \frac{1}{2}\begin{bmatrix}1&0\\0&1\\j&0\\0&j\end{bmatrix} \quad \frac{1}{2}\begin{bmatrix}1&0\\0&1\\j&0\\0&-j\end{bmatrix} \quad \frac{1}{2}\begin{bmatrix}1&0\\0&1\\-1&0\\0&1\end{bmatrix} \quad \frac{1}{2}\begin{bmatrix}1&0\\0&1\\-1&0\\0&-1\end{bmatrix}$$

$$\frac{1}{2}\begin{bmatrix}1&0\\0&1\\0&1\\1&0\end{bmatrix} \quad \frac{1}{2}\begin{bmatrix}1&0\\0&1\\0&-1\\1&0\end{bmatrix} \quad \frac{1}{2}\begin{bmatrix}1&0\\0&1\\0&-1\\j&0\end{bmatrix} \quad \frac{1}{2}\begin{bmatrix}1&0\\0&1\\0&1\\-1&0\end{bmatrix} \quad \frac{1}{2}\begin{bmatrix}1&0\\0&1\\0&-1\\-1&0\end{bmatrix} \quad \frac{1}{2}\begin{bmatrix}1&0\\0&1\\0&-j\\-j&0\end{bmatrix}$$

TABLE 21

$$\frac{1}{2}\begin{bmatrix}1&0\\1&0\\0&1\\0&-j\end{bmatrix} \quad \frac{1}{2}\begin{bmatrix}1&0\\1&0\\0&1\\0&j\end{bmatrix} \quad \frac{1}{2}\begin{bmatrix}1&0\\j&0\\0&1\\0&1\end{bmatrix} \quad \frac{1}{2}\begin{bmatrix}1&0\\j&0\\0&1\\0&-1\end{bmatrix} \quad \frac{1}{2}\begin{bmatrix}1&0\\-1&0\\0&1\\0&-j\end{bmatrix} \quad \frac{1}{2}\begin{bmatrix}1&0\\-1&0\\0&1\\0&j\end{bmatrix} \quad \frac{1}{2}\begin{bmatrix}1&0\\-j&0\\0&1\\0&1\end{bmatrix} \quad \frac{1}{2}\begin{bmatrix}1&0\\-j&0\\0&1\\0&-1\end{bmatrix}$$

$$\frac{1}{2}\begin{bmatrix}1&0\\0&1\\1&0\\0&1\end{bmatrix} \quad \frac{1}{2}\begin{bmatrix}1&0\\0&1\\1&0\\0&-1\end{bmatrix} \quad \frac{1}{2}\begin{bmatrix}1&0\\0&1\\j&0\\0&j\end{bmatrix} \quad \frac{1}{2}\begin{bmatrix}1&0\\0&1\\j&0\\0&-j\end{bmatrix} \quad \frac{1}{2}\begin{bmatrix}1&0\\0&1\\-1&0\\0&1\end{bmatrix} \quad \frac{1}{2}\begin{bmatrix}1&0\\0&1\\-1&0\\0&-1\end{bmatrix}$$

$$\frac{1}{2}\begin{bmatrix}1&0\\0&1\\0&1\\1&0\end{bmatrix} \quad \frac{1}{2}\begin{bmatrix}1&0\\0&1\\0&-1\\1&0\end{bmatrix} \quad \quad \quad \frac{1}{2}\begin{bmatrix}1&0\\0&1\\0&1\\-1&0\end{bmatrix} \quad \frac{1}{2}\begin{bmatrix}1&0\\0&1\\0&-1\\-1&0\end{bmatrix} \quad \frac{1}{2}\begin{bmatrix}1&0\\0&1\\0&j\\-j&0\end{bmatrix} \quad \frac{1}{2}\begin{bmatrix}1&0\\0&1\\0&-j\\-j&0\end{bmatrix}$$

TABLE 22

$$\frac{1}{2}\begin{bmatrix}1&0\\1&0\\0&1\\0&-j\end{bmatrix} \quad \frac{1}{2}\begin{bmatrix}1&0\\1&0\\0&1\\0&j\end{bmatrix} \quad \frac{1}{2}\begin{bmatrix}1&0\\j&0\\0&1\\0&1\end{bmatrix} \quad \frac{1}{2}\begin{bmatrix}1&0\\j&0\\0&1\\0&-1\end{bmatrix} \quad \frac{1}{2}\begin{bmatrix}1&0\\-1&0\\0&1\\0&-j\end{bmatrix} \quad \frac{1}{2}\begin{bmatrix}1&0\\-1&0\\0&1\\0&j\end{bmatrix} \quad \frac{1}{2}\begin{bmatrix}1&0\\-j&0\\0&1\\0&1\end{bmatrix} \quad \frac{1}{2}\begin{bmatrix}1&0\\-j&0\\0&1\\0&-1\end{bmatrix}$$

TABLE 22-continued $$\frac{1}{2}\begin{bmatrix}1&0\\0&1\\1&0\\0&1\end{bmatrix} \quad \frac{1}{2}\begin{bmatrix}1&0\\0&1\\1&0\\0&-1\end{bmatrix} \quad \frac{1}{2}\begin{bmatrix}1&0\\0&1\\j&0\\0&j\end{bmatrix} \quad \quad \frac{1}{2}\begin{bmatrix}1&0\\0&1\\-1&0\\0&1\end{bmatrix} \quad \frac{1}{2}\begin{bmatrix}1&0\\0&1\\-1&0\\0&-1\end{bmatrix} \quad \frac{1}{2}\begin{bmatrix}1&0\\0&1\\-j&0\\0&j\end{bmatrix}$$

$$\frac{1}{2}\begin{bmatrix}1&0\\0&1\\0&1\\1&0\end{bmatrix} \quad \frac{1}{2}\begin{bmatrix}1&0\\0&1\\0&-1\\1&0\end{bmatrix} \quad \frac{1}{2}\begin{bmatrix}1&0\\0&1\\0&j\\j&0\end{bmatrix} \quad \frac{1}{2}\begin{bmatrix}1&0\\0&1\\0&-j\\j&0\end{bmatrix} \quad \frac{1}{2}\begin{bmatrix}1&0\\0&1\\0&1\\-1&0\end{bmatrix} \quad \frac{1}{2}\begin{bmatrix}1&0\\0&1\\0&-1\\-1&0\end{bmatrix}$$

TABLE 23

$$\frac{1}{2}\begin{bmatrix}1&0\\1&0\\0&1\\0&-j\end{bmatrix} \quad \frac{1}{2}\begin{bmatrix}1&0\\1&0\\0&1\\0&j\end{bmatrix} \quad \frac{1}{2}\begin{bmatrix}1&0\\j&0\\0&1\\0&1\end{bmatrix} \quad \frac{1}{2}\begin{bmatrix}1&0\\j&0\\0&1\\0&-1\end{bmatrix} \quad \frac{1}{2}\begin{bmatrix}1&0\\-1&0\\0&1\\0&-j\end{bmatrix} \quad \frac{1}{2}\begin{bmatrix}1&0\\-1&0\\0&1\\0&j\end{bmatrix} \quad \frac{1}{2}\begin{bmatrix}1&0\\-j&0\\0&1\\0&1\end{bmatrix} \quad \frac{1}{2}\begin{bmatrix}1&0\\-j&0\\0&1\\0&-1\end{bmatrix}$$

$$\frac{1}{2}\begin{bmatrix}1&0\\0&1\\1&0\\0&1\end{bmatrix} \quad \frac{1}{2}\begin{bmatrix}1&0\\0&1\\1&0\\0&-1\end{bmatrix} \quad \frac{1}{2}\begin{bmatrix}1&0\\0&1\\j&0\\0&j\end{bmatrix} \quad \quad \frac{1}{2}\begin{bmatrix}1&0\\0&1\\-1&0\\0&1\end{bmatrix} \quad \frac{1}{2}\begin{bmatrix}1&0\\0&1\\-1&0\\0&-1\end{bmatrix} \quad \frac{1}{2}\begin{bmatrix}1&0\\0&1\\-j&0\\0&j\end{bmatrix}$$

$$\frac{1}{2}\begin{bmatrix}1&0\\0&1\\0&1\\1&0\end{bmatrix} \quad \frac{1}{2}\begin{bmatrix}1&0\\0&1\\0&-1\\1&0\end{bmatrix} \quad \frac{1}{2}\begin{bmatrix}1&0\\0&1\\0&j\\j&0\end{bmatrix} \quad \quad \frac{1}{2}\begin{bmatrix}1&0\\0&1\\0&1\\-1&0\end{bmatrix} \quad \frac{1}{2}\begin{bmatrix}1&0\\0&1\\0&-1\\-1&0\end{bmatrix} \quad \frac{1}{2}\begin{bmatrix}1&0\\0&1\\0&j\\-j&0\end{bmatrix}$$

TABLE 24

$$\frac{1}{2}\begin{bmatrix}1&0\\1&0\\0&1\\0&-j\end{bmatrix} \quad \frac{1}{2}\begin{bmatrix}1&0\\1&0\\0&1\\0&j\end{bmatrix} \quad \frac{1}{2}\begin{bmatrix}1&0\\j&0\\0&1\\0&1\end{bmatrix} \quad \frac{1}{2}\begin{bmatrix}1&0\\j&0\\0&1\\0&-1\end{bmatrix} \quad \frac{1}{2}\begin{bmatrix}1&0\\-1&0\\0&1\\0&-j\end{bmatrix} \quad \frac{1}{2}\begin{bmatrix}1&0\\-1&0\\0&1\\0&j\end{bmatrix} \quad \frac{1}{2}\begin{bmatrix}1&0\\-j&0\\0&1\\0&1\end{bmatrix} \quad \frac{1}{2}\begin{bmatrix}1&0\\-j&0\\0&1\\0&-1\end{bmatrix}$$

$$\frac{1}{2}\begin{bmatrix}1&0\\0&1\\1&0\\0&1\end{bmatrix} \quad \frac{1}{2}\begin{bmatrix}1&0\\0&1\\1&0\\0&-1\end{bmatrix} \quad \frac{1}{2}\begin{bmatrix}1&0\\0&1\\j&0\\0&j\end{bmatrix} \quad \quad \frac{1}{2}\begin{bmatrix}1&0\\0&1\\-1&0\\0&1\end{bmatrix} \quad \frac{1}{2}\begin{bmatrix}1&0\\0&1\\-1&0\\0&-1\end{bmatrix} \quad \frac{1}{2}\begin{bmatrix}1&0\\0&1\\-j&0\\0&j\end{bmatrix}$$

$$\frac{1}{2}\begin{bmatrix}1&0\\0&1\\0&1\\1&0\end{bmatrix} \quad \frac{1}{2}\begin{bmatrix}1&0\\0&1\\0&-1\\1&0\end{bmatrix} \quad \frac{1}{2}\begin{bmatrix}1&0\\0&1\\0&j\\j&0\end{bmatrix} \quad \quad \frac{1}{2}\begin{bmatrix}1&0\\0&1\\0&1\\-1&0\end{bmatrix} \quad \frac{1}{2}\begin{bmatrix}1&0\\0&1\\0&-1\\-1&0\end{bmatrix} \quad \quad \frac{1}{2}\begin{bmatrix}1&0\\0&1\\0&-j\\-j&0\end{bmatrix}$$

TABLE 25

$$\frac{1}{2}\begin{bmatrix}1&0\\1&0\\0&1\\0&-j\end{bmatrix} \quad \frac{1}{2}\begin{bmatrix}1&0\\1&0\\0&1\\0&j\end{bmatrix} \quad \frac{1}{2}\begin{bmatrix}1&0\\j&0\\0&1\\0&1\end{bmatrix} \quad \frac{1}{2}\begin{bmatrix}1&0\\j&0\\0&1\\0&-1\end{bmatrix} \quad \frac{1}{2}\begin{bmatrix}1&0\\-1&0\\0&1\\0&-j\end{bmatrix} \quad \frac{1}{2}\begin{bmatrix}1&0\\-1&0\\0&1\\0&j\end{bmatrix} \quad \frac{1}{2}\begin{bmatrix}1&0\\-j&0\\0&1\\0&1\end{bmatrix} \quad \frac{1}{2}\begin{bmatrix}1&0\\-j&0\\0&1\\0&-1\end{bmatrix}$$

$$\frac{1}{2}\begin{bmatrix}1&0\\0&1\\1&0\\0&1\end{bmatrix} \quad \frac{1}{2}\begin{bmatrix}1&0\\0&1\\1&0\\0&-1\end{bmatrix} \quad \frac{1}{2}\begin{bmatrix}1&0\\0&1\\j&0\\0&j\end{bmatrix} \quad \quad \frac{1}{2}\begin{bmatrix}1&0\\0&1\\-1&0\\0&1\end{bmatrix} \quad \frac{1}{2}\begin{bmatrix}1&0\\0&1\\-1&0\\0&-1\end{bmatrix} \quad \frac{1}{2}\begin{bmatrix}1&0\\0&1\\-j&0\\0&j\end{bmatrix}$$

TABLE 25-continued $$\frac{1}{2}\begin{bmatrix}1 & 0\\0 & 1\\0 & 1\\1 & 0\end{bmatrix} \quad \frac{1}{2}\begin{bmatrix}1 & 0\\0 & 1\\0 & -1\\1 & 0\end{bmatrix} \quad \frac{1}{2}\begin{bmatrix}1 & 0\\0 & 1\\0 & -1\\j & 0\end{bmatrix} \quad \frac{1}{2}\begin{bmatrix}1 & 0\\0 & 1\\0 & 1\\-1 & 0\end{bmatrix} \quad \frac{1}{2}\begin{bmatrix}1 & 0\\0 & 1\\0 & -1\\-1 & 0\end{bmatrix} \quad \frac{1}{2}\begin{bmatrix}1 & 0\\0 & 1\\0 & j\\-j & 0\end{bmatrix}$$

TABLE 26

$$\frac{1}{2}\begin{bmatrix}1 & 0\\1 & 0\\0 & 1\\0 & -j\end{bmatrix} \quad \frac{1}{2}\begin{bmatrix}1 & 0\\1 & 0\\0 & 1\\0 & j\end{bmatrix} \quad \frac{1}{2}\begin{bmatrix}1 & 0\\j & 0\\0 & 1\\0 & 1\end{bmatrix} \quad \frac{1}{2}\begin{bmatrix}1 & 0\\j & 0\\0 & 1\\0 & -1\end{bmatrix} \quad \frac{1}{2}\begin{bmatrix}1 & 0\\-1 & 0\\0 & 1\\0 & -j\end{bmatrix} \quad \frac{1}{2}\begin{bmatrix}1 & 0\\-1 & 0\\0 & 1\\0 & j\end{bmatrix} \quad \frac{1}{2}\begin{bmatrix}1 & 0\\-j & 0\\0 & 1\\0 & 1\end{bmatrix} \quad \frac{1}{2}\begin{bmatrix}1 & 0\\-j & 0\\0 & 1\\0 & -1\end{bmatrix}$$

$$\frac{1}{2}\begin{bmatrix}1 & 0\\0 & 1\\1 & 0\\0 & 1\end{bmatrix} \quad \frac{1}{2}\begin{bmatrix}1 & 0\\0 & 1\\1 & 0\\0 & -1\end{bmatrix} \quad \frac{1}{2}\begin{bmatrix}1 & 0\\0 & 1\\j & 0\\0 & j\end{bmatrix} \quad \frac{1}{2}\begin{bmatrix}1 & 0\\0 & 1\\-1 & 0\\0 & 1\end{bmatrix} \quad \frac{1}{2}\begin{bmatrix}1 & 0\\0 & 1\\-1 & 0\\0 & -1\end{bmatrix} \quad \frac{1}{2}\begin{bmatrix}1 & 0\\0 & 1\\-j & 0\\0 & j\end{bmatrix}$$

$$\frac{1}{2}\begin{bmatrix}1 & 0\\0 & 1\\0 & 1\\1 & 0\end{bmatrix} \quad \frac{1}{2}\begin{bmatrix}1 & 0\\0 & 1\\0 & -1\\1 & 0\end{bmatrix} \quad \frac{1}{2}\begin{bmatrix}1 & 0\\0 & 1\\0 & -1\\j & 0\end{bmatrix} \quad \frac{1}{2}\begin{bmatrix}1 & 0\\0 & 1\\0 & 1\\-1 & 0\end{bmatrix} \quad \frac{1}{2}\begin{bmatrix}1 & 0\\0 & 1\\0 & -1\\-1 & 0\end{bmatrix} \quad \frac{1}{2}\begin{bmatrix}1 & 0\\0 & 1\\0 & -j\\-j & 0\end{bmatrix}$$

TABLE 27

$$\frac{1}{2}\begin{bmatrix}1 & 0\\1 & 0\\0 & 1\\0 & -j\end{bmatrix} \quad \frac{1}{2}\begin{bmatrix}1 & 0\\1 & 0\\0 & 1\\0 & j\end{bmatrix} \quad \frac{1}{2}\begin{bmatrix}1 & 0\\j & 0\\0 & 1\\0 & 1\end{bmatrix} \quad \frac{1}{2}\begin{bmatrix}1 & 0\\j & 0\\0 & 1\\0 & -1\end{bmatrix} \quad \frac{1}{2}\begin{bmatrix}1 & 0\\-1 & 0\\0 & 1\\0 & -j\end{bmatrix} \quad \frac{1}{2}\begin{bmatrix}1 & 0\\-1 & 0\\0 & 1\\0 & j\end{bmatrix} \quad \frac{1}{2}\begin{bmatrix}1 & 0\\-j & 0\\0 & 1\\0 & 1\end{bmatrix} \quad \frac{1}{2}\begin{bmatrix}1 & 0\\-j & 0\\0 & 1\\0 & -1\end{bmatrix}$$

$$\frac{1}{2}\begin{bmatrix}1 & 0\\0 & 1\\1 & 0\\0 & 1\end{bmatrix} \quad \frac{1}{2}\begin{bmatrix}1 & 0\\0 & 1\\1 & 0\\0 & -1\end{bmatrix} \quad \frac{1}{2}\begin{bmatrix}1 & 0\\0 & 1\\j & 0\\0 & j\end{bmatrix} \quad \frac{1}{2}\begin{bmatrix}1 & 0\\0 & 1\\-1 & 0\\0 & 1\end{bmatrix} \quad \frac{1}{2}\begin{bmatrix}1 & 0\\0 & 1\\-1 & 0\\0 & -1\end{bmatrix} \quad \frac{1}{2}\begin{bmatrix}1 & 0\\0 & 1\\-j & 0\\0 & j\end{bmatrix}$$

$$\frac{1}{2}\begin{bmatrix}1 & 0\\0 & 1\\0 & 1\\1 & 0\end{bmatrix} \quad \frac{1}{2}\begin{bmatrix}1 & 0\\0 & 1\\0 & -1\\1 & 0\end{bmatrix} \quad \frac{1}{2}\begin{bmatrix}1 & 0\\0 & 1\\0 & 1\\-1 & 0\end{bmatrix} \quad \frac{1}{2}\begin{bmatrix}1 & 0\\0 & 1\\0 & -1\\-1 & 0\end{bmatrix} \quad \frac{1}{2}\begin{bmatrix}1 & 0\\0 & 1\\0 & j\\-j & 0\end{bmatrix} \quad \frac{1}{2}\begin{bmatrix}1 & 0\\0 & 1\\0 & -1\\-j & 0\end{bmatrix}$$

TABLE 28

$$\frac{1}{2}\begin{bmatrix}1 & 0\\1 & 0\\0 & 1\\0 & -j\end{bmatrix} \quad \frac{1}{2}\begin{bmatrix}1 & 0\\1 & 0\\0 & 1\\0 & j\end{bmatrix} \quad \frac{1}{2}\begin{bmatrix}1 & 0\\j & 0\\0 & 1\\0 & 1\end{bmatrix} \quad \frac{1}{2}\begin{bmatrix}1 & 0\\j & 0\\0 & 1\\0 & -1\end{bmatrix} \quad \frac{1}{2}\begin{bmatrix}1 & 0\\-1 & 0\\0 & 1\\0 & -j\end{bmatrix} \quad \frac{1}{2}\begin{bmatrix}1 & 0\\-1 & 0\\0 & 1\\0 & j\end{bmatrix} \quad \frac{1}{2}\begin{bmatrix}1 & 0\\-j & 0\\0 & 1\\0 & 1\end{bmatrix} \quad \frac{1}{2}\begin{bmatrix}1 & 0\\-j & 0\\0 & 1\\0 & -1\end{bmatrix}$$

$$\frac{1}{2}\begin{bmatrix}1 & 0\\0 & 1\\1 & 0\\0 & 1\end{bmatrix} \quad \frac{1}{2}\begin{bmatrix}1 & 0\\0 & 1\\1 & 0\\0 & -1\end{bmatrix} \quad \frac{1}{2}\begin{bmatrix}1 & 0\\0 & 1\\j & 0\\0 & j\end{bmatrix} \quad \frac{1}{2}\begin{bmatrix}1 & 0\\0 & 1\\-1 & 0\\0 & 1\end{bmatrix} \quad \frac{1}{2}\begin{bmatrix}1 & 0\\0 & 1\\-1 & 0\\0 & -1\end{bmatrix} \quad \frac{1}{2}\begin{bmatrix}1 & 0\\0 & 1\\-j & 0\\0 & -j\end{bmatrix}$$

$$\frac{1}{2}\begin{bmatrix}1 & 0\\0 & 1\\0 & 1\\1 & 0\end{bmatrix} \quad \frac{1}{2}\begin{bmatrix}1 & 0\\0 & 1\\0 & -1\\1 & 0\end{bmatrix} \quad \frac{1}{2}\begin{bmatrix}1 & 0\\0 & 1\\0 & j\\j & 0\end{bmatrix} \quad \frac{1}{2}\begin{bmatrix}1 & 0\\0 & 1\\0 & -j\\j & 0\end{bmatrix} \quad \frac{1}{2}\begin{bmatrix}1 & 0\\0 & 1\\0 & 1\\-1 & 0\end{bmatrix} \quad \frac{1}{2}\begin{bmatrix}1 & 0\\0 & 1\\0 & -1\\-1 & 0\end{bmatrix}$$

TABLE 29

| | | | | | | | |
|---|---|---|---|---|---|---|---|
| $\frac{1}{2}\begin{bmatrix}1&0\\1&0\\0&1\\0&-j\end{bmatrix}$ | $\frac{1}{2}\begin{bmatrix}1&0\\1&0\\0&1\\0&j\end{bmatrix}$ | $\frac{1}{2}\begin{bmatrix}1&0\\j&0\\0&1\\0&1\end{bmatrix}$ | $\frac{1}{2}\begin{bmatrix}1&0\\j&0\\0&1\\0&-1\end{bmatrix}$ | $\frac{1}{2}\begin{bmatrix}1&0\\-1&0\\0&1\\0&-j\end{bmatrix}$ | $\frac{1}{2}\begin{bmatrix}1&0\\-1&0\\0&1\\0&j\end{bmatrix}$ | $\frac{1}{2}\begin{bmatrix}1&0\\-j&0\\0&1\\0&1\end{bmatrix}$ | $\frac{1}{2}\begin{bmatrix}1&0\\-j&0\\0&1\\0&-1\end{bmatrix}$ |
| $\frac{1}{2}\begin{bmatrix}1&0\\0&1\\1&0\\0&1\end{bmatrix}$ | $\frac{1}{2}\begin{bmatrix}1&0\\0&1\\1&0\\0&-1\end{bmatrix}$ | $\frac{1}{2}\begin{bmatrix}1&0\\0&1\\j&0\\0&j\end{bmatrix}$ | | $\frac{1}{2}\begin{bmatrix}1&0\\0&1\\-1&0\\0&1\end{bmatrix}$ | $\frac{1}{2}\begin{bmatrix}1&0\\0&1\\-1&0\\0&-1\end{bmatrix}$ | | $\frac{1}{2}\begin{bmatrix}1&0\\0&1\\-j&0\\0&-j\end{bmatrix}$ |
| $\frac{1}{2}\begin{bmatrix}1&0\\0&1\\0&1\\1&0\end{bmatrix}$ | $\frac{1}{2}\begin{bmatrix}1&0\\0&1\\0&-1\\1&0\end{bmatrix}$ | $\frac{1}{2}\begin{bmatrix}1&0\\0&1\\0&j\\j&0\end{bmatrix}$ | | $\frac{1}{2}\begin{bmatrix}1&0\\0&1\\0&1\\-1&0\end{bmatrix}$ | $\frac{1}{2}\begin{bmatrix}1&0\\0&1\\0&-1\\-1&0\end{bmatrix}$ | $\frac{1}{2}\begin{bmatrix}1&0\\0&1\\0&j\\-j&0\end{bmatrix}$ | |

TABLE 30

| | | | | | | | |
|---|---|---|---|---|---|---|---|
| $\frac{1}{2}\begin{bmatrix}1&0\\1&0\\0&1\\0&-j\end{bmatrix}$ | $\frac{1}{2}\begin{bmatrix}1&0\\1&0\\0&1\\0&j\end{bmatrix}$ | $\frac{1}{2}\begin{bmatrix}1&0\\j&0\\0&1\\0&1\end{bmatrix}$ | $\frac{1}{2}\begin{bmatrix}1&0\\j&0\\0&1\\0&-1\end{bmatrix}$ | $\frac{1}{2}\begin{bmatrix}1&0\\-1&0\\0&1\\0&-j\end{bmatrix}$ | $\frac{1}{2}\begin{bmatrix}1&0\\-1&0\\0&1\\0&j\end{bmatrix}$ | $\frac{1}{2}\begin{bmatrix}1&0\\-j&0\\0&1\\0&1\end{bmatrix}$ | $\frac{1}{2}\begin{bmatrix}1&0\\-j&0\\0&1\\0&-1\end{bmatrix}$ |
| $\frac{1}{2}\begin{bmatrix}1&0\\0&1\\1&0\\0&1\end{bmatrix}$ | $\frac{1}{2}\begin{bmatrix}1&0\\0&1\\1&0\\0&-1\end{bmatrix}$ | $\frac{1}{2}\begin{bmatrix}1&0\\0&1\\j&0\\0&j\end{bmatrix}$ | | $\frac{1}{2}\begin{bmatrix}1&0\\0&1\\-1&0\\0&1\end{bmatrix}$ | $\frac{1}{2}\begin{bmatrix}1&0\\0&1\\-1&0\\0&-1\end{bmatrix}$ | | $\frac{1}{2}\begin{bmatrix}1&0\\0&1\\-j&0\\0&-j\end{bmatrix}$ |
| $\frac{1}{2}\begin{bmatrix}1&0\\0&1\\0&1\\1&0\end{bmatrix}$ | $\frac{1}{2}\begin{bmatrix}1&0\\0&1\\0&-1\\1&0\end{bmatrix}$ | $\frac{1}{2}\begin{bmatrix}1&0\\0&1\\0&j\\j&0\end{bmatrix}$ | | $\frac{1}{2}\begin{bmatrix}1&0\\0&1\\0&1\\-1&0\end{bmatrix}$ | $\frac{1}{2}\begin{bmatrix}1&0\\0&1\\0&-1\\-1&0\end{bmatrix}$ | | $\frac{1}{2}\begin{bmatrix}1&0\\0&1\\0&-j\\-j&0\end{bmatrix}$ |

TABLE 31

| | | | | | | | |
|---|---|---|---|---|---|---|---|
| $\frac{1}{2}\begin{bmatrix}1&0\\1&0\\0&1\\0&-j\end{bmatrix}$ | $\frac{1}{2}\begin{bmatrix}1&0\\1&0\\0&1\\0&j\end{bmatrix}$ | $\frac{1}{2}\begin{bmatrix}1&0\\j&0\\0&1\\0&1\end{bmatrix}$ | $\frac{1}{2}\begin{bmatrix}1&0\\j&0\\0&1\\0&-1\end{bmatrix}$ | $\frac{1}{2}\begin{bmatrix}1&0\\-1&0\\0&1\\0&-j\end{bmatrix}$ | $\frac{1}{2}\begin{bmatrix}1&0\\-1&0\\0&1\\0&j\end{bmatrix}$ | $\frac{1}{2}\begin{bmatrix}1&0\\-j&0\\0&1\\0&1\end{bmatrix}$ | $\frac{1}{2}\begin{bmatrix}1&0\\-j&0\\0&1\\0&-1\end{bmatrix}$ |
| $\frac{1}{2}\begin{bmatrix}1&0\\0&1\\1&0\\0&1\end{bmatrix}$ | $\frac{1}{2}\begin{bmatrix}1&0\\0&1\\1&0\\0&-1\end{bmatrix}$ | $\frac{1}{2}\begin{bmatrix}1&0\\0&1\\j&0\\0&j\end{bmatrix}$ | | $\frac{1}{2}\begin{bmatrix}1&0\\0&1\\-1&0\\0&1\end{bmatrix}$ | $\frac{1}{2}\begin{bmatrix}1&0\\0&1\\-1&0\\0&-1\end{bmatrix}$ | | $\frac{1}{2}\begin{bmatrix}1&0\\0&1\\-j&0\\0&-j\end{bmatrix}$ |
| $\frac{1}{2}\begin{bmatrix}1&0\\0&1\\0&1\\1&0\end{bmatrix}$ | $\frac{1}{2}\begin{bmatrix}1&0\\0&1\\0&-1\\1&0\end{bmatrix}$ | | $\frac{1}{2}\begin{bmatrix}1&0\\0&1\\0&-1\\j&0\end{bmatrix}$ | $\frac{1}{2}\begin{bmatrix}1&0\\0&1\\0&1\\-1&0\end{bmatrix}$ | $\frac{1}{2}\begin{bmatrix}1&0\\0&1\\0&-1\\-1&0\end{bmatrix}$ | $\frac{1}{2}\begin{bmatrix}1&0\\0&1\\0&j\\-j&0\end{bmatrix}$ | |

TABLE 32

| | | | | | | | |
|---|---|---|---|---|---|---|---|
| $\frac{1}{2}\begin{bmatrix}1&0\\1&0\\0&1\\0&-j\end{bmatrix}$ | $\frac{1}{2}\begin{bmatrix}1&0\\1&0\\0&1\\0&j\end{bmatrix}$ | $\frac{1}{2}\begin{bmatrix}1&0\\j&0\\0&1\\0&1\end{bmatrix}$ | $\frac{1}{2}\begin{bmatrix}1&0\\j&0\\0&1\\0&-1\end{bmatrix}$ | $\frac{1}{2}\begin{bmatrix}1&0\\-1&0\\0&1\\0&-j\end{bmatrix}$ | $\frac{1}{2}\begin{bmatrix}1&0\\-1&0\\0&1\\0&j\end{bmatrix}$ | $\frac{1}{2}\begin{bmatrix}1&0\\-j&0\\0&1\\0&1\end{bmatrix}$ | $\frac{1}{2}\begin{bmatrix}1&0\\-j&0\\0&1\\0&-1\end{bmatrix}$ |

TABLE 32-continued

| | | | | | | |
|---|---|---|---|---|---|---|
| $\frac{1}{2}\begin{bmatrix} 1 & 0 \\ 0 & 1 \\ 1 & 0 \\ 0 & 1 \end{bmatrix}$ | $\frac{1}{2}\begin{bmatrix} 1 & 0 \\ 0 & 1 \\ 1 & 0 \\ 0 & -1 \end{bmatrix}$ | $\frac{1}{2}\begin{bmatrix} 1 & 0 \\ 0 & 1 \\ j & 0 \\ 0 & j \end{bmatrix}$ | | $\frac{1}{2}\begin{bmatrix} 1 & 0 \\ 0 & 1 \\ -1 & 0 \\ 0 & 1 \end{bmatrix}$ | $\frac{1}{2}\begin{bmatrix} 1 & 0 \\ 0 & 1 \\ -1 & 0 \\ 0 & -1 \end{bmatrix}$ | $\frac{1}{2}\begin{bmatrix} 1 & 0 \\ 0 & 1 \\ -j & 0 \\ 0 & -j \end{bmatrix}$ |
| $\frac{1}{2}\begin{bmatrix} 1 & 0 \\ 0 & 1 \\ 0 & 1 \\ 1 & 0 \end{bmatrix}$ | $\frac{1}{2}\begin{bmatrix} 1 & 0 \\ 0 & 1 \\ 0 & -1 \\ 1 & 0 \end{bmatrix}$ | | $\frac{1}{2}\begin{bmatrix} 1 & 0 \\ 0 & 1 \\ 0 & -1 \\ j & 0 \end{bmatrix}$ | $\frac{1}{2}\begin{bmatrix} 1 & 0 \\ 0 & 1 \\ 0 & 1 \\ -1 & 0 \end{bmatrix}$ | $\frac{1}{2}\begin{bmatrix} 1 & 0 \\ 0 & 1 \\ 0 & -1 \\ -1 & 0 \end{bmatrix}$ | $\frac{1}{2}\begin{bmatrix} 1 & 0 \\ 0 & 1 \\ 0 & -j \\ -j & 0 \end{bmatrix}$ |

TABLE 33

| | | | | | | | |
|---|---|---|---|---|---|---|---|
| $\frac{1}{2}\begin{bmatrix} 1 & 0 \\ 1 & 0 \\ 0 & 1 \\ 0 & -j \end{bmatrix}$ | $\frac{1}{2}\begin{bmatrix} 1 & 0 \\ 1 & 0 \\ 0 & 1 \\ 0 & j \end{bmatrix}$ | $\frac{1}{2}\begin{bmatrix} 1 & 0 \\ j & 0 \\ 0 & 1 \\ 0 & 1 \end{bmatrix}$ | $\frac{1}{2}\begin{bmatrix} 1 & 0 \\ j & 0 \\ 0 & 1 \\ 0 & -1 \end{bmatrix}$ | $\frac{1}{2}\begin{bmatrix} 1 & 0 \\ -1 & 0 \\ 0 & 1 \\ 0 & -j \end{bmatrix}$ | $\frac{1}{2}\begin{bmatrix} 1 & 0 \\ -1 & 0 \\ 0 & 1 \\ 0 & j \end{bmatrix}$ | $\frac{1}{2}\begin{bmatrix} 1 & 0 \\ -j & 0 \\ 0 & 1 \\ 0 & 1 \end{bmatrix}$ | $\frac{1}{2}\begin{bmatrix} 1 & 0 \\ -j & 0 \\ 0 & 1 \\ 0 & -1 \end{bmatrix}$ |
| $\frac{1}{2}\begin{bmatrix} 1 & 0 \\ 0 & 1 \\ 1 & 0 \\ 0 & 1 \end{bmatrix}$ | $\frac{1}{2}\begin{bmatrix} 1 & 0 \\ 0 & 1 \\ 1 & 0 \\ 0 & -1 \end{bmatrix}$ | $\frac{1}{2}\begin{bmatrix} 1 & 0 \\ 0 & 1 \\ j & 0 \\ 0 & j \end{bmatrix}$ | | $\frac{1}{2}\begin{bmatrix} 1 & 0 \\ 0 & 1 \\ -1 & 0 \\ 0 & 1 \end{bmatrix}$ | $\frac{1}{2}\begin{bmatrix} 1 & 0 \\ 0 & 1 \\ -1 & 0 \\ 0 & -1 \end{bmatrix}$ | | $\frac{1}{2}\begin{bmatrix} 1 & 0 \\ 0 & 1 \\ -j & 0 \\ 0 & -j \end{bmatrix}$ |
| $\frac{1}{2}\begin{bmatrix} 1 & 0 \\ 0 & 1 \\ 0 & 1 \\ 1 & 0 \end{bmatrix}$ | $\frac{1}{2}\begin{bmatrix} 1 & 0 \\ 0 & 1 \\ 0 & -1 \\ 1 & 0 \end{bmatrix}$ | | | $\frac{1}{2}\begin{bmatrix} 1 & 0 \\ 0 & 1 \\ 0 & 1 \\ -1 & 0 \end{bmatrix}$ | $\frac{1}{2}\begin{bmatrix} 1 & 0 \\ 0 & 1 \\ 0 & -1 \\ -1 & 0 \end{bmatrix}$ | $\frac{1}{2}\begin{bmatrix} 1 & 0 \\ 0 & 1 \\ 0 & j \\ -j & 0 \end{bmatrix}$ | $\frac{1}{2}\begin{bmatrix} 1 & 0 \\ 0 & 1 \\ 0 & -j \\ -j & 0 \end{bmatrix}$ |

TABLE 34

| | | | | | | | |
|---|---|---|---|---|---|---|---|
| $\frac{1}{2}\begin{bmatrix} 1 & 0 \\ 1 & 0 \\ 0 & 1 \\ 0 & -j \end{bmatrix}$ | $\frac{1}{2}\begin{bmatrix} 1 & 0 \\ 1 & 0 \\ 0 & 1 \\ 0 & j \end{bmatrix}$ | $\frac{1}{2}\begin{bmatrix} 1 & 0 \\ j & 0 \\ 0 & 1 \\ 0 & 1 \end{bmatrix}$ | $\frac{1}{2}\begin{bmatrix} 1 & 0 \\ j & 0 \\ 0 & 1 \\ 0 & -1 \end{bmatrix}$ | $\frac{1}{2}\begin{bmatrix} 1 & 0 \\ -1 & 0 \\ 0 & 1 \\ 0 & -j \end{bmatrix}$ | $\frac{1}{2}\begin{bmatrix} 1 & 0 \\ -1 & 0 \\ 0 & 1 \\ 0 & j \end{bmatrix}$ | $\frac{1}{2}\begin{bmatrix} 1 & 0 \\ -j & 0 \\ 0 & 1 \\ 0 & 1 \end{bmatrix}$ | $\frac{1}{2}\begin{bmatrix} 1 & 0 \\ -j & 0 \\ 0 & 1 \\ 0 & -1 \end{bmatrix}$ |
| $\frac{1}{2}\begin{bmatrix} 1 & 0 \\ 0 & 1 \\ 1 & 0 \\ 0 & 1 \end{bmatrix}$ | $\frac{1}{2}\begin{bmatrix} 1 & 0 \\ 0 & 1 \\ 1 & 0 \\ 0 & -1 \end{bmatrix}$ | | $\frac{1}{2}\begin{bmatrix} 1 & 0 \\ 0 & 1 \\ j & 0 \\ 0 & -j \end{bmatrix}$ | $\frac{1}{2}\begin{bmatrix} 1 & 0 \\ 0 & 1 \\ -1 & 0 \\ 0 & 1 \end{bmatrix}$ | $\frac{1}{2}\begin{bmatrix} 1 & 0 \\ 0 & 1 \\ -1 & 0 \\ 0 & -1 \end{bmatrix}$ | $\frac{1}{2}\begin{bmatrix} 1 & 0 \\ 0 & 1 \\ -j & 0 \\ 0 & j \end{bmatrix}$ | |
| $\frac{1}{2}\begin{bmatrix} 1 & 0 \\ 0 & 1 \\ 0 & 1 \\ 1 & 0 \end{bmatrix}$ | $\frac{1}{2}\begin{bmatrix} 1 & 0 \\ 0 & 1 \\ 0 & -1 \\ 1 & 0 \end{bmatrix}$ | $\frac{1}{2}\begin{bmatrix} 1 & 0 \\ 0 & 1 \\ 0 & j \\ j & 0 \end{bmatrix}$ | $\frac{1}{2}\begin{bmatrix} 1 & 0 \\ 0 & 1 \\ 0 & -j \\ j & 0 \end{bmatrix}$ | $\frac{1}{2}\begin{bmatrix} 1 & 0 \\ 0 & 1 \\ 0 & 1 \\ -1 & 0 \end{bmatrix}$ | $\frac{1}{2}\begin{bmatrix} 1 & 0 \\ 0 & 1 \\ 0 & -1 \\ -1 & 0 \end{bmatrix}$ | | |

TABLE 35

| | | | | | | | |
|---|---|---|---|---|---|---|---|
| $\frac{1}{2}\begin{bmatrix} 1 & 0 \\ 1 & 0 \\ 0 & 1 \\ 0 & -j \end{bmatrix}$ | $\frac{1}{2}\begin{bmatrix} 1 & 0 \\ 1 & 0 \\ 0 & 1 \\ 0 & j \end{bmatrix}$ | $\frac{1}{2}\begin{bmatrix} 1 & 0 \\ j & 0 \\ 0 & 1 \\ 0 & 1 \end{bmatrix}$ | $\frac{1}{2}\begin{bmatrix} 1 & 0 \\ j & 0 \\ 0 & 1 \\ 0 & -1 \end{bmatrix}$ | $\frac{1}{2}\begin{bmatrix} 1 & 0 \\ -1 & 0 \\ 0 & 1 \\ 0 & -j \end{bmatrix}$ | $\frac{1}{2}\begin{bmatrix} 1 & 0 \\ -1 & 0 \\ 0 & 1 \\ 0 & j \end{bmatrix}$ | $\frac{1}{2}\begin{bmatrix} 1 & 0 \\ -j & 0 \\ 0 & 1 \\ 0 & 1 \end{bmatrix}$ | $\frac{1}{2}\begin{bmatrix} 1 & 0 \\ -j & 0 \\ 0 & 1 \\ 0 & -1 \end{bmatrix}$ |
| $\frac{1}{2}\begin{bmatrix} 1 & 0 \\ 0 & 1 \\ 1 & 0 \\ 0 & 1 \end{bmatrix}$ | $\frac{1}{2}\begin{bmatrix} 1 & 0 \\ 0 & 1 \\ 1 & 0 \\ 0 & -1 \end{bmatrix}$ | | $\frac{1}{2}\begin{bmatrix} 1 & 0 \\ 0 & 1 \\ j & 0 \\ 0 & -j \end{bmatrix}$ | $\frac{1}{2}\begin{bmatrix} 1 & 0 \\ 0 & 1 \\ -1 & 0 \\ 0 & 1 \end{bmatrix}$ | $\frac{1}{2}\begin{bmatrix} 1 & 0 \\ 0 & 1 \\ -1 & 0 \\ 0 & -1 \end{bmatrix}$ | $\frac{1}{2}\begin{bmatrix} 1 & 0 \\ 0 & 1 \\ -j & 0 \\ 0 & j \end{bmatrix}$ | |

TABLE 35-continued $$\frac{1}{2}\begin{bmatrix} 1 & 0 \\ 0 & 1 \\ 0 & 1 \\ 1 & 0 \end{bmatrix} \quad \frac{1}{2}\begin{bmatrix} 1 & 0 \\ 0 & 1 \\ 0 & -1 \\ 1 & 0 \end{bmatrix} \quad \frac{1}{2}\begin{bmatrix} 1 & 0 \\ 0 & 1 \\ 0 & j \\ j & 0 \end{bmatrix} \quad \frac{1}{2}\begin{bmatrix} 1 & 0 \\ 0 & 1 \\ 0 & 1 \\ -1 & 0 \end{bmatrix} \quad \frac{1}{2}\begin{bmatrix} 1 & 0 \\ 0 & 1 \\ 0 & -1 \\ -1 & 0 \end{bmatrix} \quad \frac{1}{2}\begin{bmatrix} 1 & 0 \\ 0 & 1 \\ 0 & j \\ -j & 0 \end{bmatrix}$$

TABLE 36

$$\frac{1}{2}\begin{bmatrix} 1 & 0 \\ 1 & 0 \\ 0 & 1 \\ 0 & -j \end{bmatrix} \quad \frac{1}{2}\begin{bmatrix} 1 & 0 \\ 1 & 0 \\ 0 & 1 \\ 0 & j \end{bmatrix} \quad \frac{1}{2}\begin{bmatrix} 1 & 0 \\ j & 0 \\ 0 & 1 \\ 0 & 1 \end{bmatrix} \quad \frac{1}{2}\begin{bmatrix} 1 & 0 \\ j & 0 \\ 0 & 1 \\ 0 & -1 \end{bmatrix} \quad \frac{1}{2}\begin{bmatrix} 1 & 0 \\ -1 & 0 \\ 0 & 1 \\ 0 & -j \end{bmatrix} \quad \frac{1}{2}\begin{bmatrix} 1 & 0 \\ -1 & 0 \\ 0 & 1 \\ 0 & j \end{bmatrix} \quad \frac{1}{2}\begin{bmatrix} 1 & 0 \\ -j & 0 \\ 0 & 1 \\ 0 & 1 \end{bmatrix} \quad \frac{1}{2}\begin{bmatrix} 1 & 0 \\ -j & 0 \\ 0 & 1 \\ 0 & -1 \end{bmatrix}$$

$$\frac{1}{2}\begin{bmatrix} 1 & 0 \\ 0 & 1 \\ 1 & 0 \\ 0 & 1 \end{bmatrix} \quad \frac{1}{2}\begin{bmatrix} 1 & 0 \\ 0 & 1 \\ 1 & 0 \\ 0 & -1 \end{bmatrix} \quad \frac{1}{2}\begin{bmatrix} 1 & 0 \\ 0 & 1 \\ j & 0 \\ 0 & -j \end{bmatrix} \quad \frac{1}{2}\begin{bmatrix} 1 & 0 \\ 0 & 1 \\ -1 & 0 \\ 0 & 1 \end{bmatrix} \quad \frac{1}{2}\begin{bmatrix} 1 & 0 \\ 0 & 1 \\ -1 & 0 \\ 0 & -1 \end{bmatrix} \quad \frac{1}{2}\begin{bmatrix} 1 & 0 \\ 0 & 1 \\ -j & 0 \\ 0 & j \end{bmatrix}$$

$$\frac{1}{2}\begin{bmatrix} 1 & 0 \\ 0 & 1 \\ 0 & 1 \\ 1 & 0 \end{bmatrix} \quad \frac{1}{2}\begin{bmatrix} 1 & 0 \\ 0 & 1 \\ 0 & -1 \\ 1 & 0 \end{bmatrix} \quad \frac{1}{2}\begin{bmatrix} 1 & 0 \\ 0 & 1 \\ 0 & j \\ j & 0 \end{bmatrix} \quad \frac{1}{2}\begin{bmatrix} 1 & 0 \\ 0 & 1 \\ 0 & 1 \\ -1 & 0 \end{bmatrix} \quad \frac{1}{2}\begin{bmatrix} 1 & 0 \\ 0 & 1 \\ 0 & -1 \\ -1 & 0 \end{bmatrix} \quad \frac{1}{2}\begin{bmatrix} 1 & 0 \\ 0 & 1 \\ 0 & -j \\ -j & 0 \end{bmatrix}$$

TABLE 37

$$\frac{1}{2}\begin{bmatrix} 1 & 0 \\ 1 & 0 \\ 0 & 1 \\ 0 & -j \end{bmatrix} \quad \frac{1}{2}\begin{bmatrix} 1 & 0 \\ 1 & 0 \\ 0 & 1 \\ 0 & j \end{bmatrix} \quad \frac{1}{2}\begin{bmatrix} 1 & 0 \\ j & 0 \\ 0 & 1 \\ 0 & 1 \end{bmatrix} \quad \frac{1}{2}\begin{bmatrix} 1 & 0 \\ j & 0 \\ 0 & 1 \\ 0 & -1 \end{bmatrix} \quad \frac{1}{2}\begin{bmatrix} 1 & 0 \\ -1 & 0 \\ 0 & 1 \\ 0 & -j \end{bmatrix} \quad \frac{1}{2}\begin{bmatrix} 1 & 0 \\ -1 & 0 \\ 0 & 1 \\ 0 & j \end{bmatrix} \quad \frac{1}{2}\begin{bmatrix} 1 & 0 \\ -j & 0 \\ 0 & 1 \\ 0 & 1 \end{bmatrix} \quad \frac{1}{2}\begin{bmatrix} 1 & 0 \\ -j & 0 \\ 0 & 1 \\ 0 & -1 \end{bmatrix}$$

$$\frac{1}{2}\begin{bmatrix} 1 & 0 \\ 0 & 1 \\ 1 & 0 \\ 0 & 1 \end{bmatrix} \quad \frac{1}{2}\begin{bmatrix} 1 & 0 \\ 0 & 1 \\ 1 & 0 \\ 0 & -1 \end{bmatrix} \quad \frac{1}{2}\begin{bmatrix} 1 & 0 \\ 0 & 1 \\ j & 0 \\ 0 & -j \end{bmatrix} \quad \frac{1}{2}\begin{bmatrix} 1 & 0 \\ 0 & 1 \\ -1 & 0 \\ 0 & 1 \end{bmatrix} \quad \frac{1}{2}\begin{bmatrix} 1 & 0 \\ 0 & 1 \\ -1 & 0 \\ 0 & -1 \end{bmatrix} \quad \frac{1}{2}\begin{bmatrix} 1 & 0 \\ 0 & 1 \\ -j & 0 \\ 0 & j \end{bmatrix}$$

$$\frac{1}{2}\begin{bmatrix} 1 & 0 \\ 0 & 1 \\ 0 & 1 \\ 1 & 0 \end{bmatrix} \quad \frac{1}{2}\begin{bmatrix} 1 & 0 \\ 0 & 1 \\ 0 & -1 \\ 1 & 0 \end{bmatrix} \quad \frac{1}{2}\begin{bmatrix} 1 & 0 \\ 0 & 1 \\ 0 & -1 \\ j & 0 \end{bmatrix} \quad \frac{1}{2}\begin{bmatrix} 1 & 0 \\ 0 & 1 \\ 0 & 1 \\ -1 & 0 \end{bmatrix} \quad \frac{1}{2}\begin{bmatrix} 1 & 0 \\ 0 & 1 \\ 0 & -1 \\ -1 & 0 \end{bmatrix} \quad \frac{1}{2}\begin{bmatrix} 1 & 0 \\ 0 & 1 \\ 0 & j \\ -j & 0 \end{bmatrix}$$

TABLE 38

$$\frac{1}{2}\begin{bmatrix} 1 & 0 \\ 1 & 0 \\ 0 & 1 \\ 0 & -j \end{bmatrix} \quad \frac{1}{2}\begin{bmatrix} 1 & 0 \\ 1 & 0 \\ 0 & 1 \\ 0 & j \end{bmatrix} \quad \frac{1}{2}\begin{bmatrix} 1 & 0 \\ j & 0 \\ 0 & 1 \\ 0 & 1 \end{bmatrix} \quad \frac{1}{2}\begin{bmatrix} 1 & 0 \\ j & 0 \\ 0 & 1 \\ 0 & -1 \end{bmatrix} \quad \frac{1}{2}\begin{bmatrix} 1 & 0 \\ -1 & 0 \\ 0 & 1 \\ 0 & -j \end{bmatrix} \quad \frac{1}{2}\begin{bmatrix} 1 & 0 \\ -1 & 0 \\ 0 & 1 \\ 0 & j \end{bmatrix} \quad \frac{1}{2}\begin{bmatrix} 1 & 0 \\ -j & 0 \\ 0 & 1 \\ 0 & 1 \end{bmatrix} \quad \frac{1}{2}\begin{bmatrix} 1 & 0 \\ -j & 0 \\ 0 & 1 \\ 0 & -1 \end{bmatrix}$$

$$\frac{1}{2}\begin{bmatrix} 1 & 0 \\ 0 & 1 \\ 1 & 0 \\ 0 & 1 \end{bmatrix} \quad \frac{1}{2}\begin{bmatrix} 1 & 0 \\ 0 & 1 \\ 1 & 0 \\ 0 & -1 \end{bmatrix} \quad \frac{1}{2}\begin{bmatrix} 1 & 0 \\ 0 & 1 \\ j & 0 \\ 0 & -j \end{bmatrix} \quad \frac{1}{2}\begin{bmatrix} 1 & 0 \\ 0 & 1 \\ -1 & 0 \\ 0 & 1 \end{bmatrix} \quad \frac{1}{2}\begin{bmatrix} 1 & 0 \\ 0 & 1 \\ -1 & 0 \\ 0 & -1 \end{bmatrix} \quad \frac{1}{2}\begin{bmatrix} 1 & 0 \\ 0 & 1 \\ -j & 0 \\ 0 & j \end{bmatrix}$$

$$\frac{1}{2}\begin{bmatrix} 1 & 0 \\ 0 & 1 \\ 0 & 1 \\ 1 & 0 \end{bmatrix} \quad \frac{1}{2}\begin{bmatrix} 1 & 0 \\ 0 & 1 \\ 0 & -1 \\ 1 & 0 \end{bmatrix} \quad \frac{1}{2}\begin{bmatrix} 1 & 0 \\ 0 & 1 \\ 0 & -1 \\ j & 0 \end{bmatrix} \quad \frac{1}{2}\begin{bmatrix} 1 & 0 \\ 0 & 1 \\ 0 & 1 \\ -1 & 0 \end{bmatrix} \quad \frac{1}{2}\begin{bmatrix} 1 & 0 \\ 0 & 1 \\ 0 & 1 \\ -1 & 0 \end{bmatrix} \quad \frac{1}{2}\begin{bmatrix} 1 & 0 \\ 0 & 1 \\ 0 & -j \\ -j & 0 \end{bmatrix}$$

TABLE 39

$$\frac{1}{2}\begin{bmatrix}1&0\\1&0\\0&1\\0&-j\end{bmatrix} \quad \frac{1}{2}\begin{bmatrix}1&0\\1&0\\0&1\\0&j\end{bmatrix} \quad \frac{1}{2}\begin{bmatrix}1&0\\j&0\\0&1\\0&1\end{bmatrix} \quad \frac{1}{2}\begin{bmatrix}1&0\\j&0\\0&1\\0&-1\end{bmatrix} \quad \frac{1}{2}\begin{bmatrix}1&0\\-1&0\\0&1\\0&-j\end{bmatrix} \quad \frac{1}{2}\begin{bmatrix}1&0\\-1&0\\0&1\\0&j\end{bmatrix} \quad \frac{1}{2}\begin{bmatrix}1&0\\-j&0\\0&1\\0&1\end{bmatrix} \quad \frac{1}{2}\begin{bmatrix}1&0\\-j&0\\0&1\\0&-1\end{bmatrix}$$

$$\frac{1}{2}\begin{bmatrix}1&0\\0&1\\1&0\\0&1\end{bmatrix} \quad \frac{1}{2}\begin{bmatrix}1&0\\0&1\\1&0\\0&-1\end{bmatrix} \quad\quad \frac{1}{2}\begin{bmatrix}1&0\\0&1\\j&0\\0&-j\end{bmatrix} \quad \frac{1}{2}\begin{bmatrix}1&0\\0&1\\-1&0\\0&1\end{bmatrix} \quad \frac{1}{2}\begin{bmatrix}1&0\\0&1\\-1&0\\0&-1\end{bmatrix} \quad \frac{1}{2}\begin{bmatrix}1&0\\0&1\\-j&0\\0&j\end{bmatrix}$$

$$\frac{1}{2}\begin{bmatrix}1&0\\0&1\\0&1\\1&0\end{bmatrix} \quad \frac{1}{2}\begin{bmatrix}1&0\\0&1\\0&-1\\1&0\end{bmatrix} \quad\quad \frac{1}{2}\begin{bmatrix}1&0\\0&1\\0&1\\-1&0\end{bmatrix} \quad \frac{1}{2}\begin{bmatrix}1&0\\0&1\\0&-1\\-1&0\end{bmatrix} \quad \frac{1}{2}\begin{bmatrix}1&0\\0&1\\0&j\\-j&0\end{bmatrix} \quad \frac{1}{2}\begin{bmatrix}1&0\\0&1\\0&-j\\-j&0\end{bmatrix}$$

TABLE 40

$$\frac{1}{2}\begin{bmatrix}1&0\\1&0\\0&1\\0&-j\end{bmatrix} \quad \frac{1}{2}\begin{bmatrix}1&0\\1&0\\0&1\\0&j\end{bmatrix} \quad \frac{1}{2}\begin{bmatrix}1&0\\j&0\\0&1\\0&1\end{bmatrix} \quad \frac{1}{2}\begin{bmatrix}1&0\\j&0\\0&1\\0&-1\end{bmatrix} \quad \frac{1}{2}\begin{bmatrix}1&0\\-1&0\\0&1\\0&-j\end{bmatrix} \quad \frac{1}{2}\begin{bmatrix}1&0\\-1&0\\0&1\\0&j\end{bmatrix} \quad \frac{1}{2}\begin{bmatrix}1&0\\-j&0\\0&1\\0&1\end{bmatrix} \quad \frac{1}{2}\begin{bmatrix}1&0\\-j&0\\0&1\\0&-1\end{bmatrix}$$

$$\frac{1}{2}\begin{bmatrix}1&0\\0&1\\1&0\\0&1\end{bmatrix} \quad \frac{1}{2}\begin{bmatrix}1&0\\0&1\\1&0\\0&-1\end{bmatrix} \quad\quad \frac{1}{2}\begin{bmatrix}1&0\\0&1\\j&0\\0&-j\end{bmatrix} \quad \frac{1}{2}\begin{bmatrix}1&0\\0&1\\-1&0\\0&1\end{bmatrix} \quad \frac{1}{2}\begin{bmatrix}1&0\\0&1\\-1&0\\0&-1\end{bmatrix} \quad\quad \frac{1}{2}\begin{bmatrix}1&0\\0&1\\-j&0\\0&-j\end{bmatrix}$$

$$\frac{1}{2}\begin{bmatrix}1&0\\0&1\\0&1\\1&0\end{bmatrix} \quad \frac{1}{2}\begin{bmatrix}1&0\\0&1\\0&-1\\1&0\end{bmatrix} \quad \frac{1}{2}\begin{bmatrix}1&0\\0&1\\0&j\\j&0\end{bmatrix} \quad \frac{1}{2}\begin{bmatrix}1&0\\0&1\\0&-j\\j&0\end{bmatrix} \quad \frac{1}{2}\begin{bmatrix}1&0\\0&1\\0&1\\-1&0\end{bmatrix} \quad \frac{1}{2}\begin{bmatrix}1&0\\0&1\\0&-1\\-1&0\end{bmatrix}$$

TABLE 41

$$\frac{1}{2}\begin{bmatrix}1&0\\1&0\\0&1\\0&-j\end{bmatrix} \quad \frac{1}{2}\begin{bmatrix}1&0\\1&0\\0&1\\0&j\end{bmatrix} \quad \frac{1}{2}\begin{bmatrix}1&0\\j&0\\0&1\\0&1\end{bmatrix} \quad \frac{1}{2}\begin{bmatrix}1&0\\j&0\\0&1\\0&-1\end{bmatrix} \quad \frac{1}{2}\begin{bmatrix}1&0\\-1&0\\0&1\\0&-j\end{bmatrix} \quad \frac{1}{2}\begin{bmatrix}1&0\\-1&0\\0&1\\0&j\end{bmatrix} \quad \frac{1}{2}\begin{bmatrix}1&0\\-j&0\\0&1\\0&1\end{bmatrix} \quad \frac{1}{2}\begin{bmatrix}1&0\\-j&0\\0&1\\0&-1\end{bmatrix}$$

$$\frac{1}{2}\begin{bmatrix}1&0\\0&1\\1&0\\0&1\end{bmatrix} \quad \frac{1}{2}\begin{bmatrix}1&0\\0&1\\1&0\\0&-1\end{bmatrix} \quad\quad \frac{1}{2}\begin{bmatrix}1&0\\0&1\\j&0\\0&-j\end{bmatrix} \quad \frac{1}{2}\begin{bmatrix}1&0\\0&1\\-1&0\\0&1\end{bmatrix} \quad \frac{1}{2}\begin{bmatrix}1&0\\0&1\\-1&0\\0&-1\end{bmatrix} \quad\quad \frac{1}{2}\begin{bmatrix}1&0\\0&1\\-j&0\\0&-j\end{bmatrix}$$

$$\frac{1}{2}\begin{bmatrix}1&0\\0&1\\0&1\\1&0\end{bmatrix} \quad \frac{1}{2}\begin{bmatrix}1&0\\0&1\\0&-1\\1&0\end{bmatrix} \quad \frac{1}{2}\begin{bmatrix}1&0\\0&1\\0&j\\j&0\end{bmatrix} \quad\quad \frac{1}{2}\begin{bmatrix}1&0\\0&1\\0&1\\-1&0\end{bmatrix} \quad \frac{1}{2}\begin{bmatrix}1&0\\0&1\\0&-1\\-1&0\end{bmatrix} \quad \frac{1}{2}\begin{bmatrix}1&0\\0&1\\0&j\\-j&0\end{bmatrix}$$

TABLE 42

$$\frac{1}{2}\begin{bmatrix}1&0\\1&0\\0&1\\0&-j\end{bmatrix} \quad \frac{1}{2}\begin{bmatrix}1&0\\1&0\\0&1\\0&j\end{bmatrix} \quad \frac{1}{2}\begin{bmatrix}1&0\\j&0\\0&1\\0&1\end{bmatrix} \quad \frac{1}{2}\begin{bmatrix}1&0\\j&0\\0&1\\0&-1\end{bmatrix} \quad \frac{1}{2}\begin{bmatrix}1&0\\-1&0\\0&1\\0&-j\end{bmatrix} \quad \frac{1}{2}\begin{bmatrix}1&0\\-1&0\\0&1\\0&j\end{bmatrix} \quad \frac{1}{2}\begin{bmatrix}1&0\\-j&0\\0&1\\0&1\end{bmatrix} \quad \frac{1}{2}\begin{bmatrix}1&0\\-j&0\\0&1\\0&-1\end{bmatrix}$$

TABLE 42-continued $$\frac{1}{2}\begin{bmatrix}1&0\\0&1\\1&0\\0&1\end{bmatrix} \quad \frac{1}{2}\begin{bmatrix}1&0\\0&1\\1&0\\0&-1\end{bmatrix} \quad \frac{1}{2}\begin{bmatrix}1&0\\0&1\\j&0\\0&-j\end{bmatrix} \quad \frac{1}{2}\begin{bmatrix}1&0\\0&1\\-1&0\\0&1\end{bmatrix} \quad \frac{1}{2}\begin{bmatrix}1&0\\0&1\\-1&0\\0&-1\end{bmatrix} \quad \frac{1}{2}\begin{bmatrix}1&0\\0&1\\-j&0\\0&-j\end{bmatrix}$$

$$\frac{1}{2}\begin{bmatrix}1&0\\0&1\\0&1\\1&0\end{bmatrix} \quad \frac{1}{2}\begin{bmatrix}1&0\\0&1\\0&-1\\1&0\end{bmatrix} \quad \frac{1}{2}\begin{bmatrix}1&0\\0&1\\0&j\\j&0\end{bmatrix} \quad \frac{1}{2}\begin{bmatrix}1&0\\0&1\\0&1\\-1&0\end{bmatrix} \quad \frac{1}{2}\begin{bmatrix}1&0\\0&1\\0&-1\\-1&0\end{bmatrix} \quad \frac{1}{2}\begin{bmatrix}1&0\\0&1\\0&-j\\-j&0\end{bmatrix}$$

TABLE 43

$$\frac{1}{2}\begin{bmatrix}1&0\\1&0\\0&1\\0&-j\end{bmatrix} \quad \frac{1}{2}\begin{bmatrix}1&0\\1&0\\0&1\\0&j\end{bmatrix} \quad \frac{1}{2}\begin{bmatrix}1&0\\j&0\\0&1\\0&1\end{bmatrix} \quad \frac{1}{2}\begin{bmatrix}1&0\\j&0\\0&1\\0&-1\end{bmatrix} \quad \frac{1}{2}\begin{bmatrix}1&0\\-1&0\\0&1\\0&-j\end{bmatrix} \quad \frac{1}{2}\begin{bmatrix}1&0\\-1&0\\0&1\\0&j\end{bmatrix} \quad \frac{1}{2}\begin{bmatrix}1&0\\-j&0\\0&1\\0&1\end{bmatrix} \quad \frac{1}{2}\begin{bmatrix}1&0\\-j&0\\0&1\\0&-1\end{bmatrix}$$

$$\frac{1}{2}\begin{bmatrix}1&0\\0&1\\1&0\\0&1\end{bmatrix} \quad \frac{1}{2}\begin{bmatrix}1&0\\0&1\\1&0\\0&-1\end{bmatrix} \quad \frac{1}{2}\begin{bmatrix}1&0\\0&1\\j&0\\0&-j\end{bmatrix} \quad \frac{1}{2}\begin{bmatrix}1&0\\0&1\\-1&0\\0&1\end{bmatrix} \quad \frac{1}{2}\begin{bmatrix}1&0\\0&1\\-1&0\\0&-1\end{bmatrix} \quad \frac{1}{2}\begin{bmatrix}1&0\\0&1\\-j&0\\0&-j\end{bmatrix}$$

$$\frac{1}{2}\begin{bmatrix}1&0\\0&1\\0&1\\1&0\end{bmatrix} \quad \frac{1}{2}\begin{bmatrix}1&0\\0&1\\0&-1\\1&0\end{bmatrix} \quad \frac{1}{2}\begin{bmatrix}1&0\\0&1\\0&-1\\j&0\end{bmatrix} \quad \frac{1}{2}\begin{bmatrix}1&0\\0&1\\0&1\\-1&0\end{bmatrix} \quad \frac{1}{2}\begin{bmatrix}1&0\\0&1\\0&-1\\-1&0\end{bmatrix} \quad \frac{1}{2}\begin{bmatrix}1&0\\0&1\\0&j\\-j&0\end{bmatrix}$$

TABLE 44

$$\frac{1}{2}\begin{bmatrix}1&0\\1&0\\0&1\\0&-j\end{bmatrix} \quad \frac{1}{2}\begin{bmatrix}1&0\\1&0\\0&1\\0&j\end{bmatrix} \quad \frac{1}{2}\begin{bmatrix}1&0\\j&0\\0&1\\0&1\end{bmatrix} \quad \frac{1}{2}\begin{bmatrix}1&0\\j&0\\0&1\\0&-1\end{bmatrix} \quad \frac{1}{2}\begin{bmatrix}1&0\\-1&0\\0&1\\0&-j\end{bmatrix} \quad \frac{1}{2}\begin{bmatrix}1&0\\-1&0\\0&1\\0&j\end{bmatrix} \quad \frac{1}{2}\begin{bmatrix}1&0\\-j&0\\0&1\\0&1\end{bmatrix} \quad \frac{1}{2}\begin{bmatrix}1&0\\-j&0\\0&1\\0&-1\end{bmatrix}$$

$$\frac{1}{2}\begin{bmatrix}1&0\\0&1\\1&0\\0&1\end{bmatrix} \quad \frac{1}{2}\begin{bmatrix}1&0\\0&1\\1&0\\0&-1\end{bmatrix} \quad \frac{1}{2}\begin{bmatrix}1&0\\0&1\\j&0\\0&-j\end{bmatrix} \quad \frac{1}{2}\begin{bmatrix}1&0\\0&1\\-1&0\\0&1\end{bmatrix} \quad \frac{1}{2}\begin{bmatrix}1&0\\0&1\\-1&0\\0&-1\end{bmatrix} \quad \frac{1}{2}\begin{bmatrix}1&0\\0&1\\-j&0\\0&-j\end{bmatrix}$$

$$\frac{1}{2}\begin{bmatrix}1&0\\0&1\\0&1\\1&0\end{bmatrix} \quad \frac{1}{2}\begin{bmatrix}1&0\\0&1\\0&-1\\1&0\end{bmatrix} \quad \frac{1}{2}\begin{bmatrix}1&0\\0&1\\0&-1\\j&0\end{bmatrix} \quad \frac{1}{2}\begin{bmatrix}1&0\\0&1\\0&1\\-1&0\end{bmatrix} \quad \frac{1}{2}\begin{bmatrix}1&0\\0&1\\0&-1\\-1&0\end{bmatrix} \quad \frac{1}{2}\begin{bmatrix}1&0\\0&1\\0&-j\\-j&0\end{bmatrix}$$

TABLE 45

$$\frac{1}{2}\begin{bmatrix}1&0\\1&0\\0&1\\0&-j\end{bmatrix} \quad \frac{1}{2}\begin{bmatrix}1&0\\1&0\\0&1\\0&j\end{bmatrix} \quad \frac{1}{2}\begin{bmatrix}1&0\\j&0\\0&1\\0&1\end{bmatrix} \quad \frac{1}{2}\begin{bmatrix}1&0\\j&0\\0&1\\0&-1\end{bmatrix} \quad \frac{1}{2}\begin{bmatrix}1&0\\-1&0\\0&1\\0&-j\end{bmatrix} \quad \frac{1}{2}\begin{bmatrix}1&0\\-1&0\\0&1\\0&j\end{bmatrix} \quad \frac{1}{2}\begin{bmatrix}1&0\\-j&0\\0&1\\0&1\end{bmatrix} \quad \frac{1}{2}\begin{bmatrix}1&0\\-j&0\\0&1\\0&-1\end{bmatrix}$$

$$\frac{1}{2}\begin{bmatrix}1&0\\0&1\\1&0\\0&1\end{bmatrix} \quad \frac{1}{2}\begin{bmatrix}1&0\\0&1\\1&0\\0&-1\end{bmatrix} \quad \frac{1}{2}\begin{bmatrix}1&0\\0&1\\j&0\\0&-j\end{bmatrix} \quad \frac{1}{2}\begin{bmatrix}1&0\\0&1\\-1&0\\0&1\end{bmatrix} \quad \frac{1}{2}\begin{bmatrix}1&0\\0&1\\-1&0\\0&-1\end{bmatrix} \quad \frac{1}{2}\begin{bmatrix}1&0\\0&1\\-j&0\\0&-j\end{bmatrix}$$

TABLE 45-continued $$\frac{1}{2}\begin{bmatrix}1&0\\0&1\\0&1\\1&0\end{bmatrix} \quad \frac{1}{2}\begin{bmatrix}1&0\\0&1\\0&-1\\1&0\end{bmatrix} \quad \frac{1}{2}\begin{bmatrix}1&0\\0&1\\0&1\\-1&0\end{bmatrix} \quad \frac{1}{2}\begin{bmatrix}1&0\\0&1\\0&-1\\-1&0\end{bmatrix} \quad \frac{1}{2}\begin{bmatrix}1&0\\0&1\\0&j\\-j&0\end{bmatrix} \quad \frac{1}{2}\begin{bmatrix}1&0\\0&1\\0&-j\\-j&0\end{bmatrix}$$

TABLE 46

$$\frac{1}{2}\begin{bmatrix}1&0\\1&0\\0&1\\0&-j\end{bmatrix} \quad \frac{1}{2}\begin{bmatrix}1&0\\1&0\\0&1\\0&j\end{bmatrix} \quad \frac{1}{2}\begin{bmatrix}1&0\\j&0\\0&1\\0&1\end{bmatrix} \quad \frac{1}{2}\begin{bmatrix}1&0\\j&0\\0&1\\0&-1\end{bmatrix} \quad \frac{1}{2}\begin{bmatrix}1&0\\-1&0\\0&1\\0&-j\end{bmatrix} \quad \frac{1}{2}\begin{bmatrix}1&0\\-1&0\\0&1\\0&j\end{bmatrix} \quad \frac{1}{2}\begin{bmatrix}1&0\\-j&0\\0&1\\0&1\end{bmatrix} \quad \frac{1}{2}\begin{bmatrix}1&0\\-j&0\\0&1\\0&-1\end{bmatrix}$$

$$\frac{1}{2}\begin{bmatrix}1&0\\0&1\\1&0\\0&1\end{bmatrix} \quad \frac{1}{2}\begin{bmatrix}1&0\\0&1\\1&0\\0&-1\end{bmatrix} \quad \frac{1}{2}\begin{bmatrix}1&0\\0&1\\-1&0\\0&1\end{bmatrix} \quad \frac{1}{2}\begin{bmatrix}1&0\\0&1\\-1&0\\0&-1\end{bmatrix} \quad \frac{1}{2}\begin{bmatrix}1&0\\0&1\\-j&0\\0&j\end{bmatrix} \quad \frac{1}{2}\begin{bmatrix}1&0\\0&1\\-j&0\\0&-j\end{bmatrix}$$

$$\frac{1}{2}\begin{bmatrix}1&0\\0&1\\0&1\\1&0\end{bmatrix} \quad \frac{1}{2}\begin{bmatrix}1&0\\0&1\\0&-1\\1&0\end{bmatrix} \quad \frac{1}{2}\begin{bmatrix}1&0\\0&1\\0&j\\j&0\end{bmatrix} \quad \frac{1}{2}\begin{bmatrix}1&0\\0&1\\0&-j\\j&0\end{bmatrix} \quad \frac{1}{2}\begin{bmatrix}1&0\\0&1\\0&1\\-1&0\end{bmatrix} \quad \frac{1}{2}\begin{bmatrix}1&0\\0&1\\0&-1\\-1&0\end{bmatrix}$$

TABLE 47

$$\frac{1}{2}\begin{bmatrix}1&0\\1&0\\0&1\\0&-j\end{bmatrix} \quad \frac{1}{2}\begin{bmatrix}1&0\\1&0\\0&1\\0&j\end{bmatrix} \quad \frac{1}{2}\begin{bmatrix}1&0\\j&0\\0&1\\0&1\end{bmatrix} \quad \frac{1}{2}\begin{bmatrix}1&0\\j&0\\0&1\\0&-1\end{bmatrix} \quad \frac{1}{2}\begin{bmatrix}1&0\\-1&0\\0&1\\0&-j\end{bmatrix} \quad \frac{1}{2}\begin{bmatrix}1&0\\-1&0\\0&1\\0&j\end{bmatrix} \quad \frac{1}{2}\begin{bmatrix}1&0\\-j&0\\0&1\\0&1\end{bmatrix} \quad \frac{1}{2}\begin{bmatrix}1&0\\-j&0\\0&1\\0&-1\end{bmatrix}$$

$$\frac{1}{2}\begin{bmatrix}1&0\\0&1\\1&0\\0&1\end{bmatrix} \quad \frac{1}{2}\begin{bmatrix}1&0\\0&1\\1&0\\0&-1\end{bmatrix} \quad \frac{1}{2}\begin{bmatrix}1&0\\0&1\\-1&0\\0&1\end{bmatrix} \quad \frac{1}{2}\begin{bmatrix}1&0\\0&1\\-1&0\\0&-1\end{bmatrix} \quad \frac{1}{2}\begin{bmatrix}1&0\\0&1\\-j&0\\0&j\end{bmatrix} \quad \frac{1}{2}\begin{bmatrix}1&0\\0&1\\-j&0\\0&-j\end{bmatrix}$$

$$\frac{1}{2}\begin{bmatrix}1&0\\0&1\\0&1\\1&0\end{bmatrix} \quad \frac{1}{2}\begin{bmatrix}1&0\\0&1\\0&-1\\1&0\end{bmatrix} \quad \frac{1}{2}\begin{bmatrix}1&0\\0&1\\0&j\\j&0\end{bmatrix} \quad \frac{1}{2}\begin{bmatrix}1&0\\0&1\\0&1\\-1&0\end{bmatrix} \quad \frac{1}{2}\begin{bmatrix}1&0\\0&1\\0&-1\\-1&0\end{bmatrix} \quad \frac{1}{2}\begin{bmatrix}1&0\\0&1\\0&j\\-j&0\end{bmatrix}$$

TABLE 48

$$\frac{1}{2}\begin{bmatrix}1&0\\1&0\\0&1\\0&-j\end{bmatrix} \quad \frac{1}{2}\begin{bmatrix}1&0\\1&0\\0&1\\0&j\end{bmatrix} \quad \frac{1}{2}\begin{bmatrix}1&0\\j&0\\0&1\\0&1\end{bmatrix} \quad \frac{1}{2}\begin{bmatrix}1&0\\j&0\\0&1\\0&-1\end{bmatrix} \quad \frac{1}{2}\begin{bmatrix}1&0\\-1&0\\0&1\\0&-j\end{bmatrix} \quad \frac{1}{2}\begin{bmatrix}1&0\\-1&0\\0&1\\0&j\end{bmatrix} \quad \frac{1}{2}\begin{bmatrix}1&0\\-j&0\\0&1\\0&1\end{bmatrix} \quad \frac{1}{2}\begin{bmatrix}1&0\\-j&0\\0&1\\0&-1\end{bmatrix}$$

$$\frac{1}{2}\begin{bmatrix}1&0\\0&1\\1&0\\0&1\end{bmatrix} \quad \frac{1}{2}\begin{bmatrix}1&0\\0&1\\1&0\\0&-1\end{bmatrix} \quad \frac{1}{2}\begin{bmatrix}1&0\\0&1\\-1&0\\0&1\end{bmatrix} \quad \frac{1}{2}\begin{bmatrix}1&0\\0&1\\-1&0\\0&-1\end{bmatrix} \quad \frac{1}{2}\begin{bmatrix}1&0\\0&1\\-j&0\\0&j\end{bmatrix} \quad \frac{1}{2}\begin{bmatrix}1&0\\0&1\\-j&0\\0&-j\end{bmatrix}$$

$$\frac{1}{2}\begin{bmatrix}1&0\\0&1\\0&1\\1&0\end{bmatrix} \quad \frac{1}{2}\begin{bmatrix}1&0\\0&1\\0&-1\\1&0\end{bmatrix} \quad \frac{1}{2}\begin{bmatrix}1&0\\0&1\\0&j\\j&0\end{bmatrix} \quad \frac{1}{2}\begin{bmatrix}1&0\\0&1\\0&1\\-1&0\end{bmatrix} \quad \frac{1}{2}\begin{bmatrix}1&0\\0&1\\0&-1\\-1&0\end{bmatrix} \quad \frac{1}{2}\begin{bmatrix}1&0\\0&1\\0&-j\\-j&0\end{bmatrix}$$

TABLE 49

$$\frac{1}{2}\begin{bmatrix}1&0\\1&0\\0&1\\0&-j\end{bmatrix} \frac{1}{2}\begin{bmatrix}1&0\\1&0\\0&1\\0&j\end{bmatrix} \frac{1}{2}\begin{bmatrix}1&0\\j&0\\0&1\\0&1\end{bmatrix} \frac{1}{2}\begin{bmatrix}1&0\\j&0\\0&1\\0&-1\end{bmatrix} \frac{1}{2}\begin{bmatrix}1&0\\-1&0\\0&1\\0&-j\end{bmatrix} \frac{1}{2}\begin{bmatrix}1&0\\-1&0\\0&1\\0&j\end{bmatrix} \frac{1}{2}\begin{bmatrix}1&0\\-j&0\\0&1\\0&1\end{bmatrix} \frac{1}{2}\begin{bmatrix}1&0\\-j&0\\0&1\\0&-1\end{bmatrix}$$

$$\frac{1}{2}\begin{bmatrix}1&0\\0&1\\1&0\\0&1\end{bmatrix} \frac{1}{2}\begin{bmatrix}1&0\\0&1\\1&0\\0&-1\end{bmatrix} \qquad \qquad \frac{1}{2}\begin{bmatrix}1&0\\0&1\\-1&0\\0&1\end{bmatrix} \frac{1}{2}\begin{bmatrix}1&0\\0&1\\-1&0\\0&-1\end{bmatrix} \frac{1}{2}\begin{bmatrix}1&0\\0&1\\-j&0\\0&j\end{bmatrix} \frac{1}{2}\begin{bmatrix}1&0\\0&1\\-j&0\\0&-j\end{bmatrix}$$

$$\frac{1}{2}\begin{bmatrix}1&0\\0&1\\0&1\\1&0\end{bmatrix} \frac{1}{2}\begin{bmatrix}1&0\\0&1\\0&-1\\1&0\end{bmatrix} \qquad \frac{1}{2}\begin{bmatrix}1&0\\0&1\\0&-1\\j&0\end{bmatrix} \frac{1}{2}\begin{bmatrix}1&0\\0&1\\0&1\\-1&0\end{bmatrix} \frac{1}{2}\begin{bmatrix}1&0\\0&1\\0&-1\\-1&0\end{bmatrix} \frac{1}{2}\begin{bmatrix}1&0\\0&1\\0&j\\-j&0\end{bmatrix}$$

TABLE 50

$$\frac{1}{2}\begin{bmatrix}1&0\\1&0\\0&1\\0&-j\end{bmatrix} \frac{1}{2}\begin{bmatrix}1&0\\1&0\\0&1\\0&j\end{bmatrix} \frac{1}{2}\begin{bmatrix}1&0\\j&0\\0&1\\0&1\end{bmatrix} \frac{1}{2}\begin{bmatrix}1&0\\j&0\\0&1\\0&-1\end{bmatrix} \frac{1}{2}\begin{bmatrix}1&0\\-1&0\\0&1\\0&-j\end{bmatrix} \frac{1}{2}\begin{bmatrix}1&0\\-1&0\\0&1\\0&j\end{bmatrix} \frac{1}{2}\begin{bmatrix}1&0\\-j&0\\0&1\\0&1\end{bmatrix} \frac{1}{2}\begin{bmatrix}1&0\\-j&0\\0&1\\0&-1\end{bmatrix}$$

$$\frac{1}{2}\begin{bmatrix}1&0\\0&1\\1&0\\0&1\end{bmatrix} \frac{1}{2}\begin{bmatrix}1&0\\0&1\\1&0\\0&-1\end{bmatrix} \qquad \qquad \frac{1}{2}\begin{bmatrix}1&0\\0&1\\-1&0\\0&1\end{bmatrix} \frac{1}{2}\begin{bmatrix}1&0\\0&1\\-1&0\\0&-1\end{bmatrix} \frac{1}{2}\begin{bmatrix}1&0\\0&1\\-j&0\\0&j\end{bmatrix} \frac{1}{2}\begin{bmatrix}1&0\\0&1\\-j&0\\0&-j\end{bmatrix}$$

$$\frac{1}{2}\begin{bmatrix}1&0\\0&1\\0&1\\1&0\end{bmatrix} \frac{1}{2}\begin{bmatrix}1&0\\0&1\\0&-1\\1&0\end{bmatrix} \qquad \frac{1}{2}\begin{bmatrix}1&0\\0&1\\0&-1\\j&0\end{bmatrix} \frac{1}{2}\begin{bmatrix}1&0\\0&1\\0&1\\-1&0\end{bmatrix} \frac{1}{2}\begin{bmatrix}1&0\\0&1\\0&-1\\-1&0\end{bmatrix} \qquad \frac{1}{2}\begin{bmatrix}1&0\\0&1\\0&-j\\-j&0\end{bmatrix}$$

TABLE 51

$$\frac{1}{2}\begin{bmatrix}1&0\\1&0\\0&1\\0&-j\end{bmatrix} \frac{1}{2}\begin{bmatrix}1&0\\1&0\\0&1\\0&j\end{bmatrix} \frac{1}{2}\begin{bmatrix}1&0\\j&0\\0&1\\0&1\end{bmatrix} \frac{1}{2}\begin{bmatrix}1&0\\j&0\\0&1\\0&-1\end{bmatrix} \frac{1}{2}\begin{bmatrix}1&0\\-1&0\\0&1\\0&-j\end{bmatrix} \frac{1}{2}\begin{bmatrix}1&0\\-1&0\\0&1\\0&j\end{bmatrix} \frac{1}{2}\begin{bmatrix}1&0\\-j&0\\0&1\\0&1\end{bmatrix} \frac{1}{2}\begin{bmatrix}1&0\\-j&0\\0&1\\0&-1\end{bmatrix}$$

$$\frac{1}{2}\begin{bmatrix}1&0\\0&1\\1&0\\0&1\end{bmatrix} \frac{1}{2}\begin{bmatrix}1&0\\0&1\\1&0\\0&-1\end{bmatrix} \qquad \qquad \frac{1}{2}\begin{bmatrix}1&0\\0&1\\-1&0\\0&1\end{bmatrix} \frac{1}{2}\begin{bmatrix}1&0\\0&1\\-1&0\\0&-1\end{bmatrix} \frac{1}{2}\begin{bmatrix}1&0\\0&1\\-j&0\\0&j\end{bmatrix} \frac{1}{2}\begin{bmatrix}1&0\\0&1\\-j&0\\0&-j\end{bmatrix}$$

$$\frac{1}{2}\begin{bmatrix}1&0\\0&1\\0&1\\1&0\end{bmatrix} \frac{1}{2}\begin{bmatrix}1&0\\0&1\\0&-1\\1&0\end{bmatrix} \qquad \qquad \frac{1}{2}\begin{bmatrix}1&0\\0&1\\0&1\\-1&0\end{bmatrix} \frac{1}{2}\begin{bmatrix}1&0\\0&1\\0&-1\\-1&0\end{bmatrix} \frac{1}{2}\begin{bmatrix}1&0\\0&1\\0&j\\-j&0\end{bmatrix} \frac{1}{2}\begin{bmatrix}1&0\\0&1\\0&-j\\-j&0\end{bmatrix}$$

TABLE 52

$$\begin{bmatrix}1&0\\1&0\\0&1\\0&-j\end{bmatrix} \begin{bmatrix}1&0\\1&0\\0&1\\0&j\end{bmatrix} \begin{bmatrix}1&0\\j&0\\0&1\\0&1\end{bmatrix} \begin{bmatrix}1&0\\j&0\\0&1\\0&-1\end{bmatrix} \begin{bmatrix}1&0\\-1&0\\0&1\\0&-j\end{bmatrix} \begin{bmatrix}1&0\\-1&0\\0&1\\0&j\end{bmatrix} \begin{bmatrix}1&0\\-j&0\\0&1\\0&1\end{bmatrix} \begin{bmatrix}1&0\\-j&0\\0&1\\0&-1\end{bmatrix}$$

$$\begin{bmatrix}1&0\\0&1\\1&0\\0&1\end{bmatrix} \begin{bmatrix}1&0\\0&1\\1&0\\0&-1\end{bmatrix} \begin{bmatrix}1&0\\0&1\\j&0\\0&1\end{bmatrix} \begin{bmatrix}1&0\\0&1\\j&0\\0&-1\end{bmatrix} \begin{bmatrix}1&0\\0&1\\-1&0\\0&1\end{bmatrix} \begin{bmatrix}1&0\\0&1\\-1&0\\0&-1\end{bmatrix} \begin{bmatrix}1&0\\0&1\\-j&0\\0&1\end{bmatrix} \begin{bmatrix}1&0\\0&1\\-j&0\\0&-1\end{bmatrix}$$

TABLE 52-continued $$\begin{bmatrix} 1 & 0 \\ 0 & 1 \\ 0 & 1 \\ 1 & 0 \end{bmatrix} \begin{bmatrix} 1 & 0 \\ 0 & 1 \\ 0 & -1 \\ 1 & 0 \end{bmatrix} \quad \begin{bmatrix} 1 & 0 \\ 0 & 1 \\ 0 & 1 \\ -1 & 0 \end{bmatrix} \begin{bmatrix} 1 & 0 \\ 0 & 1 \\ 0 & -1 \\ -1 & 0 \end{bmatrix}$$

TABLE 53

$$\begin{bmatrix} 1 & 0 \\ 1 & 0 \\ 0 & 1 \\ 0 & -j \end{bmatrix} \begin{bmatrix} 1 & 0 \\ 1 & 0 \\ 0 & 1 \\ 0 & j \end{bmatrix} \begin{bmatrix} 1 & 0 \\ j & 0 \\ 0 & 1 \\ 0 & 1 \end{bmatrix} \begin{bmatrix} 1 & 0 \\ j & 0 \\ 0 & 1 \\ 0 & -1 \end{bmatrix} \begin{bmatrix} 1 & 0 \\ -1 & 0 \\ 0 & 1 \\ 0 & -j \end{bmatrix} \begin{bmatrix} 1 & 0 \\ -1 & 0 \\ 0 & 1 \\ 0 & j \end{bmatrix} \begin{bmatrix} 1 & 0 \\ -j & 0 \\ 0 & 1 \\ 0 & 1 \end{bmatrix} \begin{bmatrix} 1 & 0 \\ -j & 0 \\ 0 & 1 \\ 0 & -1 \end{bmatrix}$$

$$\begin{bmatrix} 1 & 0 \\ 0 & 1 \\ 1 & 0 \\ 0 & 1 \end{bmatrix} \begin{bmatrix} 1 & 0 \\ 0 & 1 \\ 1 & 0 \\ 0 & -1 \end{bmatrix} \quad \begin{bmatrix} 1 & 0 \\ 0 & 1 \\ -1 & 0 \\ 0 & 1 \end{bmatrix} \begin{bmatrix} 1 & 0 \\ 0 & 1 \\ -1 & 0 \\ 0 & -1 \end{bmatrix}$$

$$\begin{bmatrix} 1 & 0 \\ 0 & 1 \\ 0 & 1 \\ 1 & 0 \end{bmatrix} \begin{bmatrix} 1 & 0 \\ 0 & 1 \\ 0 & -1 \\ 1 & 0 \end{bmatrix} \begin{bmatrix} 1 & 0 \\ 0 & 1 \\ 0 & 1 \\ j & 0 \end{bmatrix} \begin{bmatrix} 1 & 0 \\ 0 & 1 \\ 0 & -1 \\ j & 0 \end{bmatrix} \begin{bmatrix} 1 & 0 \\ 0 & 1 \\ 0 & 1 \\ -1 & 0 \end{bmatrix} \begin{bmatrix} 1 & 0 \\ 0 & 1 \\ 0 & -1 \\ -1 & 0 \end{bmatrix} \begin{bmatrix} 1 & 0 \\ 0 & 1 \\ 0 & 1 \\ -j & 0 \end{bmatrix} \begin{bmatrix} 1 & 0 \\ 0 & 1 \\ 0 & -1 \\ -j & 0 \end{bmatrix}$$

TABLE 54

$$\begin{bmatrix} 1 & 0 \\ 1 & 0 \\ 0 & 1 \\ 0 & -j \end{bmatrix} \begin{bmatrix} 1 & 0 \\ 1 & 0 \\ 0 & 1 \\ 0 & j \end{bmatrix} \begin{bmatrix} 1 & 0 \\ j & 0 \\ 0 & 1 \\ 0 & 1 \end{bmatrix} \begin{bmatrix} 1 & 0 \\ j & 0 \\ 0 & 1 \\ 0 & -1 \end{bmatrix} \begin{bmatrix} 1 & 0 \\ -1 & 0 \\ 0 & 1 \\ 0 & -j \end{bmatrix} \begin{bmatrix} 1 & 0 \\ -1 & 0 \\ 0 & 1 \\ 0 & j \end{bmatrix} \begin{bmatrix} 1 & 0 \\ -j & 0 \\ 0 & 1 \\ 0 & 1 \end{bmatrix} \begin{bmatrix} 1 & 0 \\ -j & 0 \\ 0 & 1 \\ 0 & -1 \end{bmatrix}$$

$$\begin{bmatrix} 1 & 0 \\ 0 & 1 \\ 1 & 0 \\ 0 & 1 \end{bmatrix} \begin{bmatrix} 1 & 0 \\ 0 & 1 \\ 1 & 0 \\ 0 & -1 \end{bmatrix} \begin{bmatrix} 1 & 0 \\ 0 & 1 \\ j & 0 \\ 0 & 1 \end{bmatrix} \begin{bmatrix} 1 & 0 \\ 0 & 1 \\ j & 0 \\ 0 & -1 \end{bmatrix} \begin{bmatrix} 1 & 0 \\ 0 & 1 \\ -1 & 0 \\ 0 & 1 \end{bmatrix} \begin{bmatrix} 1 & 0 \\ 0 & 1 \\ -1 & 0 \\ 0 & -1 \end{bmatrix}$$

$$\begin{bmatrix} 1 & 0 \\ 0 & 1 \\ 0 & 1 \\ 1 & 0 \end{bmatrix} \begin{bmatrix} 1 & 0 \\ 0 & 1 \\ 0 & -1 \\ 1 & 0 \end{bmatrix} \begin{bmatrix} 1 & 0 \\ 0 & 1 \\ 0 & 1 \\ j & 0 \end{bmatrix} \begin{bmatrix} 1 & 0 \\ 0 & 1 \\ 0 & -1 \\ j & 0 \end{bmatrix} \begin{bmatrix} 1 & 0 \\ 0 & 1 \\ 0 & 1 \\ -1 & 0 \end{bmatrix} \begin{bmatrix} 1 & 0 \\ 0 & 1 \\ 0 & -1 \\ -1 & 0 \end{bmatrix}$$

TABLE 55

$$\begin{bmatrix} 1 & 0 \\ 1 & 0 \\ 0 & 1 \\ 0 & -j \end{bmatrix} \begin{bmatrix} 1 & 0 \\ 1 & 0 \\ 0 & 1 \\ 0 & j \end{bmatrix} \begin{bmatrix} 1 & 0 \\ j & 0 \\ 0 & 1 \\ 0 & 1 \end{bmatrix} \begin{bmatrix} 1 & 0 \\ j & 0 \\ 0 & 1 \\ 0 & -1 \end{bmatrix} \begin{bmatrix} 1 & 0 \\ -1 & 0 \\ 0 & 1 \\ 0 & -j \end{bmatrix} \begin{bmatrix} 1 & 0 \\ -1 & 0 \\ 0 & 1 \\ 0 & j \end{bmatrix} \begin{bmatrix} 1 & 0 \\ -j & 0 \\ 0 & 1 \\ 0 & 1 \end{bmatrix} \begin{bmatrix} 1 & 0 \\ -j & 0 \\ 0 & 1 \\ 0 & -1 \end{bmatrix}$$

$$\begin{bmatrix} 1 & 0 \\ 0 & 1 \\ 1 & 0 \\ 0 & 1 \end{bmatrix} \begin{bmatrix} 1 & 0 \\ 0 & 1 \\ 1 & 0 \\ 0 & -1 \end{bmatrix} \begin{bmatrix} 1 & 0 \\ 0 & 1 \\ j & 0 \\ 0 & 1 \end{bmatrix} \begin{bmatrix} 1 & 0 \\ 0 & 1 \\ j & 0 \\ 0 & -1 \end{bmatrix} \begin{bmatrix} 1 & 0 \\ 0 & 1 \\ -1 & 0 \\ 0 & 1 \end{bmatrix} \begin{bmatrix} 1 & 0 \\ 0 & 1 \\ -1 & 0 \\ 0 & -1 \end{bmatrix}$$

$$\begin{bmatrix} 1 & 0 \\ 0 & 1 \\ 0 & 1 \\ 1 & 0 \end{bmatrix} \begin{bmatrix} 1 & 0 \\ 0 & 1 \\ 0 & -1 \\ 1 & 0 \end{bmatrix} \begin{bmatrix} 1 & 0 \\ 0 & 1 \\ 0 & 1 \\ j & 0 \end{bmatrix} \quad \begin{bmatrix} 1 & 0 \\ 0 & 1 \\ 0 & 1 \\ -1 & 0 \end{bmatrix} \begin{bmatrix} 1 & 0 \\ 0 & 1 \\ 0 & -1 \\ -1 & 0 \end{bmatrix} \begin{bmatrix} 1 & 0 \\ 0 & 1 \\ 0 & 1 \\ -j & 0 \end{bmatrix}$$

TABLE 56

$$\begin{bmatrix} 1 & 0 \\ 1 & 0 \\ 0 & 1 \\ 0 & -j \end{bmatrix} \begin{bmatrix} 1 & 0 \\ 1 & 0 \\ 0 & 1 \\ 0 & j \end{bmatrix} \begin{bmatrix} 1 & 0 \\ j & 0 \\ 0 & 1 \\ 0 & 1 \end{bmatrix} \begin{bmatrix} 1 & 0 \\ j & 0 \\ 0 & 1 \\ 0 & -1 \end{bmatrix} \begin{bmatrix} 1 & 0 \\ -1 & 0 \\ 0 & 1 \\ 0 & -j \end{bmatrix} \begin{bmatrix} 1 & 0 \\ -1 & 0 \\ 0 & 1 \\ 0 & j \end{bmatrix} \begin{bmatrix} 1 & 0 \\ -j & 0 \\ 0 & 1 \\ 0 & 1 \end{bmatrix} \begin{bmatrix} 1 & 0 \\ -j & 0 \\ 0 & 1 \\ 0 & -1 \end{bmatrix}$$

$$\begin{bmatrix} 1 & 0 \\ 0 & 1 \\ 1 & 0 \\ 0 & 1 \end{bmatrix} \begin{bmatrix} 1 & 0 \\ 0 & 1 \\ 1 & 0 \\ 0 & -1 \end{bmatrix} \begin{bmatrix} 1 & 0 \\ 0 & 1 \\ j & 0 \\ 0 & 1 \end{bmatrix} \begin{bmatrix} 1 & 0 \\ 0 & 1 \\ j & 0 \\ 0 & -1 \end{bmatrix} \begin{bmatrix} 1 & 0 \\ 0 & 1 \\ -1 & 0 \\ 0 & 1 \end{bmatrix} \begin{bmatrix} 1 & 0 \\ 0 & 1 \\ -1 & 0 \\ 0 & -1 \end{bmatrix}$$

$$\begin{bmatrix} 1 & 0 \\ 0 & 1 \\ 0 & 1 \\ 1 & 0 \end{bmatrix} \begin{bmatrix} 1 & 0 \\ 0 & 1 \\ 0 & -1 \\ 1 & 0 \end{bmatrix} \begin{bmatrix} 1 & 0 \\ 0 & 1 \\ 0 & 1 \\ j & 0 \end{bmatrix} \begin{bmatrix} 1 & 0 \\ 0 & 1 \\ 0 & 1 \\ -1 & 0 \end{bmatrix} \begin{bmatrix} 1 & 0 \\ 0 & 1 \\ 0 & -1 \\ -1 & 0 \end{bmatrix} \begin{bmatrix} 1 & 0 \\ 0 & 1 \\ 0 & -1 \\ -j & 0 \end{bmatrix}$$

TABLE 57

$$\begin{bmatrix} 1 & 0 \\ 1 & 0 \\ 0 & 1 \\ 0 & -j \end{bmatrix} \begin{bmatrix} 1 & 0 \\ 1 & 0 \\ 0 & 1 \\ 0 & j \end{bmatrix} \begin{bmatrix} 1 & 0 \\ j & 0 \\ 0 & 1 \\ 0 & 1 \end{bmatrix} \begin{bmatrix} 1 & 0 \\ j & 0 \\ 0 & 1 \\ 0 & -1 \end{bmatrix} \begin{bmatrix} 1 & 0 \\ -1 & 0 \\ 0 & 1 \\ 0 & -j \end{bmatrix} \begin{bmatrix} 1 & 0 \\ -1 & 0 \\ 0 & 1 \\ 0 & j \end{bmatrix} \begin{bmatrix} 1 & 0 \\ -j & 0 \\ 0 & 1 \\ 0 & 1 \end{bmatrix} \begin{bmatrix} 1 & 0 \\ -j & 0 \\ 0 & 1 \\ 0 & -1 \end{bmatrix}$$

$$\begin{bmatrix} 1 & 0 \\ 0 & 1 \\ 1 & 0 \\ 0 & 1 \end{bmatrix} \begin{bmatrix} 1 & 0 \\ 0 & 1 \\ 1 & 0 \\ 0 & -1 \end{bmatrix} \begin{bmatrix} 1 & 0 \\ 0 & 1 \\ j & 0 \\ 0 & 1 \end{bmatrix} \begin{bmatrix} 1 & 0 \\ 0 & 1 \\ j & 0 \\ 0 & -1 \end{bmatrix} \begin{bmatrix} 1 & 0 \\ 0 & 1 \\ -1 & 0 \\ 0 & 1 \end{bmatrix} \begin{bmatrix} 1 & 0 \\ 0 & 1 \\ -1 & 0 \\ 0 & -1 \end{bmatrix}$$

$$\begin{bmatrix} 1 & 0 \\ 0 & 1 \\ 0 & 1 \\ 1 & 0 \end{bmatrix} \begin{bmatrix} 1 & 0 \\ 0 & 1 \\ 0 & -1 \\ 1 & 0 \end{bmatrix} \begin{bmatrix} 1 & 0 \\ 0 & 1 \\ 0 & -1 \\ j & 0 \end{bmatrix} \begin{bmatrix} 1 & 0 \\ 0 & 1 \\ 0 & 1 \\ -1 & 0 \end{bmatrix} \begin{bmatrix} 1 & 0 \\ 0 & 1 \\ 0 & -1 \\ -1 & 0 \end{bmatrix} \begin{bmatrix} 1 & 0 \\ 0 & 1 \\ 0 & 1 \\ -j & 0 \end{bmatrix}$$

TABLE 58

$$\begin{bmatrix} 1 & 0 \\ 1 & 0 \\ 0 & 1 \\ 0 & -j \end{bmatrix} \begin{bmatrix} 1 & 0 \\ 1 & 0 \\ 0 & 1 \\ 0 & j \end{bmatrix} \begin{bmatrix} 1 & 0 \\ j & 0 \\ 0 & 1 \\ 0 & 1 \end{bmatrix} \begin{bmatrix} 1 & 0 \\ j & 0 \\ 0 & 1 \\ 0 & -1 \end{bmatrix} \begin{bmatrix} 1 & 0 \\ -1 & 0 \\ 0 & 1 \\ 0 & -j \end{bmatrix} \begin{bmatrix} 1 & 0 \\ -1 & 0 \\ 0 & 1 \\ 0 & j \end{bmatrix} \begin{bmatrix} 1 & 0 \\ -j & 0 \\ 0 & 1 \\ 0 & 1 \end{bmatrix} \begin{bmatrix} 1 & 0 \\ -j & 0 \\ 0 & 1 \\ 0 & -1 \end{bmatrix}$$

$$\begin{bmatrix} 1 & 0 \\ 0 & 1 \\ 1 & 0 \\ 0 & 1 \end{bmatrix} \begin{bmatrix} 1 & 0 \\ 0 & 1 \\ 1 & 0 \\ 0 & -1 \end{bmatrix} \begin{bmatrix} 1 & 0 \\ 0 & 1 \\ j & 0 \\ 0 & 1 \end{bmatrix} \begin{bmatrix} 1 & 0 \\ 0 & 1 \\ j & 0 \\ 0 & -1 \end{bmatrix} \begin{bmatrix} 1 & 0 \\ 0 & 1 \\ -1 & 0 \\ 0 & 1 \end{bmatrix} \begin{bmatrix} 1 & 0 \\ 0 & 1 \\ -1 & 0 \\ 0 & -1 \end{bmatrix}$$

$$\begin{bmatrix} 1 & 0 \\ 0 & 1 \\ 0 & 1 \\ 1 & 0 \end{bmatrix} \begin{bmatrix} 1 & 0 \\ 0 & 1 \\ 0 & -1 \\ 1 & 0 \end{bmatrix} \begin{bmatrix} 1 & 0 \\ 0 & 1 \\ 0 & -1 \\ j & 0 \end{bmatrix} \begin{bmatrix} 1 & 0 \\ 0 & 1 \\ 0 & 1 \\ -1 & 0 \end{bmatrix} \begin{bmatrix} 1 & 0 \\ 0 & 1 \\ 0 & -1 \\ -1 & 0 \end{bmatrix} \begin{bmatrix} 1 & 0 \\ 0 & 1 \\ 0 & -1 \\ -j & 0 \end{bmatrix}$$

TABLE 59

$$\begin{bmatrix} 1 & 0 \\ 1 & 0 \\ 0 & 1 \\ 0 & -j \end{bmatrix} \begin{bmatrix} 1 & 0 \\ 1 & 0 \\ 0 & 1 \\ 0 & j \end{bmatrix} \begin{bmatrix} 1 & 0 \\ j & 0 \\ 0 & 1 \\ 0 & 1 \end{bmatrix} \begin{bmatrix} 1 & 0 \\ j & 0 \\ 0 & 1 \\ 0 & -1 \end{bmatrix} \begin{bmatrix} 1 & 0 \\ -1 & 0 \\ 0 & 1 \\ 0 & -j \end{bmatrix} \begin{bmatrix} 1 & 0 \\ -1 & 0 \\ 0 & 1 \\ 0 & j \end{bmatrix} \begin{bmatrix} 1 & 0 \\ -j & 0 \\ 0 & 1 \\ 0 & 1 \end{bmatrix} \begin{bmatrix} 1 & 0 \\ -j & 0 \\ 0 & 1 \\ 0 & -1 \end{bmatrix}$$

$$\begin{bmatrix} 1 & 0 \\ 0 & 1 \\ 1 & 0 \\ 0 & 1 \end{bmatrix} \begin{bmatrix} 1 & 0 \\ 0 & 1 \\ 1 & 0 \\ 0 & -1 \end{bmatrix} \begin{bmatrix} 1 & 0 \\ 0 & 1 \\ j & 0 \\ 0 & 1 \end{bmatrix} \begin{bmatrix} 1 & 0 \\ 0 & 1 \\ j & 0 \\ 0 & -1 \end{bmatrix} \begin{bmatrix} 1 & 0 \\ 0 & 1 \\ -1 & 0 \\ 0 & 1 \end{bmatrix} \begin{bmatrix} 1 & 0 \\ 0 & 1 \\ -1 & 0 \\ 0 & -1 \end{bmatrix}$$

TABLE 59-continued $\begin{bmatrix} 1 & 0 \\ 0 & 1 \\ 0 & 1 \\ 1 & 0 \end{bmatrix}$ $\begin{bmatrix} 1 & 0 \\ 0 & 1 \\ 0 & -1 \\ 1 & 0 \end{bmatrix}$ $\begin{bmatrix} 1 & 0 \\ 0 & 1 \\ 0 & 1 \\ -1 & 0 \end{bmatrix}$ $\begin{bmatrix} 1 & 0 \\ 0 & 1 \\ 0 & -1 \\ -1 & 0 \end{bmatrix}$ $\begin{bmatrix} 1 & 0 \\ 0 & 1 \\ 0 & 1 \\ -j & 0 \end{bmatrix}$ $\begin{bmatrix} 1 & 0 \\ 0 & 1 \\ 0 & -1 \\ -j & 0 \end{bmatrix}$

TABLE 60

$\begin{bmatrix} 1 & 0 \\ 1 & 0 \\ 0 & 1 \\ 0 & -j \end{bmatrix}$ $\begin{bmatrix} 1 & 0 \\ 1 & 0 \\ 0 & 1 \\ 0 & j \end{bmatrix}$ $\begin{bmatrix} 1 & 0 \\ j & 0 \\ 0 & 1 \\ 0 & 1 \end{bmatrix}$ $\begin{bmatrix} 1 & 0 \\ j & 0 \\ 0 & 1 \\ 0 & -1 \end{bmatrix}$ $\begin{bmatrix} 1 & 0 \\ -1 & 0 \\ 0 & 1 \\ 0 & -j \end{bmatrix}$ $\begin{bmatrix} 1 & 0 \\ -1 & 0 \\ 0 & 1 \\ 0 & j \end{bmatrix}$ $\begin{bmatrix} 1 & 0 \\ -j & 0 \\ 0 & 1 \\ 0 & 1 \end{bmatrix}$ $\begin{bmatrix} 1 & 0 \\ -j & 0 \\ 0 & 1 \\ 0 & -1 \end{bmatrix}$ $\begin{bmatrix} 1 & 0 \\ 0 & 1 \\ 1 & 0 \\ 0 & 1 \end{bmatrix}$ $\begin{bmatrix} 1 & 0 \\ 0 & 1 \\ 1 & 0 \\ 0 & -1 \end{bmatrix}$ $\begin{bmatrix} 1 & 0 \\ 0 & 1 \\ j & 0 \\ 0 & 1 \end{bmatrix}$ $\begin{bmatrix} 1 & 0 \\ 0 & 1 \\ -1 & 0 \\ 0 & 1 \end{bmatrix}$ $\begin{bmatrix} 1 & 0 \\ 0 & 1 \\ -1 & 0 \\ 0 & -1 \end{bmatrix}$ $\begin{bmatrix} 1 & 0 \\ 0 & 1 \\ -j & 0 \\ 0 & 1 \end{bmatrix}$ $\begin{bmatrix} 1 & 0 \\ 0 & 1 \\ 0 & 1 \\ 1 & 0 \end{bmatrix}$ $\begin{bmatrix} 1 & 0 \\ 0 & 1 \\ 0 & -1 \\ 1 & 0 \end{bmatrix}$ $\begin{bmatrix} 1 & 0 \\ 0 & 1 \\ 0 & 1 \\ j & 0 \end{bmatrix}$ $\begin{bmatrix} 1 & 0 \\ 0 & 1 \\ 0 & -1 \\ j & 0 \end{bmatrix}$ $\begin{bmatrix} 1 & 0 \\ 0 & 1 \\ 0 & 1 \\ -1 & 0 \end{bmatrix}$ $\begin{bmatrix} 1 & 0 \\ 0 & 1 \\ 0 & -1 \\ -1 & 0 \end{bmatrix}$

TABLE 61

$\begin{bmatrix} 1 & 0 \\ 1 & 0 \\ 0 & 1 \\ 0 & -j \end{bmatrix}$ $\begin{bmatrix} 1 & 0 \\ 1 & 0 \\ 0 & 1 \\ 0 & j \end{bmatrix}$ $\begin{bmatrix} 1 & 0 \\ j & 0 \\ 0 & 1 \\ 0 & 1 \end{bmatrix}$ $\begin{bmatrix} 1 & 0 \\ j & 0 \\ 0 & 1 \\ 0 & -1 \end{bmatrix}$ $\begin{bmatrix} 1 & 0 \\ -1 & 0 \\ 0 & 1 \\ 0 & -j \end{bmatrix}$ $\begin{bmatrix} 1 & 0 \\ -1 & 0 \\ 0 & 1 \\ 0 & j \end{bmatrix}$ $\begin{bmatrix} 1 & 0 \\ -j & 0 \\ 0 & 1 \\ 0 & 1 \end{bmatrix}$ $\begin{bmatrix} 1 & 0 \\ -j & 0 \\ 0 & 1 \\ 0 & -1 \end{bmatrix}$ $\begin{bmatrix} 1 & 0 \\ 0 & 1 \\ 1 & 0 \\ 0 & 1 \end{bmatrix}$ $\begin{bmatrix} 1 & 0 \\ 0 & 1 \\ 1 & 0 \\ 0 & -1 \end{bmatrix}$ $\begin{bmatrix} 1 & 0 \\ 0 & 1 \\ j & 0 \\ 0 & 1 \end{bmatrix}$ $\begin{bmatrix} 1 & 0 \\ 0 & 1 \\ -1 & 0 \\ 0 & 1 \end{bmatrix}$ $\begin{bmatrix} 1 & 0 \\ 0 & 1 \\ -1 & 0 \\ 0 & -1 \end{bmatrix}$ $\begin{bmatrix} 1 & 0 \\ 0 & 1 \\ -j & 0 \\ 0 & 1 \end{bmatrix}$ $\begin{bmatrix} 1 & 0 \\ 0 & 1 \\ 0 & 1 \\ 1 & 0 \end{bmatrix}$ $\begin{bmatrix} 1 & 0 \\ 0 & 1 \\ 0 & -1 \\ 1 & 0 \end{bmatrix}$ $\begin{bmatrix} 1 & 0 \\ 0 & 1 \\ 0 & 1 \\ j & 0 \end{bmatrix}$ $\begin{bmatrix} 1 & 0 \\ 0 & 1 \\ 0 & 1 \\ -1 & 0 \end{bmatrix}$ $\begin{bmatrix} 1 & 0 \\ 0 & 1 \\ 0 & -1 \\ -1 & 0 \end{bmatrix}$ $\begin{bmatrix} 1 & 0 \\ 0 & 1 \\ 0 & 1 \\ -j & 0 \end{bmatrix}$

TABLE 62

$\begin{bmatrix} 1 & 0 \\ 1 & 0 \\ 0 & 1 \\ 0 & -j \end{bmatrix}$ $\begin{bmatrix} 1 & 0 \\ 1 & 0 \\ 0 & 1 \\ 0 & j \end{bmatrix}$ $\begin{bmatrix} 1 & 0 \\ j & 0 \\ 0 & 1 \\ 0 & 1 \end{bmatrix}$ $\begin{bmatrix} 1 & 0 \\ j & 0 \\ 0 & 1 \\ 0 & -1 \end{bmatrix}$ $\begin{bmatrix} 1 & 0 \\ -1 & 0 \\ 0 & 1 \\ 0 & -j \end{bmatrix}$ $\begin{bmatrix} 1 & 0 \\ -1 & 0 \\ 0 & 1 \\ 0 & j \end{bmatrix}$ $\begin{bmatrix} 1 & 0 \\ -j & 0 \\ 0 & 1 \\ 0 & 1 \end{bmatrix}$ $\begin{bmatrix} 1 & 0 \\ -j & 0 \\ 0 & 1 \\ 0 & -1 \end{bmatrix}$ $\begin{bmatrix} 1 & 0 \\ 0 & 1 \\ 1 & 0 \\ 0 & 1 \end{bmatrix}$ $\begin{bmatrix} 1 & 0 \\ 0 & 1 \\ 1 & 0 \\ 0 & -1 \end{bmatrix}$ $\begin{bmatrix} 1 & 0 \\ 0 & 1 \\ j & 0 \\ 0 & 1 \end{bmatrix}$ $\begin{bmatrix} 1 & 0 \\ 0 & 1 \\ -1 & 0 \\ 0 & 1 \end{bmatrix}$ $\begin{bmatrix} 1 & 0 \\ 0 & 1 \\ -1 & 0 \\ 0 & -1 \end{bmatrix}$ $\begin{bmatrix} 1 & 0 \\ 0 & 1 \\ -j & 0 \\ 0 & 1 \end{bmatrix}$ $\begin{bmatrix} 1 & 0 \\ 0 & 1 \\ 0 & 1 \\ 1 & 0 \end{bmatrix}$ $\begin{bmatrix} 1 & 0 \\ 0 & 1 \\ 0 & -1 \\ 1 & 0 \end{bmatrix}$ $\begin{bmatrix} 1 & 0 \\ 0 & 1 \\ 0 & 1 \\ j & 0 \end{bmatrix}$ $\begin{bmatrix} 1 & 0 \\ 0 & 1 \\ 0 & 1 \\ -1 & 0 \end{bmatrix}$ $\begin{bmatrix} 1 & 0 \\ 0 & 1 \\ 0 & -1 \\ -1 & 0 \end{bmatrix}$ $\begin{bmatrix} 1 & 0 \\ 0 & 1 \\ 0 & -1 \\ -j & 0 \end{bmatrix}$

TABLE 63

$$\begin{bmatrix} 1 & 0 \\ 1 & 0 \\ 0 & 1 \\ 0 & -j \end{bmatrix} \begin{bmatrix} 1 & 0 \\ 1 & 0 \\ 0 & 1 \\ 0 & j \end{bmatrix} \begin{bmatrix} 1 & 0 \\ j & 0 \\ 0 & 1 \\ 0 & 1 \end{bmatrix} \begin{bmatrix} 1 & 0 \\ j & 0 \\ 0 & 1 \\ 0 & -1 \end{bmatrix} \begin{bmatrix} 1 & 0 \\ -1 & 0 \\ 0 & 1 \\ 0 & -j \end{bmatrix} \begin{bmatrix} 1 & 0 \\ -1 & 0 \\ 0 & 1 \\ 0 & j \end{bmatrix} \begin{bmatrix} 1 & 0 \\ -j & 0 \\ 0 & 1 \\ 0 & 1 \end{bmatrix} \begin{bmatrix} 1 & 0 \\ -j & 0 \\ 0 & 1 \\ 0 & -1 \end{bmatrix}$$

$$\begin{bmatrix} 1 & 0 \\ 0 & 1 \\ 1 & 0 \\ 0 & 1 \end{bmatrix} \begin{bmatrix} 1 & 0 \\ 0 & 1 \\ 1 & 0 \\ 0 & -1 \end{bmatrix} \begin{bmatrix} 1 & 0 \\ 0 & 1 \\ j & 0 \\ 0 & 1 \end{bmatrix} \quad \begin{bmatrix} 1 & 0 \\ 0 & 1 \\ -1 & 0 \\ 0 & 1 \end{bmatrix} \begin{bmatrix} 1 & 0 \\ 0 & 1 \\ -1 & 0 \\ 0 & -1 \end{bmatrix} \begin{bmatrix} 1 & 0 \\ 0 & 1 \\ -j & 0 \\ 0 & 1 \end{bmatrix}$$

$$\begin{bmatrix} 1 & 0 \\ 0 & 1 \\ 0 & 1 \\ 1 & 0 \end{bmatrix} \begin{bmatrix} 1 & 0 \\ 0 & 1 \\ 0 & -1 \\ 1 & 0 \end{bmatrix} \quad \begin{bmatrix} 1 & 0 \\ 0 & 1 \\ 0 & -1 \\ j & 0 \end{bmatrix} \begin{bmatrix} 1 & 0 \\ 0 & 1 \\ 0 & 1 \\ -1 & 0 \end{bmatrix} \begin{bmatrix} 1 & 0 \\ 0 & 1 \\ 0 & -1 \\ -1 & 0 \end{bmatrix} \begin{bmatrix} 1 & 0 \\ 0 & 1 \\ 0 & 1 \\ -j & 0 \end{bmatrix}$$

TABLE 64

$$\begin{bmatrix} 1 & 0 \\ 1 & 0 \\ 0 & 1 \\ 0 & -j \end{bmatrix} \begin{bmatrix} 1 & 0 \\ 1 & 0 \\ 0 & 1 \\ 0 & j \end{bmatrix} \begin{bmatrix} 1 & 0 \\ j & 0 \\ 0 & 1 \\ 0 & 1 \end{bmatrix} \begin{bmatrix} 1 & 0 \\ j & 0 \\ 0 & 1 \\ 0 & -1 \end{bmatrix} \begin{bmatrix} 1 & 0 \\ -1 & 0 \\ 0 & 1 \\ 0 & -j \end{bmatrix} \begin{bmatrix} 1 & 0 \\ -1 & 0 \\ 0 & 1 \\ 0 & j \end{bmatrix} \begin{bmatrix} 1 & 0 \\ -j & 0 \\ 0 & 1 \\ 0 & 1 \end{bmatrix} \begin{bmatrix} 1 & 0 \\ -j & 0 \\ 0 & 1 \\ 0 & -1 \end{bmatrix}$$

$$\begin{bmatrix} 1 & 0 \\ 0 & 1 \\ 1 & 0 \\ 0 & 1 \end{bmatrix} \begin{bmatrix} 1 & 0 \\ 0 & 1 \\ 1 & 0 \\ 0 & -1 \end{bmatrix} \begin{bmatrix} 1 & 0 \\ 0 & 1 \\ j & 0 \\ 0 & 1 \end{bmatrix} \quad \begin{bmatrix} 1 & 0 \\ 0 & 1 \\ -1 & 0 \\ 0 & 1 \end{bmatrix} \begin{bmatrix} 1 & 0 \\ 0 & 1 \\ -1 & 0 \\ 0 & -1 \end{bmatrix} \begin{bmatrix} 1 & 0 \\ 0 & 1 \\ -j & 0 \\ 0 & 1 \end{bmatrix}$$

$$\begin{bmatrix} 1 & 0 \\ 0 & 1 \\ 0 & 1 \\ 1 & 0 \end{bmatrix} \begin{bmatrix} 1 & 0 \\ 0 & 1 \\ 0 & -1 \\ 1 & 0 \end{bmatrix} \quad \begin{bmatrix} 1 & 0 \\ 0 & 1 \\ 0 & -1 \\ j & 0 \end{bmatrix} \begin{bmatrix} 1 & 0 \\ 0 & 1 \\ 0 & 1 \\ -1 & 0 \end{bmatrix} \begin{bmatrix} 1 & 0 \\ 0 & 1 \\ 0 & -1 \\ -1 & 0 \end{bmatrix} \quad \begin{bmatrix} 1 & 0 \\ 0 & 1 \\ 0 & -1 \\ -j & 0 \end{bmatrix}$$

TABLE 65

$$\begin{bmatrix} 1 & 0 \\ 1 & 0 \\ 0 & 1 \\ 0 & -j \end{bmatrix} \begin{bmatrix} 1 & 0 \\ 1 & 0 \\ 0 & 1 \\ 0 & j \end{bmatrix} \begin{bmatrix} 1 & 0 \\ j & 0 \\ 0 & 1 \\ 0 & 1 \end{bmatrix} \begin{bmatrix} 1 & 0 \\ j & 0 \\ 0 & 1 \\ 0 & -1 \end{bmatrix} \begin{bmatrix} 1 & 0 \\ -1 & 0 \\ 0 & 1 \\ 0 & -j \end{bmatrix} \begin{bmatrix} 1 & 0 \\ -1 & 0 \\ 0 & 1 \\ 0 & j \end{bmatrix} \begin{bmatrix} 1 & 0 \\ -j & 0 \\ 0 & 1 \\ 0 & 1 \end{bmatrix} \begin{bmatrix} 1 & 0 \\ -j & 0 \\ 0 & 1 \\ 0 & -1 \end{bmatrix}$$

$$\begin{bmatrix} 1 & 0 \\ 0 & 1 \\ 1 & 0 \\ 0 & 1 \end{bmatrix} \begin{bmatrix} 1 & 0 \\ 0 & 1 \\ 1 & 0 \\ 0 & -1 \end{bmatrix} \begin{bmatrix} 1 & 0 \\ 0 & 1 \\ j & 0 \\ 0 & 1 \end{bmatrix} \quad \begin{bmatrix} 1 & 0 \\ 0 & 1 \\ -1 & 0 \\ 0 & 1 \end{bmatrix} \begin{bmatrix} 1 & 0 \\ 0 & 1 \\ -1 & 0 \\ 0 & -1 \end{bmatrix} \begin{bmatrix} 1 & 0 \\ 0 & 1 \\ -j & 0 \\ 0 & 1 \end{bmatrix}$$

$$\begin{bmatrix} 1 & 0 \\ 0 & 1 \\ 0 & 1 \\ 1 & 0 \end{bmatrix} \begin{bmatrix} 1 & 0 \\ 0 & 1 \\ 0 & -1 \\ 1 & 0 \end{bmatrix} \quad \quad \begin{bmatrix} 1 & 0 \\ 0 & 1 \\ 0 & 1 \\ -1 & 0 \end{bmatrix} \begin{bmatrix} 1 & 0 \\ 0 & 1 \\ 0 & -1 \\ -1 & 0 \end{bmatrix} \begin{bmatrix} 1 & 0 \\ 0 & 1 \\ 0 & 1 \\ -j & 0 \end{bmatrix} \begin{bmatrix} 1 & 0 \\ 0 & 1 \\ 0 & -1 \\ -j & 0 \end{bmatrix}$$

TABLE 66

$$\begin{bmatrix} 1 & 0 \\ 1 & 0 \\ 0 & 1 \\ 0 & -j \end{bmatrix} \begin{bmatrix} 1 & 0 \\ 1 & 0 \\ 0 & 1 \\ 0 & j \end{bmatrix} \begin{bmatrix} 1 & 0 \\ j & 0 \\ 0 & 1 \\ 0 & 1 \end{bmatrix} \begin{bmatrix} 1 & 0 \\ j & 0 \\ 0 & 1 \\ 0 & -1 \end{bmatrix} \begin{bmatrix} 1 & 0 \\ -1 & 0 \\ 0 & 1 \\ 0 & -j \end{bmatrix} \begin{bmatrix} 1 & 0 \\ -1 & 0 \\ 0 & 1 \\ 0 & j \end{bmatrix} \begin{bmatrix} 1 & 0 \\ -j & 0 \\ 0 & 1 \\ 0 & 1 \end{bmatrix} \begin{bmatrix} 1 & 0 \\ -j & 0 \\ 0 & 1 \\ 0 & -1 \end{bmatrix}$$

TABLE 66-continued $$\begin{bmatrix} 1 & 0 \\ 0 & 1 \\ 1 & 0 \\ 0 & 1 \end{bmatrix} \begin{bmatrix} 1 & 0 \\ 0 & 1 \\ 1 & 0 \\ 0 & -1 \end{bmatrix} \begin{bmatrix} 1 & 0 \\ 0 & 1 \\ j & 0 \\ 0 & 1 \end{bmatrix} \qquad \begin{bmatrix} 1 & 0 \\ 0 & 1 \\ -1 & 0 \\ 0 & 1 \end{bmatrix} \begin{bmatrix} 1 & 0 \\ 0 & 1 \\ -1 & 0 \\ 0 & -1 \end{bmatrix} \qquad \begin{bmatrix} 1 & 0 \\ 0 & 1 \\ -j & 0 \\ 0 & -1 \end{bmatrix}$$

$$\begin{bmatrix} 1 & 0 \\ 0 & 1 \\ 0 & 1 \\ 1 & 0 \end{bmatrix} \begin{bmatrix} 1 & 0 \\ 0 & 1 \\ 0 & -1 \\ 1 & 0 \end{bmatrix} \begin{bmatrix} 1 & 0 \\ 0 & 1 \\ 0 & 1 \\ j & 0 \end{bmatrix} \begin{bmatrix} 1 & 0 \\ 0 & 1 \\ 0 & -1 \\ j & 0 \end{bmatrix} \begin{bmatrix} 1 & 0 \\ 0 & 1 \\ 0 & 1 \\ -1 & 0 \end{bmatrix} \begin{bmatrix} 1 & 0 \\ 0 & 1 \\ 0 & -1 \\ -1 & 0 \end{bmatrix}$$

TABLE 67

$$\begin{bmatrix} 1 & 0 \\ 1 & 0 \\ 0 & 1 \\ 0 & -j \end{bmatrix} \begin{bmatrix} 1 & 0 \\ 1 & 0 \\ 0 & 1 \\ 0 & j \end{bmatrix} \begin{bmatrix} 1 & 0 \\ j & 0 \\ 0 & 1 \\ 0 & 1 \end{bmatrix} \begin{bmatrix} 1 & 0 \\ j & 0 \\ 0 & 1 \\ 0 & -1 \end{bmatrix} \begin{bmatrix} 1 & 0 \\ -1 & 0 \\ 0 & 1 \\ 0 & -j \end{bmatrix} \begin{bmatrix} 1 & 0 \\ -1 & 0 \\ 0 & 1 \\ 0 & j \end{bmatrix} \begin{bmatrix} 1 & 0 \\ -j & 0 \\ 0 & 1 \\ 0 & 1 \end{bmatrix} \begin{bmatrix} 1 & 0 \\ -j & 0 \\ 0 & 1 \\ 0 & -1 \end{bmatrix}$$

$$\begin{bmatrix} 1 & 0 \\ 0 & 1 \\ 1 & 0 \\ 0 & 1 \end{bmatrix} \begin{bmatrix} 1 & 0 \\ 0 & 1 \\ 1 & 0 \\ 0 & -1 \end{bmatrix} \begin{bmatrix} 1 & 0 \\ 0 & 1 \\ j & 0 \\ 0 & 1 \end{bmatrix} \qquad \begin{bmatrix} 1 & 0 \\ 0 & 1 \\ -1 & 0 \\ 0 & 1 \end{bmatrix} \begin{bmatrix} 1 & 0 \\ 0 & 1 \\ -1 & 0 \\ 0 & -1 \end{bmatrix} \qquad \begin{bmatrix} 1 & 0 \\ 0 & 1 \\ -j & 0 \\ 0 & -1 \end{bmatrix}$$

$$\begin{bmatrix} 1 & 0 \\ 0 & 1 \\ 0 & 1 \\ 1 & 0 \end{bmatrix} \begin{bmatrix} 1 & 0 \\ 0 & 1 \\ 0 & -1 \\ 1 & 0 \end{bmatrix} \begin{bmatrix} 1 & 0 \\ 0 & 1 \\ 0 & 1 \\ j & 0 \end{bmatrix} \qquad \begin{bmatrix} 1 & 0 \\ 0 & 1 \\ 0 & 1 \\ -1 & 0 \end{bmatrix} \begin{bmatrix} 1 & 0 \\ 0 & 1 \\ 0 & -1 \\ -1 & 0 \end{bmatrix} \begin{bmatrix} 1 & 0 \\ 0 & 1 \\ 0 & 1 \\ -j & 0 \end{bmatrix}$$

TABLE 68

$$\begin{bmatrix} 1 & 0 \\ 1 & 0 \\ 0 & 1 \\ 0 & -j \end{bmatrix} \begin{bmatrix} 1 & 0 \\ 1 & 0 \\ 0 & 1 \\ 0 & j \end{bmatrix} \begin{bmatrix} 1 & 0 \\ j & 0 \\ 0 & 1 \\ 0 & 1 \end{bmatrix} \begin{bmatrix} 1 & 0 \\ j & 0 \\ 0 & 1 \\ 0 & -1 \end{bmatrix} \begin{bmatrix} 1 & 0 \\ -1 & 0 \\ 0 & 1 \\ 0 & -j \end{bmatrix} \begin{bmatrix} 1 & 0 \\ -1 & 0 \\ 0 & 1 \\ 0 & j \end{bmatrix} \begin{bmatrix} 1 & 0 \\ -j & 0 \\ 0 & 1 \\ 0 & 1 \end{bmatrix} \begin{bmatrix} 1 & 0 \\ -j & 0 \\ 0 & 1 \\ 0 & -1 \end{bmatrix}$$

$$\begin{bmatrix} 1 & 0 \\ 0 & 1 \\ 1 & 0 \\ 0 & 1 \end{bmatrix} \begin{bmatrix} 1 & 0 \\ 0 & 1 \\ 1 & 0 \\ 0 & -1 \end{bmatrix} \begin{bmatrix} 1 & 0 \\ 0 & 1 \\ j & 0 \\ 0 & 1 \end{bmatrix} \qquad \begin{bmatrix} 1 & 0 \\ 0 & 1 \\ -1 & 0 \\ 0 & 1 \end{bmatrix} \begin{bmatrix} 1 & 0 \\ 0 & 1 \\ -1 & 0 \\ 0 & -1 \end{bmatrix} \qquad \begin{bmatrix} 1 & 0 \\ 0 & 1 \\ -j & 0 \\ 0 & -1 \end{bmatrix}$$

$$\begin{bmatrix} 1 & 0 \\ 0 & 1 \\ 0 & 1 \\ 1 & 0 \end{bmatrix} \begin{bmatrix} 1 & 0 \\ 0 & 1 \\ 0 & -1 \\ 1 & 0 \end{bmatrix} \begin{bmatrix} 1 & 0 \\ 0 & 1 \\ 0 & 1 \\ j & 0 \end{bmatrix} \qquad \begin{bmatrix} 1 & 0 \\ 0 & 1 \\ 0 & 1 \\ -1 & 0 \end{bmatrix} \begin{bmatrix} 1 & 0 \\ 0 & 1 \\ 0 & -1 \\ -1 & 0 \end{bmatrix} \begin{bmatrix} 1 & 0 \\ 0 & 1 \\ 0 & -1 \\ -j & 0 \end{bmatrix}$$

TABLE 69

$$\begin{bmatrix} 1 & 0 \\ 1 & 0 \\ 0 & 1 \\ 0 & -j \end{bmatrix} \begin{bmatrix} 1 & 0 \\ 1 & 0 \\ 0 & 1 \\ 0 & j \end{bmatrix} \begin{bmatrix} 1 & 0 \\ j & 0 \\ 0 & 1 \\ 0 & 1 \end{bmatrix} \begin{bmatrix} 1 & 0 \\ j & 0 \\ 0 & 1 \\ 0 & -1 \end{bmatrix} \begin{bmatrix} 1 & 0 \\ -1 & 0 \\ 0 & 1 \\ 0 & -j \end{bmatrix} \begin{bmatrix} 1 & 0 \\ -1 & 0 \\ 0 & 1 \\ 0 & j \end{bmatrix} \begin{bmatrix} 1 & 0 \\ -j & 0 \\ 0 & 1 \\ 0 & 1 \end{bmatrix} \begin{bmatrix} 1 & 0 \\ -j & 0 \\ 0 & 1 \\ 0 & -1 \end{bmatrix}$$

$$\begin{bmatrix} 1 & 0 \\ 0 & 1 \\ 1 & 0 \\ 0 & 1 \end{bmatrix} \begin{bmatrix} 1 & 0 \\ 0 & 1 \\ 1 & 0 \\ 0 & -1 \end{bmatrix} \begin{bmatrix} 1 & 0 \\ 0 & 1 \\ j & 0 \\ 0 & 1 \end{bmatrix} \qquad \begin{bmatrix} 1 & 0 \\ 0 & 1 \\ -1 & 0 \\ 0 & 1 \end{bmatrix} \begin{bmatrix} 1 & 0 \\ 0 & 1 \\ -1 & 0 \\ 0 & -1 \end{bmatrix} \qquad \begin{bmatrix} 1 & 0 \\ 0 & 1 \\ -j & 0 \\ 0 & -1 \end{bmatrix}$$

TABLE 69-continued

| | | | | | | |
|---|---|---|---|---|---|---|
| $\begin{bmatrix} 1 & 0 \\ 0 & 1 \\ 0 & 1 \\ 1 & 0 \end{bmatrix}$ | $\begin{bmatrix} 1 & 0 \\ 0 & 1 \\ 0 & -1 \\ 1 & 0 \end{bmatrix}$ | | $\begin{bmatrix} 1 & 0 \\ 0 & 1 \\ 0 & -1 \\ j & 0 \end{bmatrix}$ | $\begin{bmatrix} 1 & 0 \\ 0 & 1 \\ 0 & 1 \\ -1 & 0 \end{bmatrix}$ | $\begin{bmatrix} 1 & 0 \\ 0 & 1 \\ 0 & -1 \\ -1 & 0 \end{bmatrix}$ | $\begin{bmatrix} 1 & 0 \\ 0 & 1 \\ 0 & 1 \\ -j & 0 \end{bmatrix}$ |

TABLE 70

| | | | | | | | |
|---|---|---|---|---|---|---|---|
| $\begin{bmatrix} 1 & 0 \\ 1 & 0 \\ 0 & 1 \\ 0 & -j \end{bmatrix}$ | $\begin{bmatrix} 1 & 0 \\ 1 & 0 \\ 0 & 1 \\ 0 & j \end{bmatrix}$ | $\begin{bmatrix} 1 & 0 \\ j & 0 \\ 0 & 1 \\ 0 & 1 \end{bmatrix}$ | $\begin{bmatrix} 1 & 0 \\ j & 0 \\ 0 & 1 \\ 0 & -1 \end{bmatrix}$ | $\begin{bmatrix} 1 & 0 \\ -1 & 0 \\ 0 & 1 \\ 0 & -j \end{bmatrix}$ | $\begin{bmatrix} 1 & 0 \\ -1 & 0 \\ 0 & 1 \\ 0 & j \end{bmatrix}$ | $\begin{bmatrix} 1 & 0 \\ -j & 0 \\ 0 & 1 \\ 0 & 1 \end{bmatrix}$ | $\begin{bmatrix} 1 & 0 \\ -j & 0 \\ 0 & 1 \\ 0 & -1 \end{bmatrix}$ |
| $\begin{bmatrix} 1 & 0 \\ 0 & 1 \\ 1 & 0 \\ 0 & 1 \end{bmatrix}$ | $\begin{bmatrix} 1 & 0 \\ 0 & 1 \\ 1 & 0 \\ 0 & -1 \end{bmatrix}$ | $\begin{bmatrix} 1 & 0 \\ 0 & 1 \\ j & 0 \\ 0 & 1 \end{bmatrix}$ | | $\begin{bmatrix} 1 & 0 \\ 0 & 1 \\ -1 & 0 \\ 0 & 1 \end{bmatrix}$ | $\begin{bmatrix} 1 & 0 \\ 0 & 1 \\ -1 & 0 \\ 0 & -1 \end{bmatrix}$ | | $\begin{bmatrix} 1 & 0 \\ 0 & 1 \\ -j & 0 \\ 0 & -1 \end{bmatrix}$ |
| $\begin{bmatrix} 1 & 0 \\ 0 & 1 \\ 0 & 1 \\ 1 & 0 \end{bmatrix}$ | $\begin{bmatrix} 1 & 0 \\ 0 & 1 \\ 0 & -1 \\ 1 & 0 \end{bmatrix}$ | | $\begin{bmatrix} 1 & 0 \\ 0 & 1 \\ 0 & -1 \\ j & 0 \end{bmatrix}$ | $\begin{bmatrix} 1 & 0 \\ 0 & 1 \\ 0 & 1 \\ -1 & 0 \end{bmatrix}$ | $\begin{bmatrix} 1 & 0 \\ 0 & 1 \\ 0 & -1 \\ -1 & 0 \end{bmatrix}$ | | $\begin{bmatrix} 1 & 0 \\ 0 & 1 \\ 0 & -1 \\ -j & 0 \end{bmatrix}$ |

TABLE 71

| | | | | | | | |
|---|---|---|---|---|---|---|---|
| $\begin{bmatrix} 1 & 0 \\ 1 & 0 \\ 0 & 1 \\ 0 & -j \end{bmatrix}$ | $\begin{bmatrix} 1 & 0 \\ 1 & 0 \\ 0 & 1 \\ 0 & j \end{bmatrix}$ | $\begin{bmatrix} 1 & 0 \\ j & 0 \\ 0 & 1 \\ 0 & 1 \end{bmatrix}$ | $\begin{bmatrix} 1 & 0 \\ j & 0 \\ 0 & 1 \\ 0 & -1 \end{bmatrix}$ | $\begin{bmatrix} 1 & 0 \\ -1 & 0 \\ 0 & 1 \\ 0 & -j \end{bmatrix}$ | $\begin{bmatrix} 1 & 0 \\ -1 & 0 \\ 0 & 1 \\ 0 & j \end{bmatrix}$ | $\begin{bmatrix} 1 & 0 \\ -j & 0 \\ 0 & 1 \\ 0 & 1 \end{bmatrix}$ | $\begin{bmatrix} 1 & 0 \\ -j & 0 \\ 0 & 1 \\ 0 & -1 \end{bmatrix}$ |
| $\begin{bmatrix} 1 & 0 \\ 0 & 1 \\ 1 & 0 \\ 0 & 1 \end{bmatrix}$ | $\begin{bmatrix} 1 & 0 \\ 0 & 1 \\ 1 & 0 \\ 0 & -1 \end{bmatrix}$ | $\begin{bmatrix} 1 & 0 \\ 0 & 1 \\ j & 0 \\ 0 & 1 \end{bmatrix}$ | | $\begin{bmatrix} 1 & 0 \\ 0 & 1 \\ -1 & 0 \\ 0 & 1 \end{bmatrix}$ | $\begin{bmatrix} 1 & 0 \\ 0 & 1 \\ -1 & 0 \\ 0 & -1 \end{bmatrix}$ | | $\begin{bmatrix} 1 & 0 \\ 0 & 1 \\ -j & 0 \\ 0 & -1 \end{bmatrix}$ |
| $\begin{bmatrix} 1 & 0 \\ 0 & 1 \\ 0 & 1 \\ 1 & 0 \end{bmatrix}$ | $\begin{bmatrix} 1 & 0 \\ 0 & 1 \\ 0 & -1 \\ 1 & 0 \end{bmatrix}$ | | | $\begin{bmatrix} 1 & 0 \\ 0 & 1 \\ 0 & 1 \\ -1 & 0 \end{bmatrix}$ | $\begin{bmatrix} 1 & 0 \\ 0 & 1 \\ 0 & -1 \\ -1 & 0 \end{bmatrix}$ | $\begin{bmatrix} 1 & 0 \\ 0 & 1 \\ 0 & 1 \\ -j & 0 \end{bmatrix}$ | $\begin{bmatrix} 1 & 0 \\ 0 & 1 \\ 0 & -1 \\ -j & 0 \end{bmatrix}$ |

TABLE 72

| | | | | | | | |
|---|---|---|---|---|---|---|---|
| $\begin{bmatrix} 1 & 0 \\ 1 & 0 \\ 0 & 1 \\ 0 & -j \end{bmatrix}$ | $\begin{bmatrix} 1 & 0 \\ 1 & 0 \\ 0 & 1 \\ 0 & j \end{bmatrix}$ | $\begin{bmatrix} 1 & 0 \\ j & 0 \\ 0 & 1 \\ 0 & 1 \end{bmatrix}$ | $\begin{bmatrix} 1 & 0 \\ j & 0 \\ 0 & 1 \\ 0 & -1 \end{bmatrix}$ | $\begin{bmatrix} 1 & 0 \\ -1 & 0 \\ 0 & 1 \\ 0 & -j \end{bmatrix}$ | $\begin{bmatrix} 1 & 0 \\ -1 & 0 \\ 0 & 1 \\ 0 & j \end{bmatrix}$ | $\begin{bmatrix} 1 & 0 \\ -j & 0 \\ 0 & 1 \\ 0 & 1 \end{bmatrix}$ | $\begin{bmatrix} 1 & 0 \\ -j & 0 \\ 0 & 1 \\ 0 & -1 \end{bmatrix}$ |
| $\begin{bmatrix} 1 & 0 \\ 0 & 1 \\ 1 & 0 \\ 0 & 1 \end{bmatrix}$ | $\begin{bmatrix} 1 & 0 \\ 0 & 1 \\ 1 & 0 \\ 0 & -1 \end{bmatrix}$ | | $\begin{bmatrix} 1 & 0 \\ 0 & 1 \\ j & 0 \\ 0 & -1 \end{bmatrix}$ | $\begin{bmatrix} 1 & 0 \\ 0 & 1 \\ -1 & 0 \\ 0 & 1 \end{bmatrix}$ | $\begin{bmatrix} 1 & 0 \\ 0 & 1 \\ -1 & 0 \\ 0 & -1 \end{bmatrix}$ | $\begin{bmatrix} 1 & 0 \\ 0 & 1 \\ -j & 0 \\ 0 & 1 \end{bmatrix}$ | |
| $\begin{bmatrix} 1 & 0 \\ 0 & 1 \\ 0 & 1 \\ 1 & 0 \end{bmatrix}$ | $\begin{bmatrix} 1 & 0 \\ 0 & 1 \\ 0 & -1 \\ 1 & 0 \end{bmatrix}$ | $\begin{bmatrix} 1 & 0 \\ 0 & 1 \\ 0 & 1 \\ j & 0 \end{bmatrix}$ | $\begin{bmatrix} 1 & 0 \\ 0 & 1 \\ 0 & -1 \\ j & 0 \end{bmatrix}$ | $\begin{bmatrix} 1 & 0 \\ 0 & 1 \\ 0 & 1 \\ -1 & 0 \end{bmatrix}$ | $\begin{bmatrix} 1 & 0 \\ 0 & 1 \\ 0 & -1 \\ -1 & 0 \end{bmatrix}$ | | |

TABLE 73

$$\begin{bmatrix} 1 & 0 \\ 1 & 0 \\ 0 & 1 \\ 0 & -j \end{bmatrix} \begin{bmatrix} 1 & 0 \\ 1 & 0 \\ 0 & 1 \\ 0 & j \end{bmatrix} \begin{bmatrix} 1 & 0 \\ j & 0 \\ 0 & 1 \\ 0 & 1 \end{bmatrix} \begin{bmatrix} 1 & 0 \\ j & 0 \\ 0 & 1 \\ 0 & -1 \end{bmatrix} \begin{bmatrix} 1 & 0 \\ -1 & 0 \\ 0 & 1 \\ 0 & -j \end{bmatrix} \begin{bmatrix} 1 & 0 \\ -1 & 0 \\ 0 & 1 \\ 0 & j \end{bmatrix} \begin{bmatrix} 1 & 0 \\ -j & 0 \\ 0 & 1 \\ 0 & 1 \end{bmatrix} \begin{bmatrix} 1 & 0 \\ -j & 0 \\ 0 & 1 \\ 0 & -1 \end{bmatrix}$$

$$\begin{bmatrix} 1 & 0 \\ 0 & 1 \\ 1 & 0 \\ 0 & 1 \end{bmatrix} \begin{bmatrix} 1 & 0 \\ 0 & 1 \\ 1 & 0 \\ 0 & -1 \end{bmatrix} \quad \begin{bmatrix} 1 & 0 \\ 0 & 1 \\ j & 0 \\ 0 & -1 \end{bmatrix} \begin{bmatrix} 1 & 0 \\ 0 & 1 \\ -1 & 0 \\ 0 & 1 \end{bmatrix} \begin{bmatrix} 1 & 0 \\ 0 & 1 \\ -1 & 0 \\ 0 & -1 \end{bmatrix} \begin{bmatrix} 1 & 0 \\ 0 & 1 \\ -j & 0 \\ 0 & 1 \end{bmatrix}$$

$$\begin{bmatrix} 1 & 0 \\ 0 & 1 \\ 0 & 1 \\ 1 & 0 \end{bmatrix} \begin{bmatrix} 1 & 0 \\ 0 & 1 \\ 0 & -1 \\ 1 & 0 \end{bmatrix} \begin{bmatrix} 1 & 0 \\ 0 & 1 \\ 0 & 1 \\ j & 0 \end{bmatrix} \quad \begin{bmatrix} 1 & 0 \\ 0 & 1 \\ 0 & 1 \\ -1 & 0 \end{bmatrix} \begin{bmatrix} 1 & 0 \\ 0 & 1 \\ 0 & -1 \\ -1 & 0 \end{bmatrix} \begin{bmatrix} 1 & 0 \\ 0 & 1 \\ 0 & 1 \\ -j & 0 \end{bmatrix}$$

TABLE 74

$$\begin{bmatrix} 1 & 0 \\ 1 & 0 \\ 0 & 1 \\ 0 & -j \end{bmatrix} \begin{bmatrix} 1 & 0 \\ 1 & 0 \\ 0 & 1 \\ 0 & j \end{bmatrix} \begin{bmatrix} 1 & 0 \\ j & 0 \\ 0 & 1 \\ 0 & 1 \end{bmatrix} \begin{bmatrix} 1 & 0 \\ j & 0 \\ 0 & 1 \\ 0 & -1 \end{bmatrix} \begin{bmatrix} 1 & 0 \\ -1 & 0 \\ 0 & 1 \\ 0 & -j \end{bmatrix} \begin{bmatrix} 1 & 0 \\ -1 & 0 \\ 0 & 1 \\ 0 & j \end{bmatrix} \begin{bmatrix} 1 & 0 \\ -j & 0 \\ 0 & 1 \\ 0 & 1 \end{bmatrix} \begin{bmatrix} 1 & 0 \\ -j & 0 \\ 0 & 1 \\ 0 & -1 \end{bmatrix}$$

$$\begin{bmatrix} 1 & 0 \\ 0 & 1 \\ 1 & 0 \\ 0 & 1 \end{bmatrix} \begin{bmatrix} 1 & 0 \\ 0 & 1 \\ 1 & 0 \\ 0 & -1 \end{bmatrix} \quad \begin{bmatrix} 1 & 0 \\ 0 & 1 \\ j & 0 \\ 0 & -1 \end{bmatrix} \begin{bmatrix} 1 & 0 \\ 0 & 1 \\ -1 & 0 \\ 0 & 1 \end{bmatrix} \begin{bmatrix} 1 & 0 \\ 0 & 1 \\ -1 & 0 \\ 0 & -1 \end{bmatrix} \begin{bmatrix} 1 & 0 \\ 0 & 1 \\ -j & 0 \\ 0 & 1 \end{bmatrix}$$

$$\begin{bmatrix} 1 & 0 \\ 0 & 1 \\ 0 & 1 \\ 1 & 0 \end{bmatrix} \begin{bmatrix} 1 & 0 \\ 0 & 1 \\ 0 & -1 \\ 1 & 0 \end{bmatrix} \begin{bmatrix} 1 & 0 \\ 0 & 1 \\ 0 & 1 \\ j & 0 \end{bmatrix} \quad \begin{bmatrix} 1 & 0 \\ 0 & 1 \\ 0 & 1 \\ -1 & 0 \end{bmatrix} \begin{bmatrix} 1 & 0 \\ 0 & 1 \\ 0 & -1 \\ -1 & 0 \end{bmatrix} \quad \begin{bmatrix} 1 & 0 \\ 0 & 1 \\ 0 & -1 \\ -j & 0 \end{bmatrix}$$

TABLE 75

$$\begin{bmatrix} 1 & 0 \\ 1 & 0 \\ 0 & 1 \\ 0 & -j \end{bmatrix} \begin{bmatrix} 1 & 0 \\ 1 & 0 \\ 0 & 1 \\ 0 & j \end{bmatrix} \begin{bmatrix} 1 & 0 \\ j & 0 \\ 0 & 1 \\ 0 & 1 \end{bmatrix} \begin{bmatrix} 1 & 0 \\ j & 0 \\ 0 & 1 \\ 0 & -1 \end{bmatrix} \begin{bmatrix} 1 & 0 \\ -1 & 0 \\ 0 & 1 \\ 0 & -j \end{bmatrix} \begin{bmatrix} 1 & 0 \\ -1 & 0 \\ 0 & 1 \\ 0 & j \end{bmatrix} \begin{bmatrix} 1 & 0 \\ -j & 0 \\ 0 & 1 \\ 0 & 1 \end{bmatrix} \begin{bmatrix} 1 & 0 \\ -j & 0 \\ 0 & 1 \\ 0 & -1 \end{bmatrix}$$

$$\begin{bmatrix} 1 & 0 \\ 0 & 1 \\ 1 & 0 \\ 0 & 1 \end{bmatrix} \begin{bmatrix} 1 & 0 \\ 0 & 1 \\ 1 & 0 \\ 0 & -1 \end{bmatrix} \quad \begin{bmatrix} 1 & 0 \\ 0 & 1 \\ j & 0 \\ 0 & -1 \end{bmatrix} \begin{bmatrix} 1 & 0 \\ 0 & 1 \\ -1 & 0 \\ 0 & 1 \end{bmatrix} \begin{bmatrix} 1 & 0 \\ 0 & 1 \\ -1 & 0 \\ 0 & -1 \end{bmatrix} \begin{bmatrix} 1 & 0 \\ 0 & 1 \\ -j & 0 \\ 0 & 1 \end{bmatrix}$$

$$\begin{bmatrix} 1 & 0 \\ 0 & 1 \\ 0 & 1 \\ 1 & 0 \end{bmatrix} \begin{bmatrix} 1 & 0 \\ 0 & 1 \\ 0 & -1 \\ 1 & 0 \end{bmatrix} \quad \begin{bmatrix} 1 & 0 \\ 0 & 1 \\ 0 & -1 \\ j & 0 \end{bmatrix} \begin{bmatrix} 1 & 0 \\ 0 & 1 \\ 0 & 1 \\ -1 & 0 \end{bmatrix} \begin{bmatrix} 1 & 0 \\ 0 & 1 \\ 0 & -1 \\ -1 & 0 \end{bmatrix} \begin{bmatrix} 1 & 0 \\ 0 & 1 \\ 0 & 1 \\ -j & 0 \end{bmatrix}$$

TABLE 76

$$\begin{bmatrix} 1 & 0 \\ 1 & 0 \\ 0 & 1 \\ 0 & -j \end{bmatrix} \begin{bmatrix} 1 & 0 \\ 1 & 0 \\ 0 & 1 \\ 0 & j \end{bmatrix} \begin{bmatrix} 1 & 0 \\ j & 0 \\ 0 & 1 \\ 0 & 1 \end{bmatrix} \begin{bmatrix} 1 & 0 \\ j & 0 \\ 0 & 1 \\ 0 & -1 \end{bmatrix} \begin{bmatrix} 1 & 0 \\ -1 & 0 \\ 0 & 1 \\ 0 & -j \end{bmatrix} \begin{bmatrix} 1 & 0 \\ -1 & 0 \\ 0 & 1 \\ 0 & j \end{bmatrix} \begin{bmatrix} 1 & 0 \\ -j & 0 \\ 0 & 1 \\ 0 & 1 \end{bmatrix} \begin{bmatrix} 1 & 0 \\ -j & 0 \\ 0 & 1 \\ 0 & -1 \end{bmatrix}$$

TABLE 76-continued $$\begin{bmatrix} 1 & 0 \\ 0 & 1 \\ 1 & 0 \\ 0 & 1 \end{bmatrix} \begin{bmatrix} 1 & 0 \\ 0 & 1 \\ 1 & 0 \\ 0 & -1 \end{bmatrix} \quad \begin{bmatrix} 1 & 0 \\ 0 & 1 \\ j & 0 \\ 0 & -1 \end{bmatrix} \begin{bmatrix} 1 & 0 \\ 0 & 1 \\ -1 & 0 \\ 0 & 1 \end{bmatrix} \begin{bmatrix} 1 & 0 \\ 0 & 1 \\ -1 & 0 \\ 0 & -1 \end{bmatrix} \begin{bmatrix} 1 & 0 \\ 0 & 1 \\ -j & 0 \\ 0 & 1 \end{bmatrix}$$

$$\begin{bmatrix} 1 & 0 \\ 0 & 1 \\ 0 & 1 \\ 1 & 0 \end{bmatrix} \begin{bmatrix} 1 & 0 \\ 0 & 1 \\ 0 & -1 \\ 1 & 0 \end{bmatrix} \quad \begin{bmatrix} 1 & 0 \\ 0 & 1 \\ 0 & -1 \\ j & 0 \end{bmatrix} \begin{bmatrix} 1 & 0 \\ 0 & 1 \\ 0 & 1 \\ -1 & 0 \end{bmatrix} \begin{bmatrix} 1 & 0 \\ 0 & 1 \\ 0 & -1 \\ -1 & 0 \end{bmatrix} \begin{bmatrix} 1 & 0 \\ 0 & 1 \\ 0 & -1 \\ -j & 0 \end{bmatrix}$$

TABLE 77

$$\begin{bmatrix} 1 & 0 \\ 1 & 0 \\ 0 & 1 \\ 0 & -j \end{bmatrix} \begin{bmatrix} 1 & 0 \\ 1 & 0 \\ 0 & 1 \\ 0 & j \end{bmatrix} \begin{bmatrix} 1 & 0 \\ j & 0 \\ 0 & 1 \\ 0 & 1 \end{bmatrix} \begin{bmatrix} 1 & 0 \\ j & 0 \\ 0 & 1 \\ 0 & -1 \end{bmatrix} \begin{bmatrix} 1 & 0 \\ -1 & 0 \\ 0 & 1 \\ 0 & -j \end{bmatrix} \begin{bmatrix} 1 & 0 \\ -1 & 0 \\ 0 & 1 \\ 0 & j \end{bmatrix} \begin{bmatrix} 1 & 0 \\ -j & 0 \\ 0 & 1 \\ 0 & 1 \end{bmatrix} \begin{bmatrix} 1 & 0 \\ -j & 0 \\ 0 & 1 \\ 0 & -1 \end{bmatrix}$$

$$\begin{bmatrix} 1 & 0 \\ 0 & 1 \\ 1 & 0 \\ 0 & 1 \end{bmatrix} \begin{bmatrix} 1 & 0 \\ 0 & 1 \\ 1 & 0 \\ 0 & -1 \end{bmatrix} \quad \begin{bmatrix} 1 & 0 \\ 0 & 1 \\ j & 0 \\ 0 & -1 \end{bmatrix} \begin{bmatrix} 1 & 0 \\ 0 & 1 \\ -1 & 0 \\ 0 & 1 \end{bmatrix} \begin{bmatrix} 1 & 0 \\ 0 & 1 \\ -1 & 0 \\ 0 & -1 \end{bmatrix} \begin{bmatrix} 1 & 0 \\ 0 & 1 \\ -j & 0 \\ 0 & 1 \end{bmatrix}$$

$$\begin{bmatrix} 1 & 0 \\ 0 & 1 \\ 0 & 1 \\ 1 & 0 \end{bmatrix} \begin{bmatrix} 1 & 0 \\ 0 & 1 \\ 0 & -1 \\ 1 & 0 \end{bmatrix} \quad \begin{bmatrix} 1 & 0 \\ 0 & 1 \\ 0 & 1 \\ -1 & 0 \end{bmatrix} \begin{bmatrix} 1 & 0 \\ 0 & 1 \\ 0 & -1 \\ -1 & 0 \end{bmatrix} \begin{bmatrix} 1 & 0 \\ 0 & 1 \\ 0 & 1 \\ -j & 0 \end{bmatrix} \begin{bmatrix} 1 & 0 \\ 0 & 1 \\ 0 & -1 \\ -j & 0 \end{bmatrix}$$

TABLE 78

$$\begin{bmatrix} 1 & 0 \\ 1 & 0 \\ 0 & 1 \\ 0 & -j \end{bmatrix} \begin{bmatrix} 1 & 0 \\ 1 & 0 \\ 0 & 1 \\ 0 & j \end{bmatrix} \begin{bmatrix} 1 & 0 \\ j & 0 \\ 0 & 1 \\ 0 & 1 \end{bmatrix} \begin{bmatrix} 1 & 0 \\ j & 0 \\ 0 & 1 \\ 0 & -1 \end{bmatrix} \begin{bmatrix} 1 & 0 \\ -1 & 0 \\ 0 & 1 \\ 0 & -j \end{bmatrix} \begin{bmatrix} 1 & 0 \\ -1 & 0 \\ 0 & 1 \\ 0 & j \end{bmatrix} \begin{bmatrix} 1 & 0 \\ -j & 0 \\ 0 & 1 \\ 0 & 1 \end{bmatrix} \begin{bmatrix} 1 & 0 \\ -j & 0 \\ 0 & 1 \\ 0 & -1 \end{bmatrix}$$

$$\begin{bmatrix} 1 & 0 \\ 0 & 1 \\ 1 & 0 \\ 0 & 1 \end{bmatrix} \begin{bmatrix} 1 & 0 \\ 0 & 1 \\ 1 & 0 \\ 0 & -1 \end{bmatrix} \quad \begin{bmatrix} 1 & 0 \\ 0 & 1 \\ j & 0 \\ 0 & -1 \end{bmatrix} \begin{bmatrix} 1 & 0 \\ 0 & 1 \\ -1 & 0 \\ 0 & 1 \end{bmatrix} \begin{bmatrix} 1 & 0 \\ 0 & 1 \\ -1 & 0 \\ 0 & -1 \end{bmatrix} \quad \begin{bmatrix} 1 & 0 \\ 0 & 1 \\ -j & 0 \\ 0 & -1 \end{bmatrix}$$

$$\begin{bmatrix} 1 & 0 \\ 0 & 1 \\ 0 & 1 \\ 1 & 0 \end{bmatrix} \begin{bmatrix} 1 & 0 \\ 0 & 1 \\ 0 & -1 \\ 1 & 0 \end{bmatrix} \begin{bmatrix} 1 & 0 \\ 0 & 1 \\ 0 & 1 \\ j & 0 \end{bmatrix} \begin{bmatrix} 1 & 0 \\ 0 & 1 \\ 0 & -1 \\ j & 0 \end{bmatrix} \begin{bmatrix} 1 & 0 \\ 0 & 1 \\ 0 & 1 \\ -1 & 0 \end{bmatrix} \begin{bmatrix} 1 & 0 \\ 0 & 1 \\ 0 & -1 \\ -1 & 0 \end{bmatrix}$$

TABLE 79

$$\begin{bmatrix} 1 & 0 \\ 1 & 0 \\ 0 & 1 \\ 0 & -j \end{bmatrix} \begin{bmatrix} 1 & 0 \\ 1 & 0 \\ 0 & 1 \\ 0 & j \end{bmatrix} \begin{bmatrix} 1 & 0 \\ j & 0 \\ 0 & 1 \\ 0 & 1 \end{bmatrix} \begin{bmatrix} 1 & 0 \\ j & 0 \\ 0 & 1 \\ 0 & -1 \end{bmatrix} \begin{bmatrix} 1 & 0 \\ -1 & 0 \\ 0 & 1 \\ 0 & -j \end{bmatrix} \begin{bmatrix} 1 & 0 \\ -1 & 0 \\ 0 & 1 \\ 0 & j \end{bmatrix} \begin{bmatrix} 1 & 0 \\ -j & 0 \\ 0 & 1 \\ 0 & 1 \end{bmatrix} \begin{bmatrix} 1 & 0 \\ -j & 0 \\ 0 & 1 \\ 0 & -1 \end{bmatrix}$$

$$\begin{bmatrix} 1 & 0 \\ 0 & 1 \\ 1 & 0 \\ 0 & 1 \end{bmatrix} \begin{bmatrix} 1 & 0 \\ 0 & 1 \\ 1 & 0 \\ 0 & -1 \end{bmatrix} \quad \begin{bmatrix} 1 & 0 \\ 0 & 1 \\ j & 0 \\ 0 & -1 \end{bmatrix} \begin{bmatrix} 1 & 0 \\ 0 & 1 \\ -1 & 0 \\ 0 & 1 \end{bmatrix} \begin{bmatrix} 1 & 0 \\ 0 & 1 \\ -1 & 0 \\ 0 & -1 \end{bmatrix} \quad \begin{bmatrix} 1 & 0 \\ 0 & 1 \\ -j & 0 \\ 0 & -1 \end{bmatrix}$$

TABLE 79-continued $$\begin{bmatrix} 1 & 0 \\ 0 & 1 \\ 0 & 1 \\ 1 & 0 \end{bmatrix} \begin{bmatrix} 1 & 0 \\ 0 & 1 \\ 0 & -1 \\ 1 & 0 \end{bmatrix} \begin{bmatrix} 1 & 0 \\ 0 & 1 \\ 0 & 1 \\ j & 0 \end{bmatrix} \quad \begin{bmatrix} 1 & 0 \\ 0 & 1 \\ 0 & 1 \\ -1 & 0 \end{bmatrix} \begin{bmatrix} 1 & 0 \\ 0 & 1 \\ 0 & -1 \\ -1 & 0 \end{bmatrix} \begin{bmatrix} 1 & 0 \\ 0 & 1 \\ 0 & 1 \\ -j & 0 \end{bmatrix}$$

TABLE 80

$$\begin{bmatrix} 1 & 0 \\ 1 & 0 \\ 0 & 1 \\ 0 & -j \end{bmatrix} \begin{bmatrix} 1 & 0 \\ 1 & 0 \\ 0 & 1 \\ 0 & j \end{bmatrix} \begin{bmatrix} 1 & 0 \\ j & 0 \\ 0 & 1 \\ 0 & 1 \end{bmatrix} \begin{bmatrix} 1 & 0 \\ j & 0 \\ 0 & 1 \\ 0 & -1 \end{bmatrix} \begin{bmatrix} 1 & 0 \\ -1 & 0 \\ 0 & 1 \\ 0 & -j \end{bmatrix} \begin{bmatrix} 1 & 0 \\ -1 & 0 \\ 0 & 1 \\ 0 & j \end{bmatrix} \begin{bmatrix} 1 & 0 \\ -j & 0 \\ 0 & 1 \\ 0 & 1 \end{bmatrix} \begin{bmatrix} 1 & 0 \\ -j & 0 \\ 0 & 1 \\ 0 & -1 \end{bmatrix}$$

$$\begin{bmatrix} 1 & 0 \\ 0 & 1 \\ 1 & 0 \\ 0 & 1 \end{bmatrix} \begin{bmatrix} 1 & 0 \\ 0 & 1 \\ 1 & 0 \\ 0 & -1 \end{bmatrix} \quad \begin{bmatrix} 1 & 0 \\ 0 & 1 \\ j & 0 \\ 0 & -1 \end{bmatrix} \begin{bmatrix} 1 & 0 \\ 0 & 1 \\ -1 & 0 \\ 0 & 1 \end{bmatrix} \begin{bmatrix} 1 & 0 \\ 0 & 1 \\ -1 & 0 \\ 0 & -1 \end{bmatrix} \quad \begin{bmatrix} 1 & 0 \\ 0 & 1 \\ -j & 0 \\ 0 & -1 \end{bmatrix}$$

$$\begin{bmatrix} 1 & 0 \\ 0 & 1 \\ 0 & 1 \\ 1 & 0 \end{bmatrix} \begin{bmatrix} 1 & 0 \\ 0 & 1 \\ 0 & -1 \\ 1 & 0 \end{bmatrix} \begin{bmatrix} 1 & 0 \\ 0 & 1 \\ 0 & 1 \\ j & 0 \end{bmatrix} \quad \begin{bmatrix} 1 & 0 \\ 0 & 1 \\ 0 & 1 \\ -1 & 0 \end{bmatrix} \begin{bmatrix} 1 & 0 \\ 0 & 1 \\ 0 & -1 \\ -1 & 0 \end{bmatrix} \quad \begin{bmatrix} 1 & 0 \\ 0 & 1 \\ 0 & -1 \\ -j & 0 \end{bmatrix}$$

TABLE 81

$$\begin{bmatrix} 1 & 0 \\ 1 & 0 \\ 0 & 1 \\ 0 & -j \end{bmatrix} \begin{bmatrix} 1 & 0 \\ 1 & 0 \\ 0 & 1 \\ 0 & j \end{bmatrix} \begin{bmatrix} 1 & 0 \\ j & 0 \\ 0 & 1 \\ 0 & 1 \end{bmatrix} \begin{bmatrix} 1 & 0 \\ j & 0 \\ 0 & 1 \\ 0 & -1 \end{bmatrix} \begin{bmatrix} 1 & 0 \\ -1 & 0 \\ 0 & 1 \\ 0 & -j \end{bmatrix} \begin{bmatrix} 1 & 0 \\ -1 & 0 \\ 0 & 1 \\ 0 & j \end{bmatrix} \begin{bmatrix} 1 & 0 \\ -j & 0 \\ 0 & 1 \\ 0 & 1 \end{bmatrix} \begin{bmatrix} 1 & 0 \\ -j & 0 \\ 0 & 1 \\ 0 & -1 \end{bmatrix}$$

$$\begin{bmatrix} 1 & 0 \\ 0 & 1 \\ 1 & 0 \\ 0 & 1 \end{bmatrix} \begin{bmatrix} 1 & 0 \\ 0 & 1 \\ 1 & 0 \\ 0 & -1 \end{bmatrix} \quad \begin{bmatrix} 1 & 0 \\ 0 & 1 \\ j & 0 \\ 0 & -1 \end{bmatrix} \begin{bmatrix} 1 & 0 \\ 0 & 1 \\ -1 & 0 \\ 0 & 1 \end{bmatrix} \begin{bmatrix} 1 & 0 \\ 0 & 1 \\ -1 & 0 \\ 0 & -1 \end{bmatrix} \quad \begin{bmatrix} 1 & 0 \\ 0 & 1 \\ -j & 0 \\ 0 & -1 \end{bmatrix}$$

$$\begin{bmatrix} 1 & 0 \\ 0 & 1 \\ 0 & 1 \\ 1 & 0 \end{bmatrix} \begin{bmatrix} 1 & 0 \\ 0 & 1 \\ 0 & -1 \\ 1 & 0 \end{bmatrix} \quad \begin{bmatrix} 1 & 0 \\ 0 & 1 \\ 0 & 1 \\ j & 0 \end{bmatrix} \begin{bmatrix} 1 & 0 \\ 0 & 1 \\ 0 & 1 \\ -1 & 0 \end{bmatrix} \begin{bmatrix} 1 & 0 \\ 0 & 1 \\ 0 & -1 \\ -1 & 0 \end{bmatrix} \begin{bmatrix} 1 & 0 \\ 0 & 1 \\ 0 & 1 \\ -j & 0 \end{bmatrix}$$

TABLE 82

$$\begin{bmatrix} 1 & 0 \\ 1 & 0 \\ 0 & 1 \\ 0 & -j \end{bmatrix} \begin{bmatrix} 1 & 0 \\ 1 & 0 \\ 0 & 1 \\ 0 & j \end{bmatrix} \begin{bmatrix} 1 & 0 \\ j & 0 \\ 0 & 1 \\ 0 & 1 \end{bmatrix} \begin{bmatrix} 1 & 0 \\ j & 0 \\ 0 & 1 \\ 0 & -1 \end{bmatrix} \begin{bmatrix} 1 & 0 \\ -1 & 0 \\ 0 & 1 \\ 0 & -j \end{bmatrix} \begin{bmatrix} 1 & 0 \\ -1 & 0 \\ 0 & 1 \\ 0 & j \end{bmatrix} \begin{bmatrix} 1 & 0 \\ -j & 0 \\ 0 & 1 \\ 0 & 1 \end{bmatrix} \begin{bmatrix} 1 & 0 \\ -j & 0 \\ 0 & 1 \\ 0 & -1 \end{bmatrix}$$

$$\begin{bmatrix} 1 & 0 \\ 0 & 1 \\ 1 & 0 \\ 0 & 1 \end{bmatrix} \begin{bmatrix} 1 & 0 \\ 0 & 1 \\ 1 & 0 \\ 0 & -1 \end{bmatrix} \quad \begin{bmatrix} 1 & 0 \\ 0 & 1 \\ j & 0 \\ 0 & -1 \end{bmatrix} \begin{bmatrix} 1 & 0 \\ 0 & 1 \\ -1 & 0 \\ 0 & 1 \end{bmatrix} \begin{bmatrix} 1 & 0 \\ 0 & 1 \\ -1 & 0 \\ 0 & -1 \end{bmatrix} \quad \begin{bmatrix} 1 & 0 \\ 0 & 1 \\ -j & 0 \\ 0 & -1 \end{bmatrix}$$

$$\begin{bmatrix} 1 & 0 \\ 0 & 1 \\ 0 & 1 \\ 1 & 0 \end{bmatrix} \begin{bmatrix} 1 & 0 \\ 0 & 1 \\ 0 & -1 \\ 1 & 0 \end{bmatrix} \quad \begin{bmatrix} 1 & 0 \\ 0 & 1 \\ 0 & -1 \\ j & 0 \end{bmatrix} \begin{bmatrix} 1 & 0 \\ 0 & 1 \\ 0 & 1 \\ -1 & 0 \end{bmatrix} \begin{bmatrix} 1 & 0 \\ 0 & 1 \\ 0 & -1 \\ -1 & 0 \end{bmatrix} \quad \begin{bmatrix} 1 & 0 \\ 0 & 1 \\ 0 & -1 \\ -j & 0 \end{bmatrix}$$

TABLE 83

$$\begin{bmatrix}1&0\\1&0\\0&1\\0&-j\end{bmatrix} \begin{bmatrix}1&0\\1&0\\0&1\\0&j\end{bmatrix} \begin{bmatrix}1&0\\j&0\\0&1\\0&1\end{bmatrix} \begin{bmatrix}1&0\\j&0\\0&1\\0&-1\end{bmatrix} \begin{bmatrix}1&0\\-1&0\\0&1\\0&-j\end{bmatrix} \begin{bmatrix}1&0\\-1&0\\0&1\\0&j\end{bmatrix} \begin{bmatrix}1&0\\-j&0\\0&1\\0&1\end{bmatrix} \begin{bmatrix}1&0\\-j&0\\0&1\\0&-1\end{bmatrix}$$

$$\begin{bmatrix}1&0\\0&1\\1&0\\0&1\end{bmatrix} \begin{bmatrix}1&0\\0&1\\1&0\\0&-1\end{bmatrix} \qquad \begin{bmatrix}1&0\\0&1\\j&0\\0&-1\end{bmatrix} \begin{bmatrix}1&0\\0&1\\-1&0\\0&1\end{bmatrix} \begin{bmatrix}1&0\\0&1\\-1&0\\0&-1\end{bmatrix} \qquad \begin{bmatrix}1&0\\0&1\\-j&0\\0&-1\end{bmatrix}$$

$$\begin{bmatrix}1&0\\0&1\\0&1\\1&0\end{bmatrix} \begin{bmatrix}1&0\\0&1\\0&-1\\1&0\end{bmatrix} \qquad \qquad \begin{bmatrix}1&0\\0&1\\0&1\\-1&0\end{bmatrix} \begin{bmatrix}1&0\\0&1\\0&-1\\-1&0\end{bmatrix} \begin{bmatrix}1&0\\0&1\\0&1\\-j&0\end{bmatrix} \begin{bmatrix}1&0\\0&1\\0&-1\\-j&0\end{bmatrix}$$

TABLE 84

$$\begin{bmatrix}1&0\\1&0\\0&1\\0&-j\end{bmatrix} \begin{bmatrix}1&0\\1&0\\0&1\\0&j\end{bmatrix} \begin{bmatrix}1&0\\j&0\\0&1\\0&1\end{bmatrix} \begin{bmatrix}1&0\\j&0\\0&1\\0&-1\end{bmatrix} \begin{bmatrix}1&0\\-1&0\\0&1\\0&-j\end{bmatrix} \begin{bmatrix}1&0\\-1&0\\0&1\\0&j\end{bmatrix} \begin{bmatrix}1&0\\-j&0\\0&1\\0&1\end{bmatrix} \begin{bmatrix}1&0\\-j&0\\0&1\\0&-1\end{bmatrix}$$

$$\begin{bmatrix}1&0\\0&1\\1&0\\0&1\end{bmatrix} \begin{bmatrix}1&0\\0&1\\1&0\\0&-1\end{bmatrix} \qquad \qquad \begin{bmatrix}1&0\\0&1\\-1&0\\0&1\end{bmatrix} \begin{bmatrix}1&0\\0&1\\-1&0\\0&-1\end{bmatrix} \begin{bmatrix}1&0\\0&1\\-j&0\\0&1\end{bmatrix} \begin{bmatrix}1&0\\0&1\\-j&0\\0&-1\end{bmatrix}$$

$$\begin{bmatrix}1&0\\0&1\\0&1\\1&0\end{bmatrix} \begin{bmatrix}1&0\\0&1\\0&-1\\1&0\end{bmatrix} \begin{bmatrix}1&0\\0&1\\0&1\\j&0\end{bmatrix} \begin{bmatrix}1&0\\0&1\\0&-1\\j&0\end{bmatrix} \begin{bmatrix}1&0\\0&1\\0&1\\-1&0\end{bmatrix} \begin{bmatrix}1&0\\0&1\\0&-1\\-1&0\end{bmatrix}$$

TABLE 85

$$\begin{bmatrix}1&0\\1&0\\0&1\\0&-j\end{bmatrix} \begin{bmatrix}1&0\\1&0\\0&1\\0&j\end{bmatrix} \begin{bmatrix}1&0\\j&0\\0&1\\0&1\end{bmatrix} \begin{bmatrix}1&0\\j&0\\0&1\\0&-1\end{bmatrix} \begin{bmatrix}1&0\\-1&0\\0&1\\0&-j\end{bmatrix} \begin{bmatrix}1&0\\-1&0\\0&1\\0&j\end{bmatrix} \begin{bmatrix}1&0\\-j&0\\0&1\\0&1\end{bmatrix} \begin{bmatrix}1&0\\-j&0\\0&1\\0&-1\end{bmatrix}$$

$$\begin{bmatrix}1&0\\0&1\\1&0\\0&1\end{bmatrix} \begin{bmatrix}1&0\\0&1\\1&0\\0&-1\end{bmatrix} \qquad \qquad \begin{bmatrix}1&0\\0&1\\-1&0\\0&1\end{bmatrix} \begin{bmatrix}1&0\\0&1\\-1&0\\0&-1\end{bmatrix} \begin{bmatrix}1&0\\0&1\\-j&0\\0&1\end{bmatrix} \begin{bmatrix}1&0\\0&1\\-j&0\\0&-1\end{bmatrix}$$

$$\begin{bmatrix}1&0\\0&1\\0&1\\1&0\end{bmatrix} \begin{bmatrix}1&0\\0&1\\0&-1\\1&0\end{bmatrix} \begin{bmatrix}1&0\\0&1\\0&1\\j&0\end{bmatrix} \qquad \begin{bmatrix}1&0\\0&1\\0&1\\-1&0\end{bmatrix} \begin{bmatrix}1&0\\0&1\\0&-1\\-1&0\end{bmatrix} \begin{bmatrix}1&0\\0&1\\0&1\\-j&0\end{bmatrix}$$

TABLE 86

$$\begin{bmatrix}1&0\\1&0\\0&1\\0&-j\end{bmatrix} \begin{bmatrix}1&0\\1&0\\0&1\\0&j\end{bmatrix} \begin{bmatrix}1&0\\j&0\\0&1\\0&1\end{bmatrix} \begin{bmatrix}1&0\\j&0\\0&1\\0&-1\end{bmatrix} \begin{bmatrix}1&0\\-1&0\\0&1\\0&-j\end{bmatrix} \begin{bmatrix}1&0\\-1&0\\0&1\\0&j\end{bmatrix} \begin{bmatrix}1&0\\-j&0\\0&1\\0&1\end{bmatrix} \begin{bmatrix}1&0\\-j&0\\0&1\\0&-1\end{bmatrix}$$

TABLE 86-continued $$\begin{bmatrix}1&0\\0&1\\1&0\\0&1\end{bmatrix}\begin{bmatrix}1&0\\0&1\\1&0\\0&-1\end{bmatrix}\quad\quad\begin{bmatrix}1&0\\0&1\\-1&0\\0&1\end{bmatrix}\begin{bmatrix}1&0\\0&1\\-1&0\\0&-1\end{bmatrix}\begin{bmatrix}1&0\\0&1\\-j&0\\0&1\end{bmatrix}\begin{bmatrix}1&0\\0&1\\-j&0\\0&-1\end{bmatrix}$$

$$\begin{bmatrix}1&0\\0&1\\0&1\\1&0\end{bmatrix}\begin{bmatrix}1&0\\0&1\\0&-1\\1&0\end{bmatrix}\begin{bmatrix}1&0\\0&1\\0&1\\j&0\end{bmatrix}\begin{bmatrix}1&0\\0&1\\0&1\\-1&0\end{bmatrix}\begin{bmatrix}1&0\\0&1\\0&-1\\-1&0\end{bmatrix}\quad\quad\begin{bmatrix}1&0\\0&1\\0&-1\\-j&0\end{bmatrix}$$

TABLE 87

$$\begin{bmatrix}1&0\\1&0\\0&1\\0&-j\end{bmatrix}\begin{bmatrix}1&0\\1&0\\0&1\\0&j\end{bmatrix}\begin{bmatrix}1&0\\j&0\\0&1\\0&1\end{bmatrix}\begin{bmatrix}1&0\\j&0\\0&1\\0&-1\end{bmatrix}\begin{bmatrix}1&0\\-1&0\\0&1\\0&-j\end{bmatrix}\begin{bmatrix}1&0\\-1&0\\0&1\\0&j\end{bmatrix}\begin{bmatrix}1&0\\-j&0\\0&1\\0&1\end{bmatrix}\begin{bmatrix}1&0\\-j&0\\0&1\\0&-1\end{bmatrix}$$

$$\begin{bmatrix}1&0\\0&1\\1&0\\0&1\end{bmatrix}\begin{bmatrix}1&0\\0&1\\1&0\\0&-1\end{bmatrix}\quad\quad\begin{bmatrix}1&0\\0&1\\-1&0\\0&1\end{bmatrix}\begin{bmatrix}1&0\\0&1\\-1&0\\0&-1\end{bmatrix}\begin{bmatrix}1&0\\0&1\\-j&0\\0&1\end{bmatrix}\begin{bmatrix}1&0\\0&1\\-j&0\\0&-1\end{bmatrix}$$

$$\begin{bmatrix}1&0\\0&1\\0&1\\1&0\end{bmatrix}\begin{bmatrix}1&0\\0&1\\0&-1\\1&0\end{bmatrix}\begin{bmatrix}1&0\\0&1\\0&-1\\j&0\end{bmatrix}\begin{bmatrix}1&0\\0&1\\0&1\\-1&0\end{bmatrix}\begin{bmatrix}1&0\\0&1\\0&-1\\-1&0\end{bmatrix}\begin{bmatrix}1&0\\0&1\\0&1\\-j&0\end{bmatrix}$$

TABLE 88

$$\begin{bmatrix}1&0\\1&0\\0&1\\0&-j\end{bmatrix}\begin{bmatrix}1&0\\1&0\\0&1\\0&j\end{bmatrix}\begin{bmatrix}1&0\\j&0\\0&1\\0&1\end{bmatrix}\begin{bmatrix}1&0\\j&0\\0&1\\0&-1\end{bmatrix}\begin{bmatrix}1&0\\-1&0\\0&1\\0&-j\end{bmatrix}\begin{bmatrix}1&0\\-1&0\\0&1\\0&j\end{bmatrix}\begin{bmatrix}1&0\\-j&0\\0&1\\0&1\end{bmatrix}\begin{bmatrix}1&0\\-j&0\\0&1\\0&-1\end{bmatrix}$$

$$\begin{bmatrix}1&0\\0&1\\1&0\\0&1\end{bmatrix}\begin{bmatrix}1&0\\0&1\\1&0\\0&-1\end{bmatrix}\quad\quad\begin{bmatrix}1&0\\0&1\\-1&0\\0&1\end{bmatrix}\begin{bmatrix}1&0\\0&1\\-1&0\\0&-1\end{bmatrix}\begin{bmatrix}1&0\\0&1\\-j&0\\0&1\end{bmatrix}\begin{bmatrix}1&0\\0&1\\-j&0\\0&-1\end{bmatrix}$$

$$\begin{bmatrix}1&0\\0&1\\0&1\\1&0\end{bmatrix}\begin{bmatrix}1&0\\0&1\\0&-1\\1&0\end{bmatrix}\begin{bmatrix}1&0\\0&1\\0&1\\j&0\end{bmatrix}\begin{bmatrix}1&0\\0&1\\0&1\\-1&0\end{bmatrix}\begin{bmatrix}1&0\\0&1\\0&-1\\-1&0\end{bmatrix}\quad\quad\begin{bmatrix}1&0\\0&1\\0&-1\\-j&0\end{bmatrix}$$

TABLE 89

$$\begin{bmatrix}1&0\\1&0\\0&1\\0&-j\end{bmatrix}\begin{bmatrix}1&0\\1&0\\0&1\\0&j\end{bmatrix}\begin{bmatrix}1&0\\j&0\\0&1\\0&1\end{bmatrix}\begin{bmatrix}1&0\\j&0\\0&1\\0&-1\end{bmatrix}\begin{bmatrix}1&0\\-1&0\\0&1\\0&-j\end{bmatrix}\begin{bmatrix}1&0\\-1&0\\0&1\\0&j\end{bmatrix}\begin{bmatrix}1&0\\-j&0\\0&1\\0&1\end{bmatrix}\begin{bmatrix}1&0\\-j&0\\0&1\\0&-1\end{bmatrix}$$

$$\begin{bmatrix}1&0\\0&1\\1&0\\0&1\end{bmatrix}\begin{bmatrix}1&0\\0&1\\1&0\\0&-1\end{bmatrix}\quad\quad\begin{bmatrix}1&0\\0&1\\-1&0\\0&1\end{bmatrix}\begin{bmatrix}1&0\\0&1\\-1&0\\0&-1\end{bmatrix}\begin{bmatrix}1&0\\0&1\\-j&0\\0&1\end{bmatrix}\begin{bmatrix}1&0\\0&1\\-j&0\\0&-1\end{bmatrix}$$

TABLE 89-continued $$\begin{bmatrix} 1 & 0 \\ 0 & 1 \\ 0 & 1 \\ 1 & 0 \end{bmatrix} \begin{bmatrix} 1 & 0 \\ 0 & 1 \\ 0 & -1 \\ 1 & 0 \end{bmatrix} \begin{bmatrix} 1 & 0 \\ 0 & 1 \\ 0 & 1 \\ -1 & 0 \end{bmatrix} \begin{bmatrix} 1 & 0 \\ 0 & 1 \\ 0 & -1 \\ -1 & 0 \end{bmatrix} \begin{bmatrix} 1 & 0 \\ 0 & 1 \\ 0 & 1 \\ -j & 0 \end{bmatrix} \begin{bmatrix} 1 & 0 \\ 0 & 1 \\ 0 & -1 \\ -j & 0 \end{bmatrix}$$

All the functions as described above can be performed by processors such as a microprocessor, a controller, a microcontroller, an ASIC (Application Specific Integrated Circuit), and the like, according to software coded to perform such functions or program codes, etc. Designing, developing, and implementing such codes would be obvious to the skilled person in the art based on the description of the present invention.

The preferred embodiments of the present invention have been described with reference to the accompanying drawings, and it will be apparent to those skilled in the art that various modifications and variations can be made in the present invention without departing from the scope of the invention. Thus, it is intended that any future modifications of the embodiments of the present invention will come within the scope of the appended claims and their equivalents.

The invention claimed is:

1. A method for transmitting data using spatial multiplexing, the method comprising:
modulating at least one codeword to generate at least one modulation symbol;
mapping the at least one modulation symbol to a layer whose number is determined according to its rank, to generate a layer-mapped symbol stream;
performing discrete Fourier transform (DFT) on the layer-mapped symbol stream to generate a frequency domain symbol stream;
performing precoding on the frequency domain symbol stream;
mapping the precoded frequency domain symbol stream to subcarriers, and then performing inverse fast Fourier transform (IFFT) on the precoded frequency domain symbol stream-mapped subcarriers to generate SC-FDMA symbols; and
transmitting the SC-FDMA symbols by using a plurality of transmission antennas,
wherein the performing of precoding comprises: separately mapping the plurality of transmission antennas to each virtual antenna or mapping the plurality of transmission antennas to a single virtual antenna; and performing permutation so that the at least one codeword can be distributedly transmitted through all of the plurality of transmission antennas.

2. The method of claim 1, wherein when the number of the plurality of transmission antennas and the size of the rank are equal, the plurality of transmission antennas are mapped to the virtual antennas in a one-to-one manner.

3. The method of claim 1, wherein, when the size of the rank is larger than the number of plurality of transmission antennas, a signal of at least of one transmission antenna is phase shifted.

4. The method of claim 3, wherein the at least one transmission antenna and a transmission antenna that transmits the phase-shifted signal are mapped to the same virtual antenna.

5. The method of claim 3, wherein the single transmission antenna is mapped to a single virtual antenna.

6. The method of claim 1, wherein the subcarrier has a one-to-many mapping relation with the plurality of transmission antennas.

7. The method of claim 1, wherein the permutation is changed in unit of each SC-FDMA symbol.

8. The method of claim 1, wherein the permutation is changed in units of a plurality of SC-FDMA symbols.

* * * * *